United States Patent
Nakai et al.

[11] Patent Number: 5,909,602
[45] Date of Patent: Jun. 1, 1999

[54] IMAGE FORMING APPARATUS HAVING A SPECIMEN IMAGE JUDGING SECTION AND AN IMAGE INFORMATION SUITABILITY JUDGING SECTION

[75] Inventors: Yasuhiro Nakai, Soraku-gun; Syoichiro Yoshiura, Tenri; Hidetomo Nishiyama, Yamatokoriyama; Masakatsu Nakamura, Kashihara, all of Japan

[73] Assignee: Sharp Kabushiki Kaisha, Osaka, Japan

[21] Appl. No.: 08/928,804

[22] Filed: Sep. 12, 1997

[30] Foreign Application Priority Data

Sep. 30, 1996 [JP] Japan ................................. 8-259905

[51] Int. Cl.⁶ ......................... G03G 21/00; G03G 15/00; H04N 1/387
[52] U.S. Cl. .............................. 399/8; 358/296; 382/135; 382/181; 395/114; 399/366
[58] Field of Search ...................... 399/366, 8; 395/112, 395/113, 114, 115, 116; 358/501, 296; 382/170, 181, 135

[56] References Cited

U.S. PATENT DOCUMENTS

| | | | |
|---|---|---|---|
| 4,797,706 | 1/1989 | Sugishima et al. | 358/300 |
| 5,228,118 | 7/1993 | Sasaki | 395/112 |
| 5,390,003 | 2/1995 | Yamaguchi et al. | 399/366 |
| 5,434,649 | 7/1995 | Hasuo et al. | 399/366 |
| 5,467,434 | 11/1995 | Hower, Jr. et al. | 395/114 |
| 5,604,596 | 2/1997 | Ukai et al. | 358/296 |
| 5,659,628 | 8/1997 | Tachikawa et al. | 382/135 |

FOREIGN PATENT DOCUMENTS

| | | |
|---|---|---|
| 53-116834 | 10/1978 | Japan . |
| 1-300285 | 12/1989 | Japan . |
| 4-205277 | 7/1992 | Japan . |
| 7-264398 | 10/1995 | Japan . |

OTHER PUBLICATIONS

U.S. application No. 08/770,543, Nakai et al., filed Dec. 20, 1996.
U.S. application No. 08/769,429, Yoshiura et al., filed Dec. 19, 1996.
U.S. application No. 08/779,850, Nishiyama et al., filed Jan. 7, 1997.
U.S. application No. 08/779,387, Yoshiura et al., filed Jan. 7, 1997.
U.S. application No. 08/779,722, Nishiyama et al., filed Jan. 7, 1997.

*Primary Examiner*—Robert Beatty
*Assistant Examiner*—Sophia S. Chen
*Attorney, Agent, or Firm*—David G. Conlin; William J. Daley, Jr.

[57] ABSTRACT

In the present image forming system, when a digital copying machine having no specimen image judging section makes a copy, it transfers an input image to an image processing apparatus having the specimen image judging section within the system to request to judge whether the input image is a copy-prohibited image on its behalf. When the judging result is returned within a predetermined period, the digital copying machine controls the copying operation based on the judging result: when the judging result is negative, a normal copying operation is carried out; when the copying is totally prohibited, the image processing apparatus ends the copying operation after informing the user that the copying operation is terminated because the copying of the subject image is prohibited. Consequently, whether the subject image data are a specimen image like paper money can be discovered at the image processing machine, thereby preventing a crime, such as forgery of paper money or securities. Also, if the specimen image judging section is installed in the image processing apparatus, each digital copying machine connected to the same does not have to include the specimen image judging section, thereby suppressing a cost increase.

24 Claims, 42 Drawing Sheets

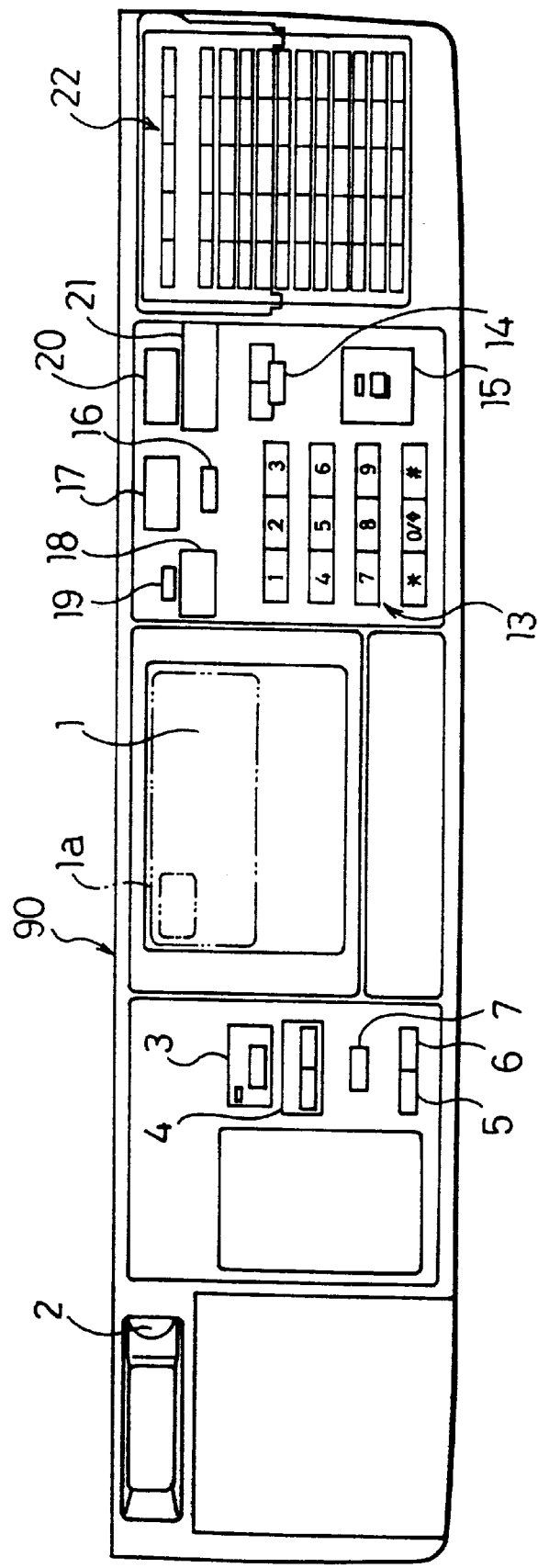

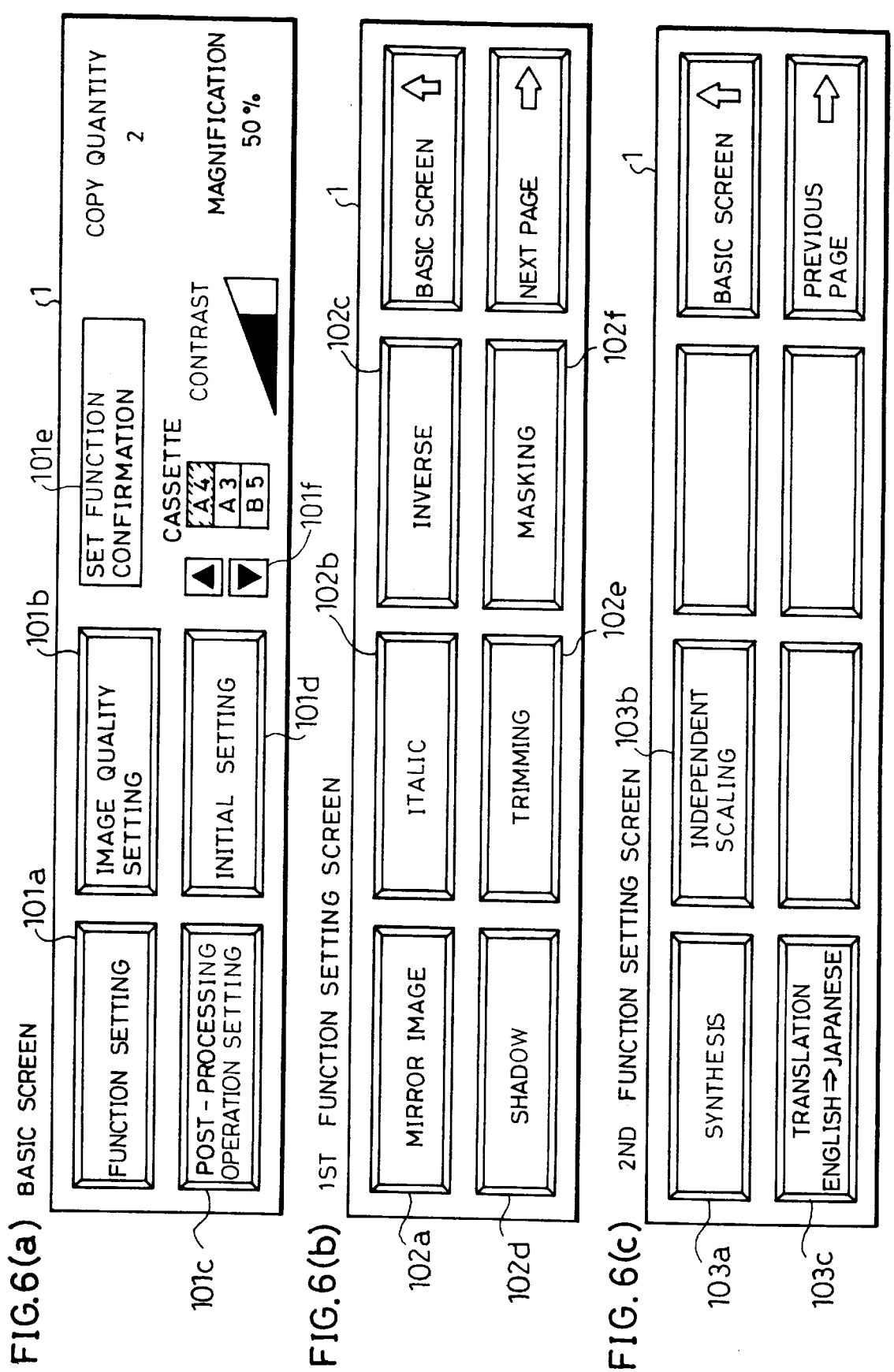

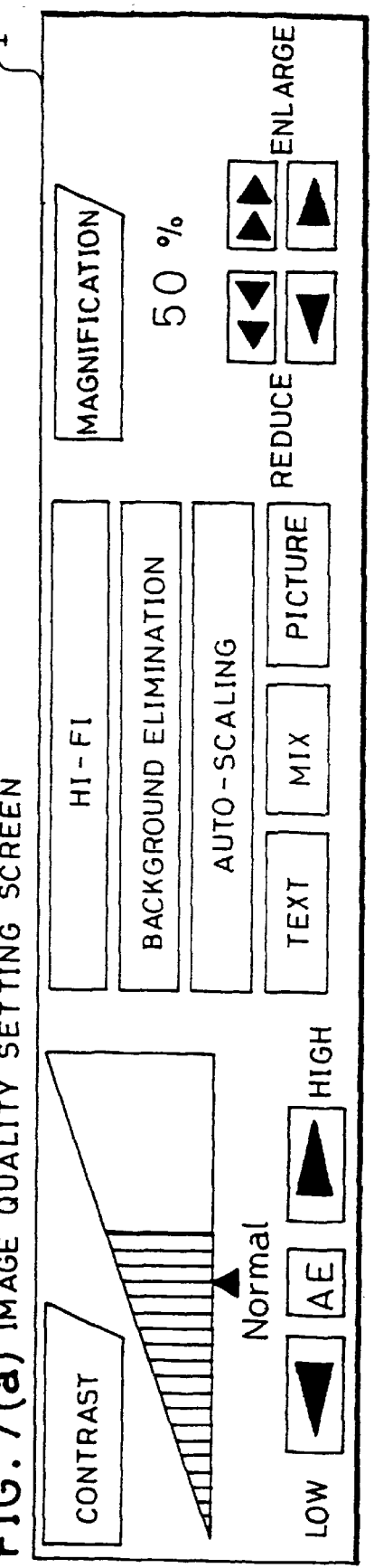
FIG. 7(a) IMAGE QUALITY SETTING SCREEN
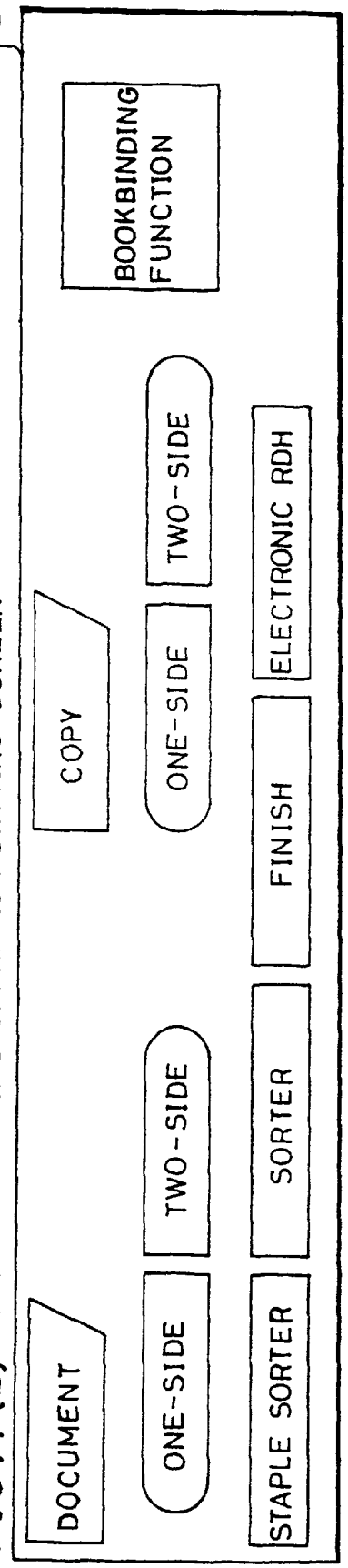
FIG. 7(b) POST-PROCESSING OPERATION SETTING SCREEN

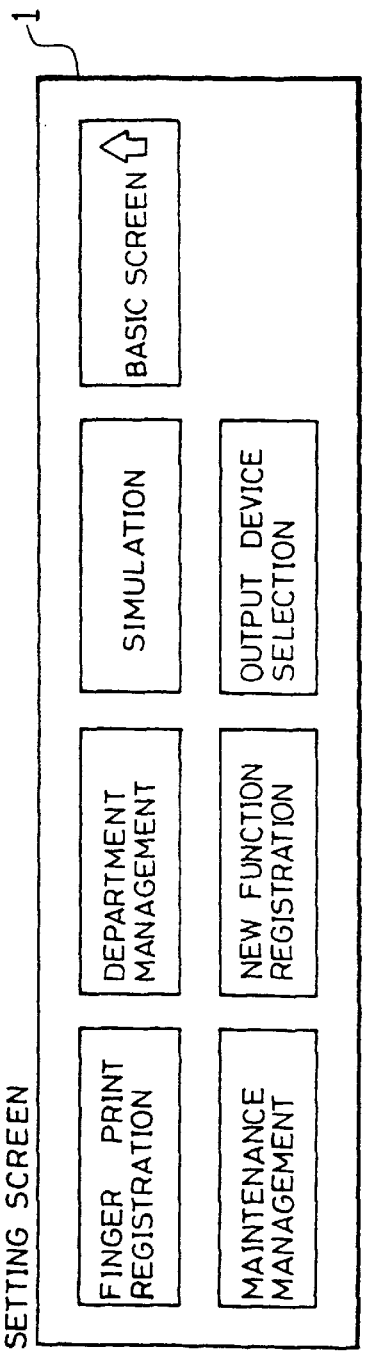
FIG.8(a) INITIAL SETTING SCREEN
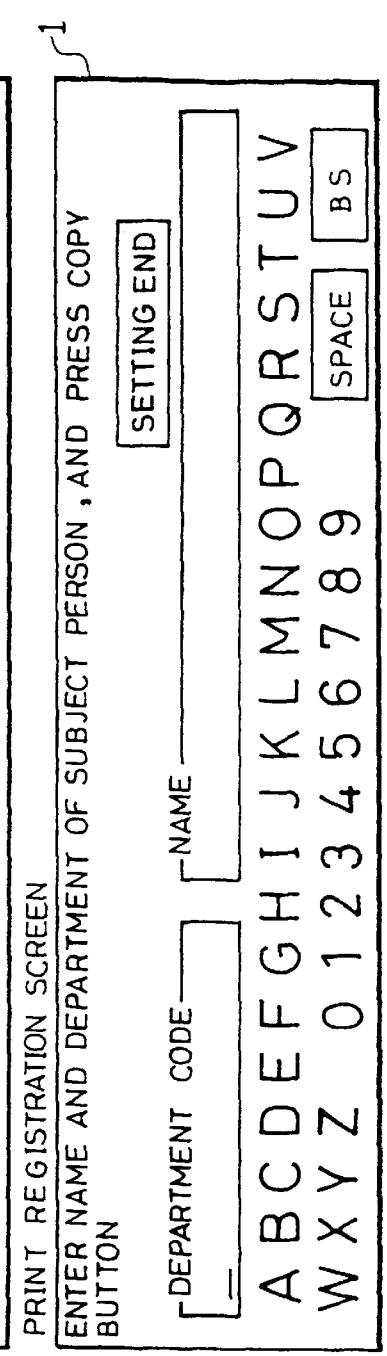
FIG.8(b) FINGER PRINT REGISTRATION SCREEN
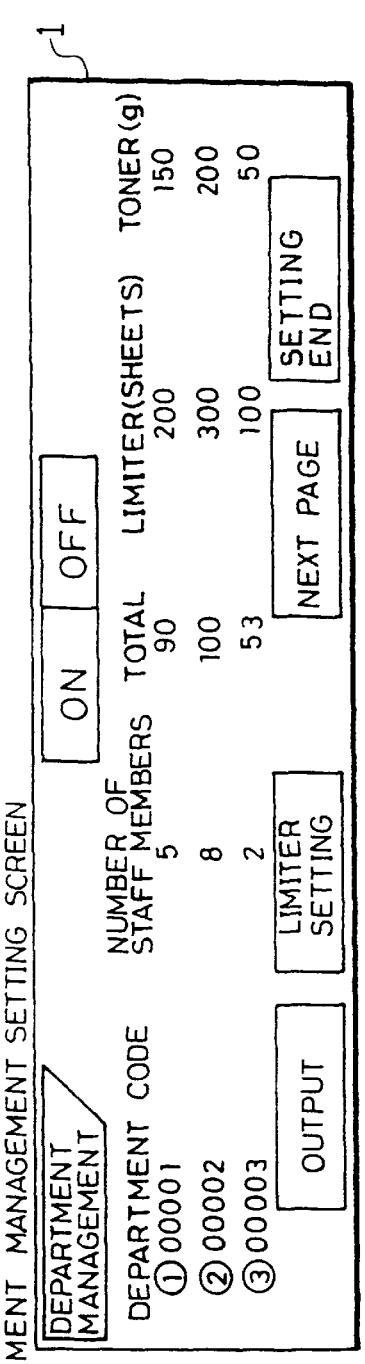
FIG.8(c) DEPARTMENT MANAGEMENT SETTING SCREEN

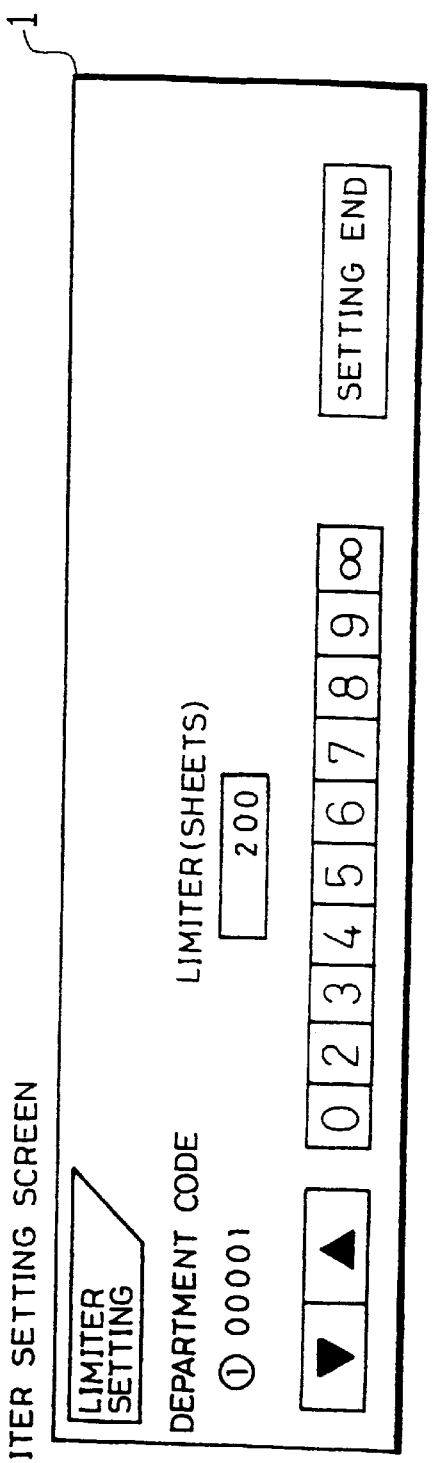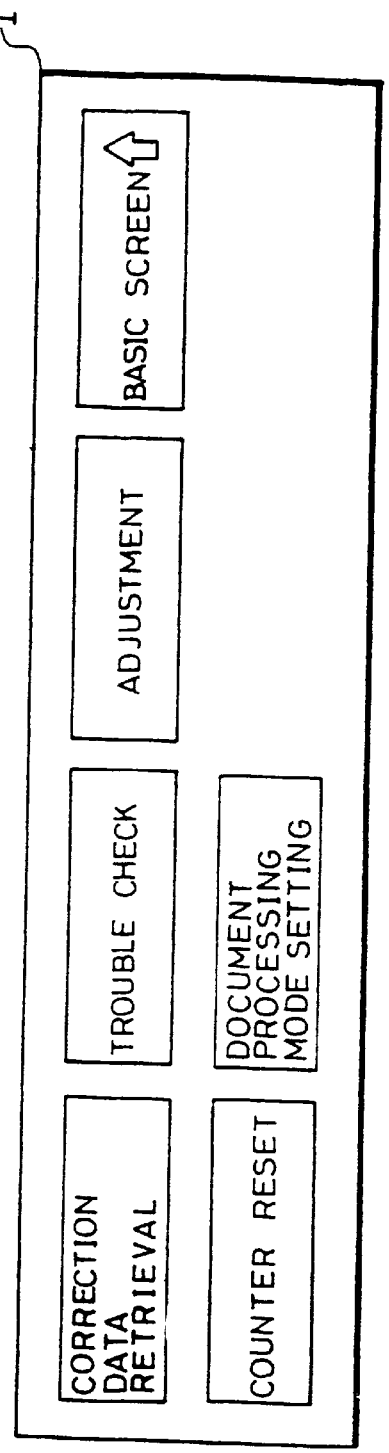
FIG. 9(a) LIMITER SETTING SCREEN
FIG. 9(b) SIMULATION SCREEN

FIG. 18

(HOST'S ALL FUNCTIONS)

NEW FUNCTION REGISTERING SCREEN
ALL FUNCTIONS REGISTERED IN SERVICE CENTER ARE DISPLAYED BELOW. FOR REGISTRATION AS ADDITIONAL FUNCTIONS, PRESS DESIRED FUNCTION(S). PRESSED FUNCTION(S) WILL BE DISPLAYED WITH REVERSED BACKGROUND. PRESS "START" IF "OK", PRESS "CANCEL" TO STOP.

NEWLY ADDED FUNCTIONS

| TRANSLATION ENGLISH ⇔ JAPANESE | DICTIONARY FUNCTION "KOJIEN" | LINE ARRANGMENT |
| TRANSLATION JAPANESE ⇔ ENGLISH | | |

→

HELP | NEWLY ADDED FUNCTIONS

UP / DOWN

START | CANCEL 113b, 113a, 113e, 113c

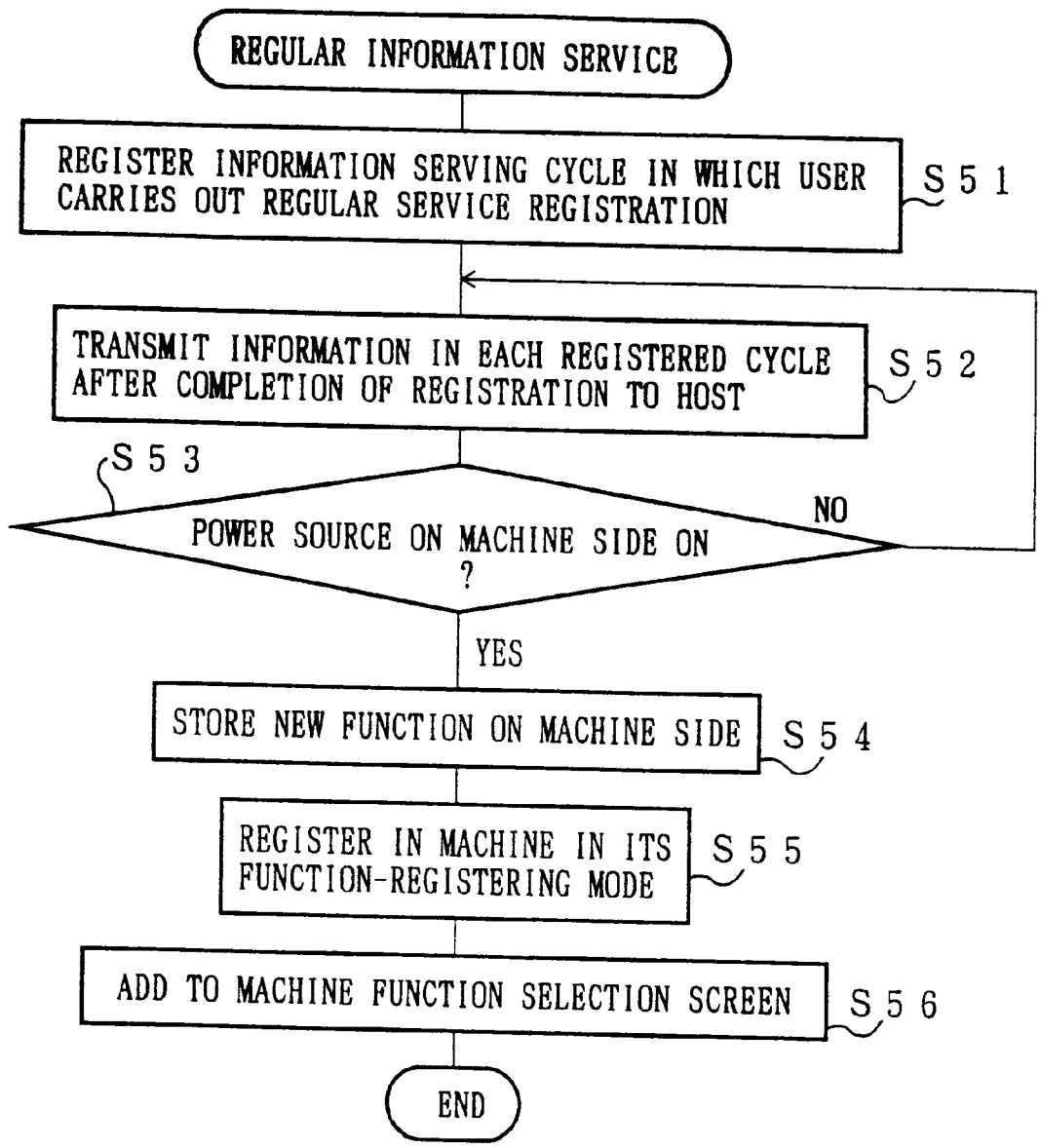

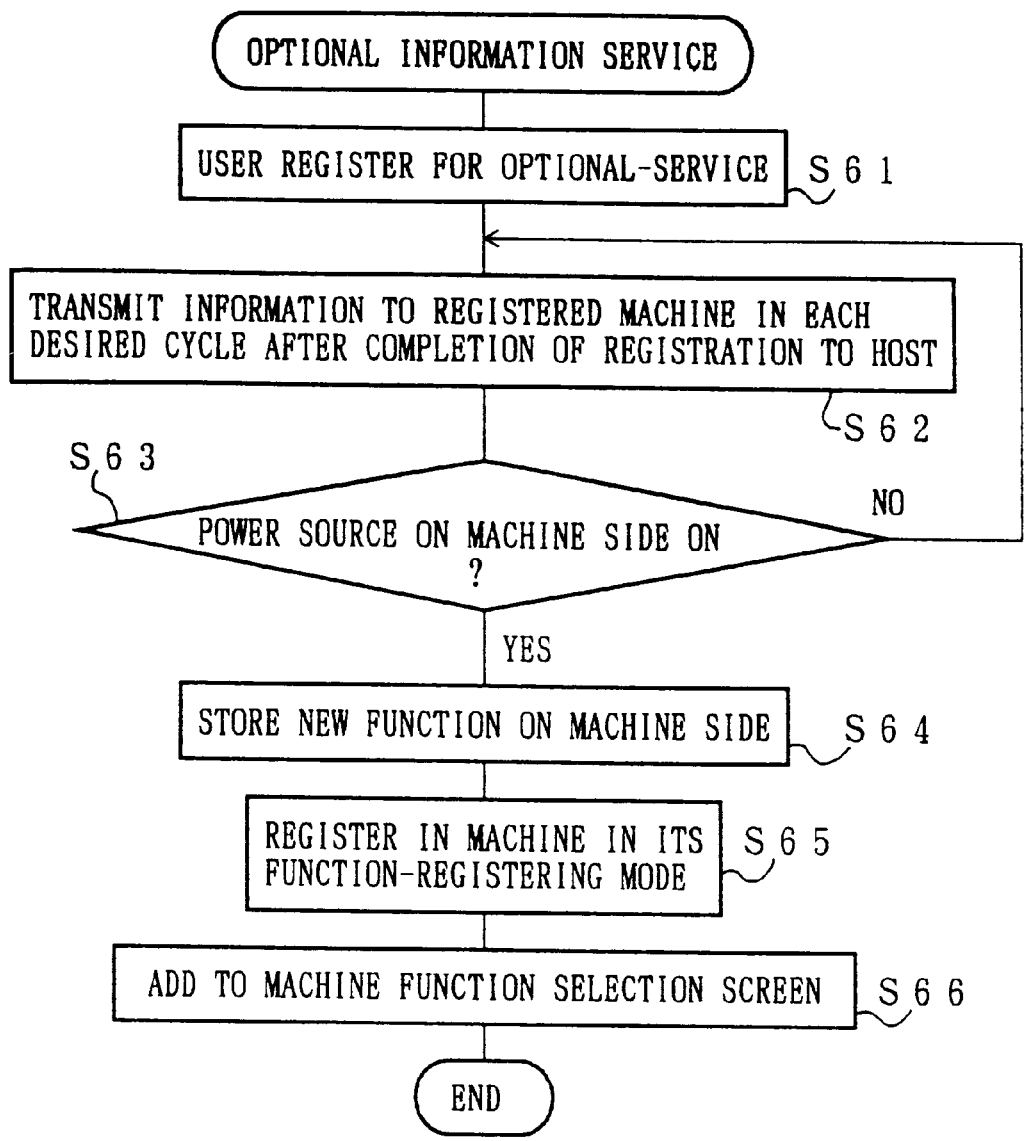

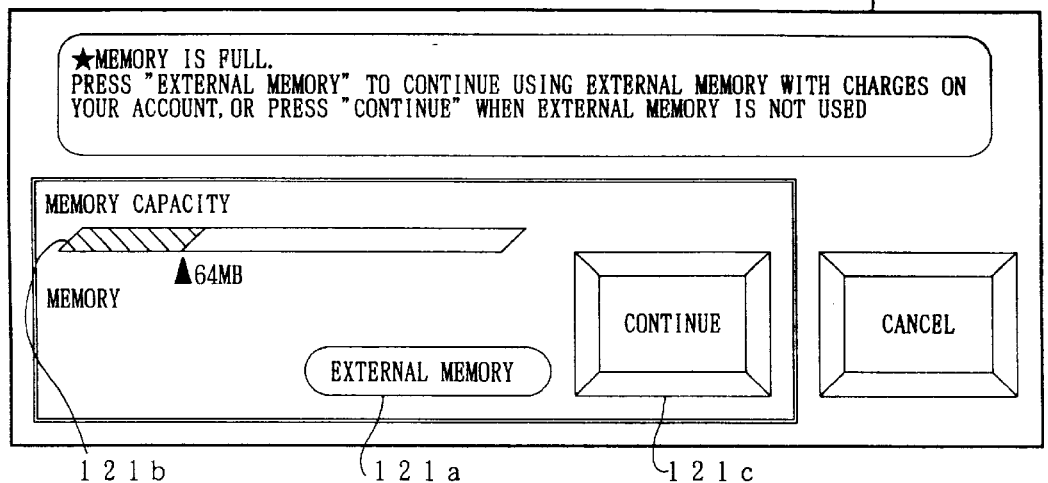
FIG. 22 (a)
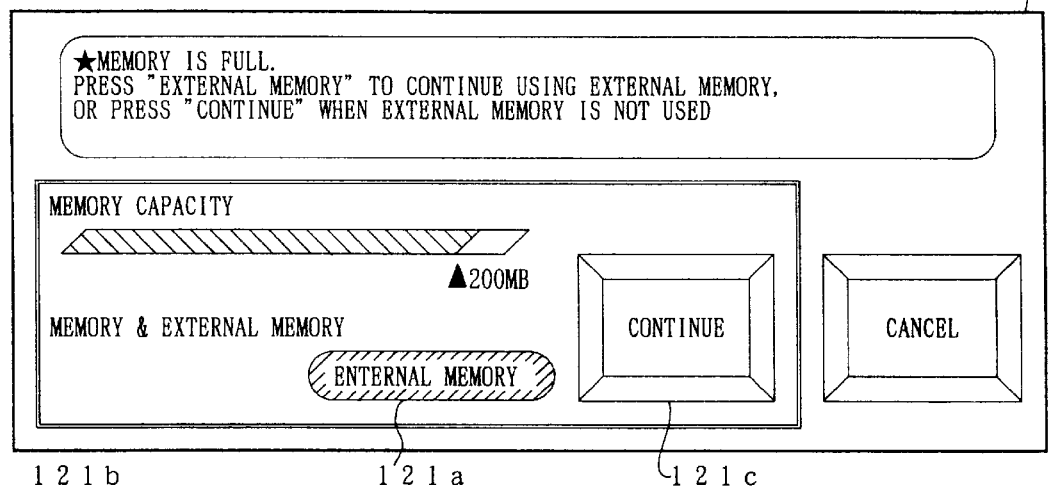
FIG. 22 (b) (WHEN EXTERNAL MEMORY SELECTION KEY IS PRESSED)
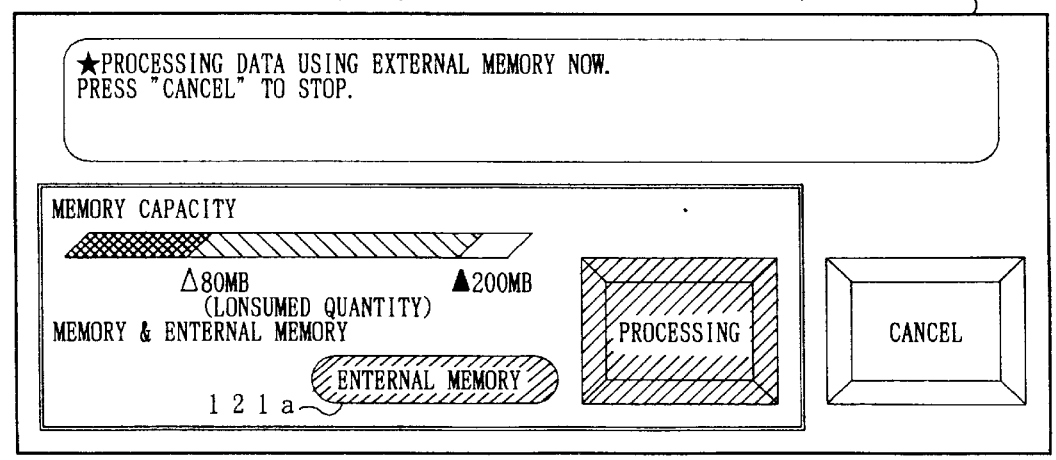
FIG. 22 (c) (WHEN CONTINUE KEY IS PRESSED)

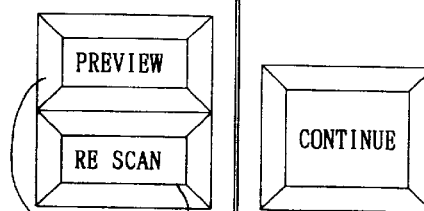
FIG. 28 (a)
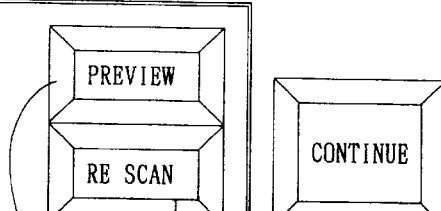
FIG. 28 (b) (RE-SCAN KEY ON)
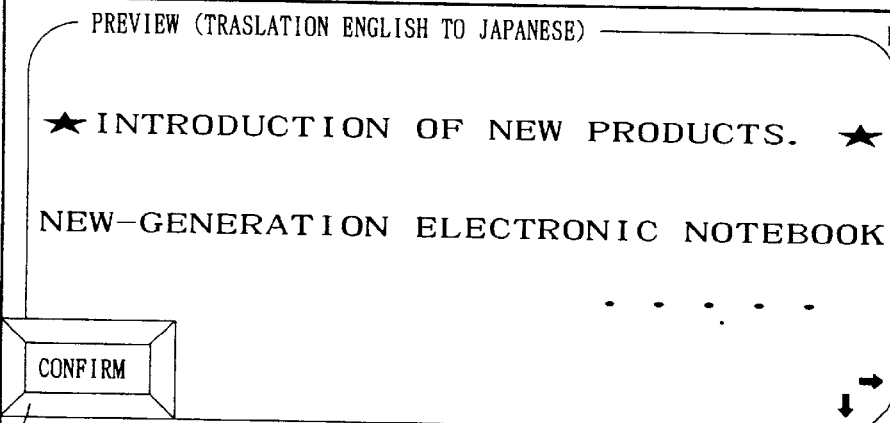
FIG. 28 (c) (PREVIEW ON)

INVOICE

FOLLOWING IS THE CHARGES FOR THE MONTH OF JANUARY.
PLEASE MAKE PAYMENT BY DUE DATE.

| DATE | START TIME | PARTICULARS | PROCESSING TIME | CHARGES |
|---|---|---|---|---|
| 95/01/07 | 10:00:00 | 1-SET-2-COPY | 00:05:00 | 50 |
| 95/01/10 | 09:15:25 | CENTERING | 00:03:10 | 30 |
| 95/01/15 | 14:17:13 | ADDRESSED COPY | 00:15:00 | 250 |
| 95/01/20 | 11:20:15 | MOVE FUNCTION | 00:07:07 | 30 |
| 95/01/20 | 13:36:54 | MULTI-SHOT | 00:10:16 | 200 |
| 95/01/22 | 14:53:02 | SYNTHESES | 00:02:24 | 200 |
| 95/01/24 | 08:34:52 | ITALIC·MIRROR IMAGE | 00:01:26 | 150 |
| 95/01/29 | 17:54:23 | TRANSLATION | 00:34:02 | 500 |
|  |  |  |  |  |
|  |  |  |  |  |

TOTAL ¥1,410

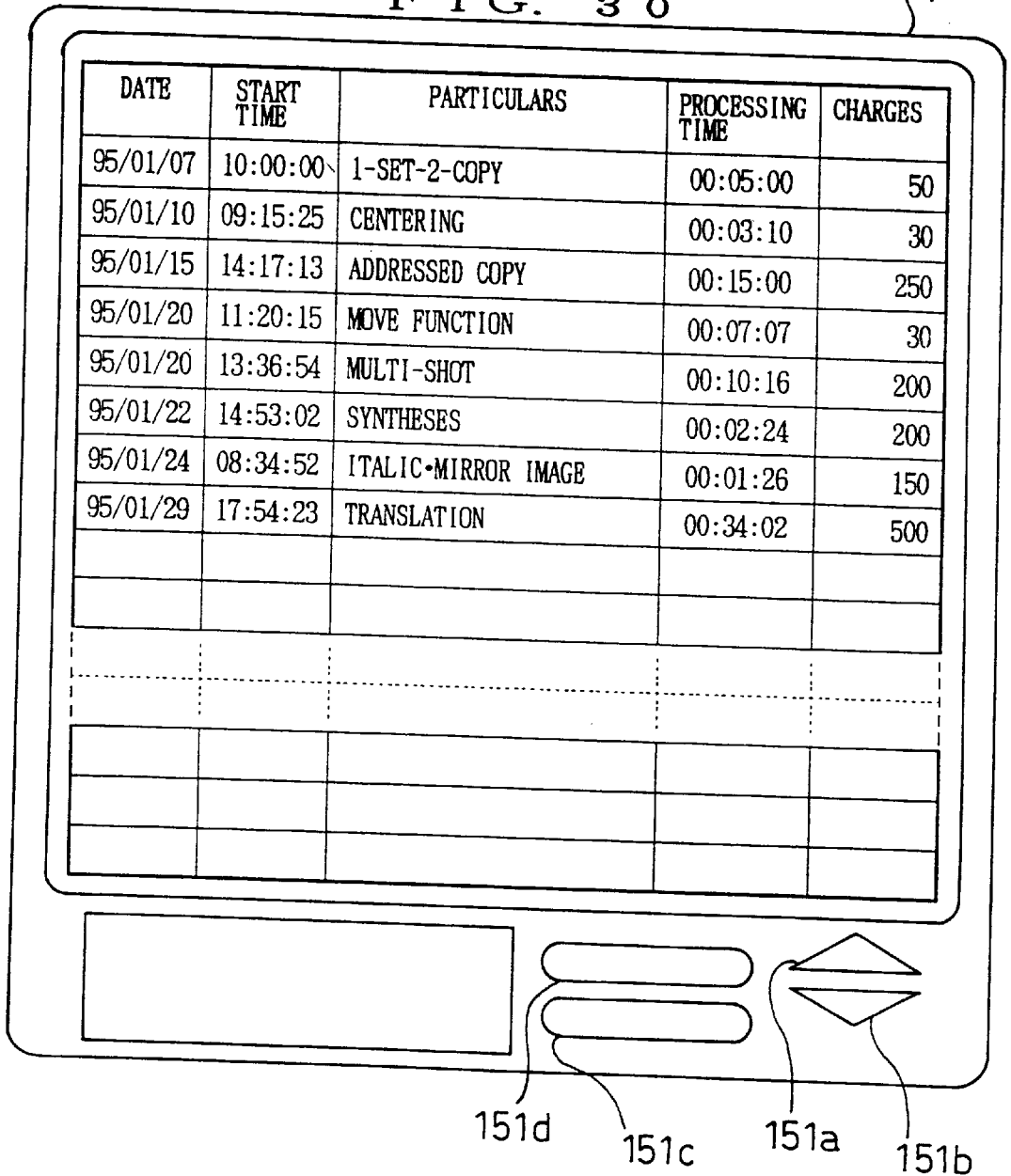

FIG. 31

| DIGITAL COPYING MACHINE A ||| DIGITAL COPYING MACHINE B ||| DIGITAL COPYING MACHINE C |||
|---|---|---|---|---|---|---|---|---|
| DATE | START TIME | PARTICULARS | PROCESSING TIME | DATE | START TIME | PARTICULARS | PROCESSING TIME | DATE | START TIME | PARTICULARS | PROCESSING TIME |
| 95/01/07 | 10:00:00 | 1-SET-2-COPY | 00:05:00 | 95/01/11 | 13:54:02 | ADDRESSED COPY | 00:12:54 | 95/01/09 | 09:24:30 | HIGH-QUALITY PROCESS | 00:24:35 |
| 95/01/10 | 09:15:25 | CENTERING | 00:03:10 | 95/01/12 | 09:24:55 | SYNTHESES | 00:02:54 | 95/01/11 | 11:28:35 | HIGH-QUALITY PROCESS | 00:34:01 |
| 95/01/15 | 14:17:13 | ADDRESSED COPY | 00:15:00 | 95/01/20 | 17:12:45 | SHADOW·OUTLINE | 00:01:43 | 95/01/24 | 14:35:48 | TRANSLATION | 00:40:52 |
| 95/01/20 | 11:20:15 | MOVE FUNCTION | 00:07:07 | 95/01/23 | 18:34:52 | ITALIC·MIRROR IMAGE | 00:02:26 | 95/01/29 | 10:45:02 | ENLARGED DIVISIONAL OUTPUT | 00:07:01 |
| 95/01/20 | 13:36:54 | MULTI-SHOT | 00:10:16 | 95/01/25 | 11:24:02 | TRANSLATION | 00:23:54 | 95/02/04 | 16:30:11 | HIGH-QUALITY PROCESSING | 00:14:12 |
| 95/01/22 | 14:53:02 | SYNTHESES | 00:02:24 | 95/01/28 | 14:43:40 | ENLARGED DIVISIONAL OUTPUT | 00:09:24 | 95/02/11 | 09:35:02 | TRANSLATION | 00:35:23 |
| 95/01/24 | 08:34:52 | ITALIC·MIRROR IMAGE | 00:01:26 | 95/02/04 | 10:08:24 | HIGH-QUALITY PROCESSING | 00:19:24 | | | | |
| 95/01/29 | 17:54:23 | TRANSLATION | 00:34:02 | | | | | | | | |
| 95/01/02 | 10:32:45 | HIGH-QUALITY PROCESSING | 00:21:14 | | | | | | | | |

| NUMBER OF USE | 8 |
|---|---|
| TOTAL TIME OF USE | 01:18:25 |
| CHARGES | — |

| NUMBER OF USE | 6 |
|---|---|
| TOTAL TIME OF USE | 00:53:15 |
| CHARGES | — |

| NUMBER OF USE | 4 |
|---|---|
| TOTAL TIME OF USE | 01:46:29 |
| CHARGES | — |

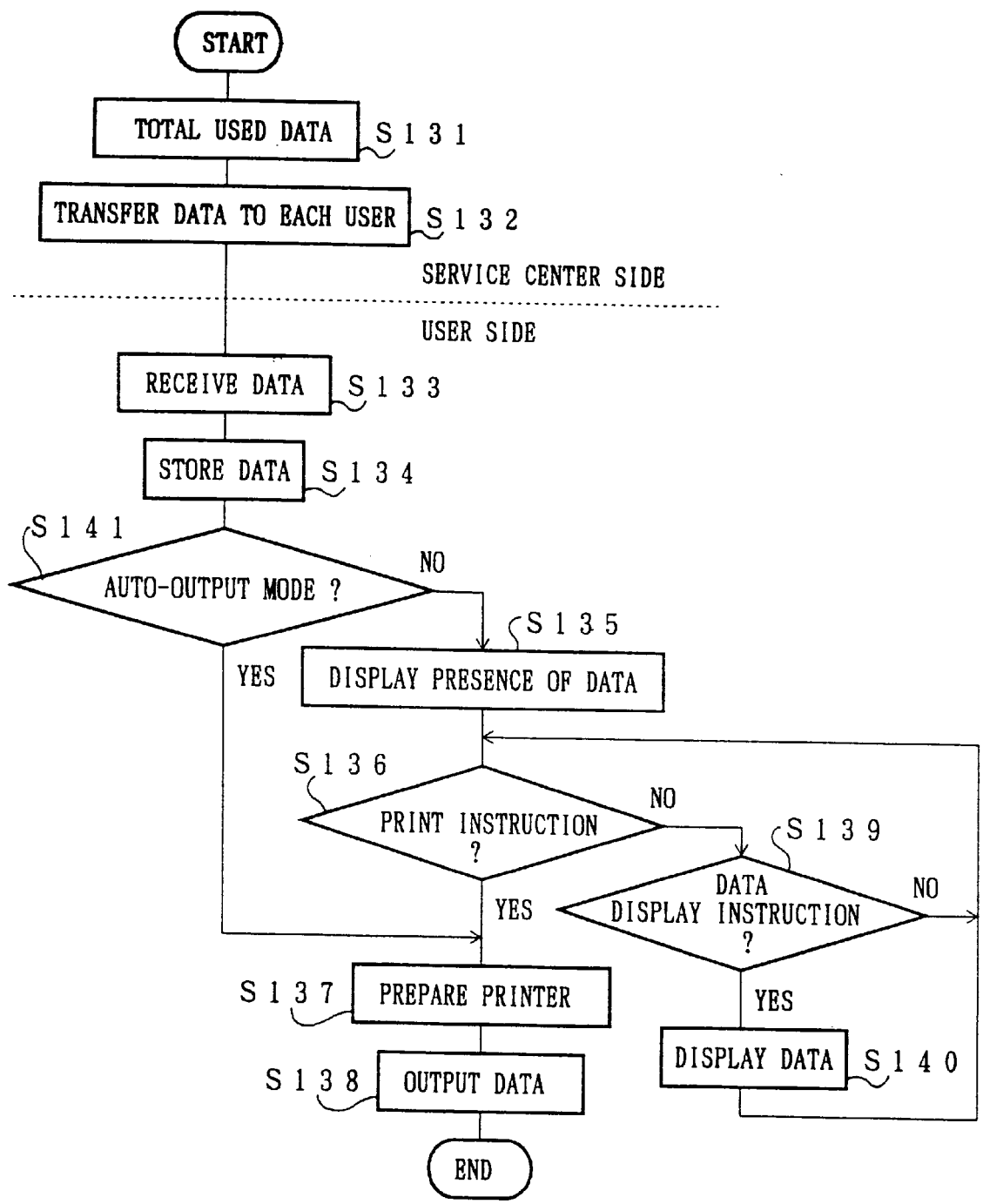

FIG. 34

| USER-SIDE MANAGING INFORMATION | | | | |
|---|---|---|---|---|
| DATE | START TIME | PARTICULARS | PROCESSING TIME | CHARGES |
| 95/01/07 | 10:00:00 | 1-SET-2-COPY | 00:05:00 | 50 |
| 95/01/10 | 09:15:25 | CENTERING | 00:03:10 | 30 |
| 95/01/15 | 14:17:13 | ADDRESSED COPY | 00:15:00 | 250 |
| 95/01/20 | 11:20:15 | MOVE FUNCTION | 00:07:07 | 30 |
| 95/01/20 | 13:36:54 | MULTI-SHOT | 00:10:16 | 200 |
| 95/01/22 | 14:53:02 | SYNTHESES | 00:02:24 | 200 |
| 95/01/24 | 08:34:52 | ITALIC·MIRROR IMAGE | 00:01:26 | 150 |
| 95/01/29 | 17:54:23 | TRANSLATION | 00:34:02 | 500 |

| SERVICE-CENTER-SIDE MANAGING INFORMATION | | | | |
|---|---|---|---|---|
| DATE | START TIME | PARTICULARS | PROCESSING TIME | CHARGES |
| 95/01/07 | 10:00:00 | 1-SET-2-COPY | 00:05:00 | 50 |
| 95/01/10 | 09:15:25 | CENTERING | 00:03:10 | 30 |
| 95/01/15 | 14:17:13 | ADDRESSED COPY | 00:15:00 | 250 |
| 95/01/20 | 11:20:15 | MOVE FUNCTION | 00:07:07 | 30 |
| 95/01/20 | 13:36:54 | MULTI-SHOT | 00:10:16 | 200 |
| 95/01/22 | 14:53:02 | SYNTHESES | 00:02:24 | 200 |
| 95/01/24 | 08:34:52 | ITALIC·MIRROR IMAGE | 00:01:26 | 150 |
| 95/01/29 | 17:54:23 | TRANSLATION | 00:34:02 | 500 |

FIG. 35

UTILIZATION FOR THE MONTH OF JANUARY

| USER-SIDE MANAGING INFORMATION | | | | | SERVICE-CENTER-SIDE MANAGING INFORMATION | | | | |
|---|---|---|---|---|---|---|---|---|---|
| DATE | START TIME | PARTICULARS | PROCESSING TIME | CHARGES | DATE | START TIME | PARTICULARS | PROCESSING TIME | CHARGES |
| 95/01/07 | 10:00:00 | 1-SET-2-COPY | 00:05:00 | 50 | 95/01/07 | 10:00:00 | 1-SET-2-COPY | 00:05:00 | 50 |
| 95/01/10 | 09:15:25 | CENTERING | 00:03:10 | 30 | 95/01/10 | 09:15:25 | CENTERING | 00:03:10 | 30 |
| 95/01/15 | 14:17:13 | ADDRESSED COPY | 00:15:00 | 250 | 95/01/15 | 14:17:13 | ADDRESSED COPY | 00:15:00 | 250 |
| 95/01/20 | 11:20:15 | MOVE FUNCTION | 00:07:07 | 30 | 95/01/20 | 11:20:15 | MOVE FUNCTION | 00:07:07 | 30 |
| 95/01/20 | 13:36:54 | MULTI-SHOT | 00:10:16 | 200 | 95/01/20 | 13:36:54 | MULTI-SHOT | 00:10:16 | 200 |
| 95/01/22 | 14:53:02 | SYNTHESES | 00:02:24 | 200 | 95/01/22 | 14:53:02 | SYNTHESES | 00:02:24 | 200 |
| 95/01/24 | 08:34:52 | ITALIC·MIRROR IMAGE | 00:01:26 | 150 | 95/01/24 | 08:34:52 | ITALIC·MIRROR IMAGE | 00:01:26 | 150 |
| 95/01/29 | 17:54:23 | TRANSLATION | 00:34:02 | 500 | 95/01/29 | 17:54:23 | TRANSLATION | 00:34:02 | 500 |

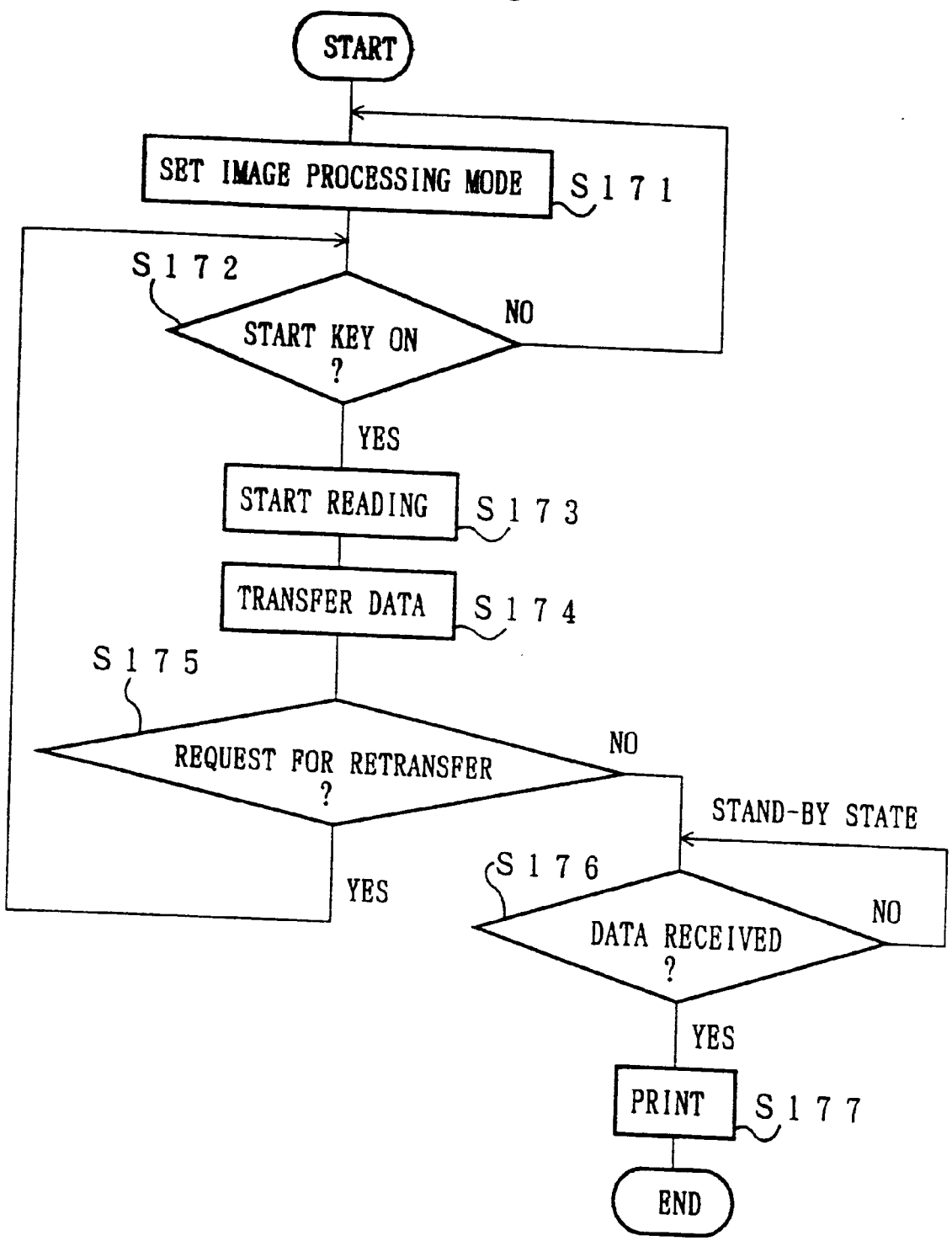

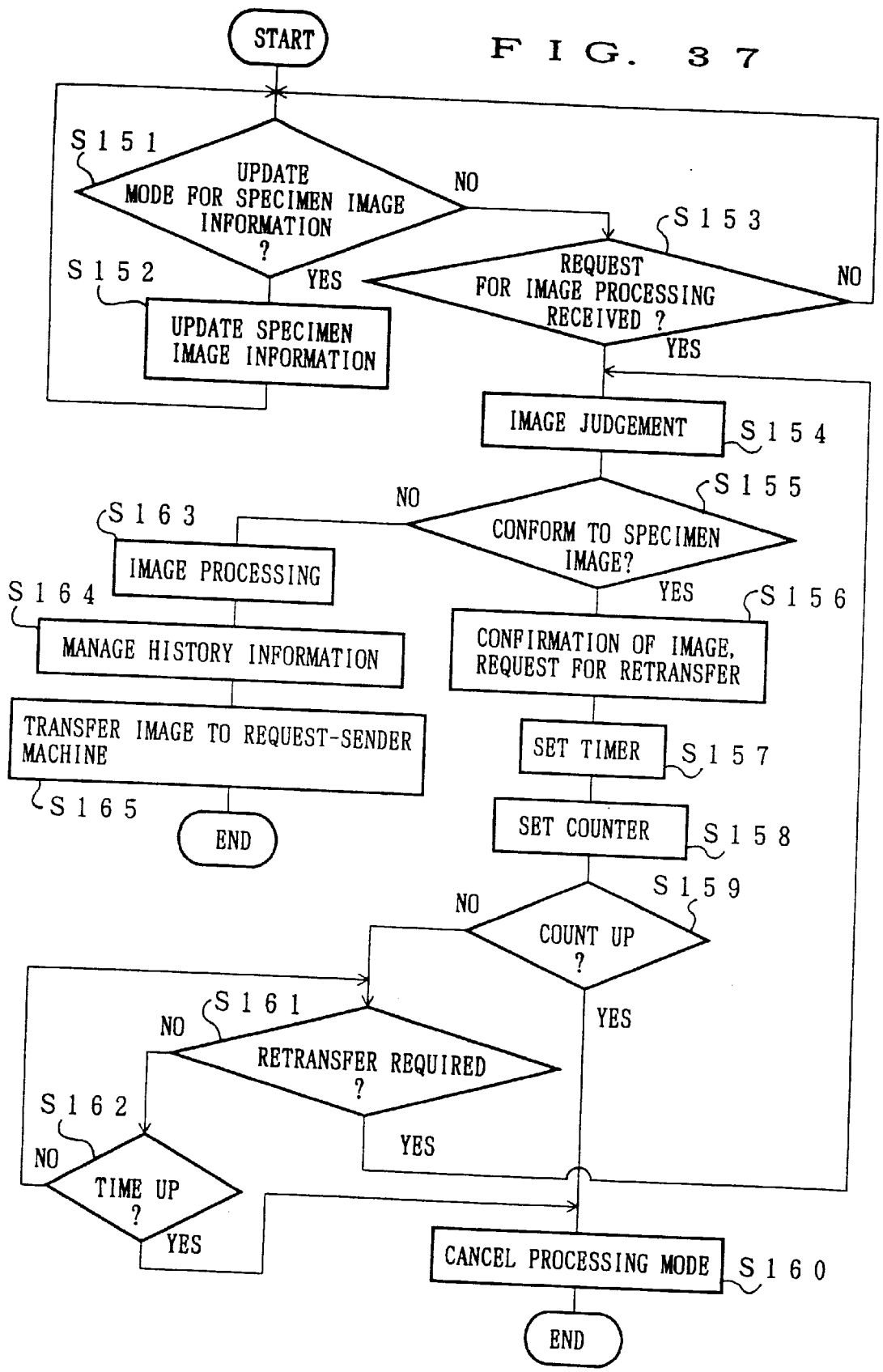

FIG. 39 (a)

THE COPYING OF THE READ IMAGE IS PROHIBITED UNDER LAW.
COPYING OPERATION IS STOPPED.

CONFIRM

FIG. 39 (b)

THE COPYING OF THE READ IMAGE MAY BE PROHIBITED UNDER LAW.
COPY WILL BE MADE WITH A LOWER IMAGE QUALITY.

CONFIRM

FIG. 39 (c)

THE COPYING OF THE READ IMAGE MAY BE PROHIBITED UNDER LAW.
SHALL THE COPYING BE COMPLETED?

YES    NO

IMAGE FORMING APPARATUS HAVING A SPECIMEN IMAGE JUDGING SECTION AND AN IMAGE INFORMATION SUITABILITY JUDGING SECTION

FIELD OF THE INVENTION

The present invention relates to an image forming system comprising an image processing apparatus furnished with an image processing function for image information, such as a computer, and an image forming apparatus for printing out the image information, such as a digital copying machine, wherein the image processing apparatus and image forming apparatus are connected to each other through a transferring device to transfer the image information mutually via a communication line or the like

BACKGROUND OF THE INVENTION

A digital copying machine, which is an example of a commercialized image forming apparatus, makes a copy of an original image in the following manner. Firstly, an image reading section reads an original image, secondly, an image processing section processes the read image in a specified manner, and finally, a recording section outputs information of the processed image on a sheet. In case the where a single digital copying machine is used, only the pre-installed image processing functions are available to form an image on a sheet.

On the other hand, an idea of forming a network by interconnecting a plurality of image recording apparatuses or the like has been proposed recently. For example, Japanese Laid-Open Patent Application No. 116834/1978 (Tokukaisho No. 53-116834) discloses an arrangement to interconnect a plurality of image reading apparatuses and a plurality of image recording apparatuses through a single control section. This arrangement enables each image recording apparatus to print out the original image read by any of the image reading apparatuses. Thus, the idle time of the image recording apparatuses while replacing the original documents at the image reading apparatus can be reduced.

Also, Japanese Laid-open Patent Application No. 198958/1986 (Tokukaisho No. 61-198958) discloses an image forming system including a plurality of copying machines interconnected through a single control device, and each copying machine is furnished with an image read section and an image record section. In this image forming system, image signals to be recorded are distributed to more than one copying machine furnished with a specific image copying mode the user wishes to use, and all the copying machines that received the image signals carry out the copying job in parallel.

Also, Japanese Laid-open Patent Application No. 285977/1989 (Tokukaihei 1-285977) discloses an image forming system, in which an image processing section is furnished with judging means for judging whether the image information read by an image read section can be copied or not, in other words, whether the copying of the subject image information is prohibited or not. In short, this image forming system is furnished with a function to control the copy output job of the original image based on the output from the judging means.

However, the above conventional image forming systems have the following problem.

Each image processing function of the digital copying machine depends on software programs which have been developed at an increasing pace. Thus, the image processing function is upgraded in a short period and new models with additional functions have been steadily commercialized. Therefore, the state-of-the-art digital copying machine with the desired image processing functions becomes an outdated, relatively low-level model soon after the user purchases it.

Because the user can neither upgrade the functions pre-installed in his digital copying machine nor simply add new functions, he has to purchase a new model if he wants higher level or new functions. This is an economic burden to the user and a manufacturers' problem conflicting with their efforts in trying to always meet users' demands.

SUMMARY OF THE INVENTION

It is therefore an object of the present invention to provide an image forming system which can (1) adopt a higher function or a newly developed image processing function without replacing the existing image forming apparatuses, and (2) prevent a crime, such as forgery of paper money or securities, through an inexpensive arrangement.

To fulfill the above object, an image forming system of the present invention is furnished with at least one image forming apparatus and at least one image processing apparatus, and a transferring device for transferring information between the image forming apparatus and the image processing apparatus through mutual communication, and arranged in such a manner that, (1) the image forming apparatus includes:
- an image recording section for forming a visible image based on image information;
- an input section through which a command related to image processing is inputted; and
- a control section for outputting the image information to the image processing apparatus upon input of a command requesting the image processing apparatus to carry out the image processing on behalf of the image forming apparatus through the input section, the control section also for supplying processed image information obtained by the image processing apparatus to the image recording section, and (2) the image processing apparatus includes:
- an image processing section for carrying out certain image processing with the image information inputted through the transferring device, the image processing section also for outputting the processed image information to the image forming apparatus which has outputted the command; and
- a specimen image judging section for judging whether the image information inputted through the transferring device is image information of any of registered specimen images, and
- that the image processing apparatus sends information conveying a judging result to the image forming apparatus through the transferring device when the specimen image judging section judges that the image information inputted through the transferring device is the image information of one of the registered specimen images.

According to the above arrangement, as soon as the user enters a command related to the image processing into the image forming apparatus through the input section, the control section outputs the image information read by, for example, an image reading section provided to the image forming apparatus, to the image processing apparatus through the transferring device. The image processing apparatus carries out certain image processing with the input image information, and outputs the resulting processed image information to the image forming apparatus through the transferring device. Upon input of the processed image information, the control section of the image forming apparatus supplies the same to the image recording section, which forms a visible image based on the processed image information.

Here, the specimen image judging section of the image processing apparatus judges whether the subject image information is the image information of any of the registered specimen images. When it turns out that the subject image information is the image information of one of the registered specimen images, the image processing apparatus sends the information indicating so to the image forming apparatus through the transferring device.

Since the image forming apparatus can request the image processing apparatus to carry out the image processing on its behalf in the above arrangement, when more than one image forming apparatus is connected to the image processing apparatus through the transferring device, each image forming apparatus does not have to include all kinds of image processing functions. Thus, if a higher or new image processing function has been developed and is not installed in any of the image forming apparatus within the system yet, the user does not have to replace the existing image forming apparatuses with new models. Rather, the user has to install the higher or new image processing function in the image processing apparatus alone when he wishes to use such an image processing function. Consequently, an economic burden imposed on the users of the image forming apparatuses can be reduced.

Further, the above arrangement makes it possible to discover whether the subject image information is the image information of any of the registered specimen images, such as paper money, at the image forming apparatus that has outputted the command requesting to carry out the image processing on its behalf. Consequently, a crime, such as forgery of paper money or securities, can be prevented. Moreover, if such a judging function is installed in the image processing apparatus, each image processing apparatus connected to the same does not have to include the judging function, thereby reducing a cost increase of the image forming apparatuses.

For a fuller understanding of the nature and advantages of the invention, reference should be made to the ensuing detailed description taken in conjunction with the accompanying drawings.

BRIEF DESCRIPTION OF THE DRAWINGS

FIG. 5 is a front view showing a control panel provided to the digital copying machine of FIG. 2;

FIG. 6(a) is a view explaining a basic screen displayed on a liquid crystal display device of the control panel in FIG. 5;

FIG. 6(b) is a view explaining a first function setting screen displayed on the liquid crystal display device of the control panel in FIG. 5;

FIG. 6(c) is a view explaining a second function setting screen displayed on the liquid crystal display device of the control panel in FIG. 5;

FIG. 7(a) is a view explaining an image quality setting screen displayed on the liquid crystal display device of the control panel in FIG. 5;

FIG. 7(b) is a view explaining a post-processing operation setting screen displayed on the liquid crystal display device of the control panel in FIG. 5;

FIG. 8(a) is a view explaining an initial setting screen displayed on the liquid crystal display device of the control panel in FIG. 5;

FIG. 8(b) is a view explaining a finger print registration screen displayed on the liquid crystal display device of the control panel in FIG. 5;

FIG. 8(c) is a view explaining a department management setting screen displayed on the liquid crystal display device of the control panel in FIG. 5;

FIG. 9(a) is a view explaining a limiter setting screen displayed on the liquid crystal display device of the control panel in FIG. 5;

FIG. 9(b) is a view explaining a simulation screen displayed on the liquid crystal display device of the control panel in FIG. 5;

FIG. 17 is a view explaining a display state of the liquid crystal display device when a help key shown in FIG. 16 is turned on;

FIG. 18 is a view explaining a display state of the liquid crystal display device when a host's all function display key shown in FIG. 16 is turned on;

FIG. 19 is a flowchart detailing an operation of the host computer in a service center when providing a regular information service to machines in the office in the image forming system of FIG. 11;

FIG. 20 is a flowchart detailing an operation of the host computer in the service center when providing an optional information service to the machines in the office in the image forming system of FIG. 11;

FIG. 22(a) is a view explaining a display state of the liquid crystal display device when a memory of the digital copying machine has stored the data to its full capacity during the operation in FIG. 21;

FIG. 22(b) is a view explaining a display state of the liquid crystal display device when an external memory select key shown in FIG. 22(a) is turned on;

FIG. 22(c) is a view explaining a display state of the liquid crystal display device when a continue key shown in FIG. 22(b) is turned on;

FIG. 25 is a view explaining a display state of the liquid crystal display device when the auto-selection mode set key shown in FIG. 24 is turned on;

FIG. 28(a) is a view explaining a display state of the liquid crystal display device associated with the operation in S121 in FIG. 27;

FIG. 28(b) is a view explaining a display state of the above liquid crystal display device when a rescan key shown in FIG. 28(a) is turned on;

FIG. 28(c) is a view explaining a display state of the above liquid crystal display device when a pre-view key shown in FIG. 28(a) is turned on;

FIG. 29 is a view explaining an example invoice transmitted to a digital copying machine from a host computer in an image forming system in accordance with Embodiment 5 of the present invention;

FIG. 30 is a view explaining a display state of the utilization information set forth in the invoice in FIG. 29 displayed on the liquid crystal display device of the digital copying machine;

FIG. 31 is a view explaining an example management table, through which the host computer manages the utilization information of each digital copying machine to transmit the invoice shown in FIG. 29;

FIG. 33 is a flowchart detailing an operation of the digital copying machine when automatically printing out the information received from the host computer during the operation in FIG. 32;

FIG. 34 is a view explaining a state where the information stored in the digital copying machine and the information received from the host computer are synthesized and displayed on the liquid crystal display device of the digital copying machine;

FIG. 35 is a view explaining a state after the display information in FIG. 34 is printed out;

FIG. 36 is a flowchart detailing an operation of a digital copying machine in an image forming system in accordance with Embodiment 6 of the present invention;

FIG. 37 is a flowchart detailing an operation of a host computer in response to the operation of the digital copying machine in FIG. 36;

FIGS. 39(a)–39(c) are views of a display state of the liquid crystal display when copying of an original image is prohibited;

DESCRIPTION OF THE EMBODIMENTS

EMBODIMENT 1

The following description will describe Embodiment 1 of the present invention.

An image forming system of the present embodiment (hereinafter, referred to as the present image forming system) comprises an image processing apparatus and a digital copying machine serving as an image forming apparatus, which are connected to each other through a transferring device serving as digital image information transmitting means.

Figure 2:
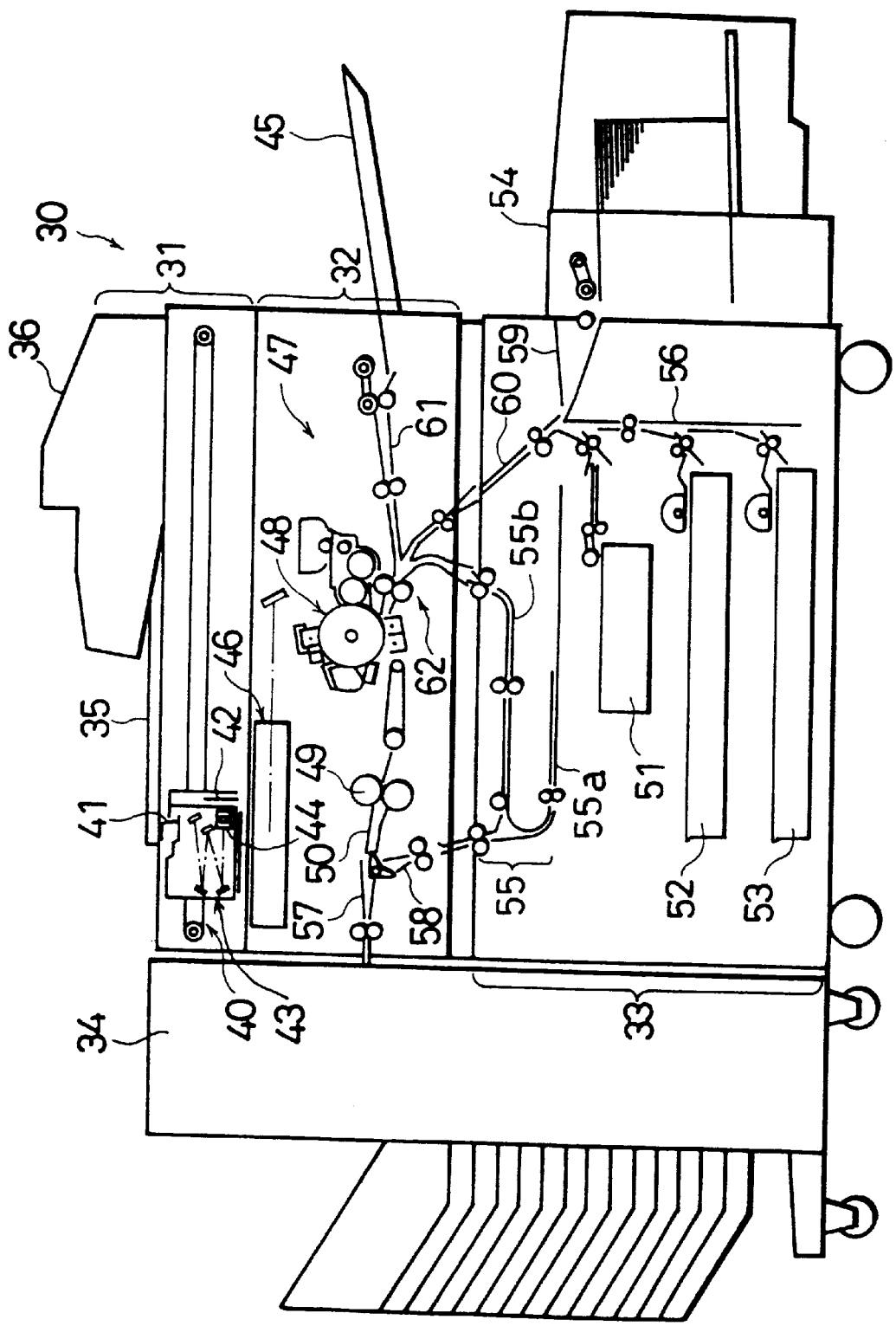
FIG. 2 is view explaining an entire arrangement of an example of digital copying machine in the image forming system of Embodiment 1.

FIG. 2 is a view explaining an entire structure of a digital copying machine 30 as an example of the above digital copying machine. As shown in FIG. 2, the digital copying machine 30 includes a scanner section 31, a laser printer section 32 serving as an image recording section, a multi-stage sheet feeding unit 33, and a post-processing operation device 34 having a sorter.

The scanner section 31 includes a document table 35 made of transparent glass, an RADF (Recirculating Automatic Document Feeder) 36 for automatically feeding a document to the document table 35, and an original image read unit, that is, a scanner unit 40 for reading an original image of a document placed on the document table 35 through scanning. The original image read by the scanner section 31 is sent to an image processing section in the form of image information, which is used as an equivalent to image data herein, and processed in a specified manner. The image processing section will be described in detail below.

The multi-stage sheet feeding unit 33 includes a first cassette 51, a second cassette 52, and a third cassette 53, and may optionally include a fourth cassette 54.

Each of the cassettes 51–54 of the multi-stage sheet feeding unit 33 contains a pile of sheets in different sizes. When the user selects the cassette containing the sheets of a desired size, the sheets are steadily fed to the laser printer section 32 one by one from the top of the pile in the selected cassette.

The RADF 36 is a device for automatically feeding a multi-page document placed on an attached document tray to the document table 35 in the scanner section 31 per page. The RADF 36 includes a transportation path for a one-side document and a transportation path for a two-side document as well as transportation path switching mechanism, so that the scanner unit 40 can read either side or both sides of the document at the user's choice.

The scanner unit 40 includes a lamp reflector assembly 41, a CCD (Charge-Coupled Device) 42, a series of reflecting mirrors 43, and a lens 44. The lamp reflector assembly 41 scans the document on the document table 35 by irradiating light on the document surface. The CCD 42 is an element that converts an image of reflected light from the document into an electric image signal. The reflecting mirrors 43 guide the image of the reflected light from the document to the CCD 42, and the lens 44 converges the reflected light from the document to form an image on the CCD 42. The scanner section 31 reads an original image to convert the same into image data by the link-up operation of the RADF 36 and scanner unit 40. More specifically, while the RADF 36 steadily feeds the document per page onto the document table 35, the scanner unit 40 reads the original image on each page by moving back and forth along the bottom surface of the document table 35.

Figure 3:
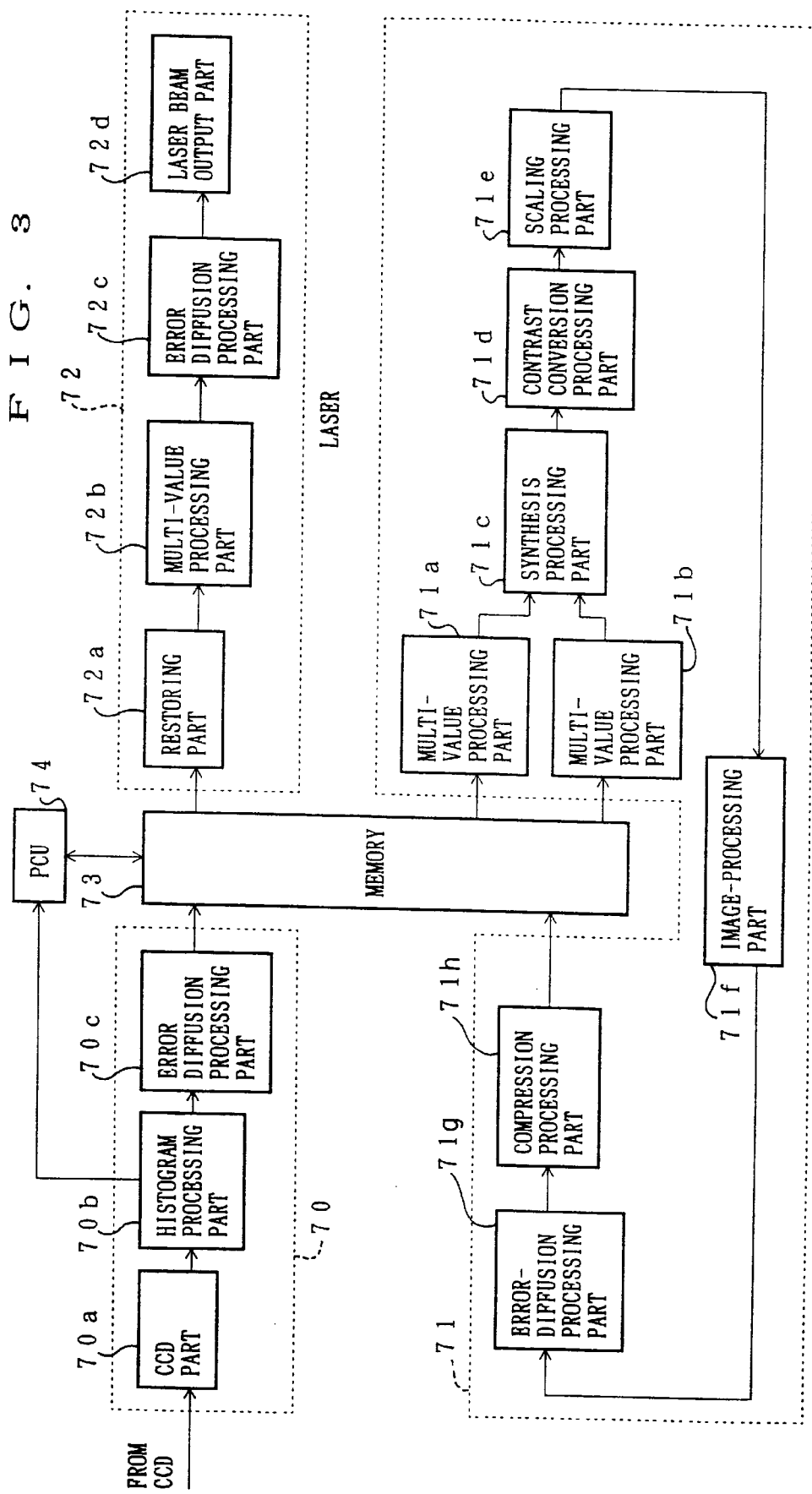
FIG. 3 is a block diagram depicting an arrangement of an image processing section in the digital copying machine of FIG. 2.

The image data obtained by the scanner unit 31 is sent to the image processing section for processing in various manners as specified, and the processed image data is temporarily stored in a memory 73 in the image processing section of FIG. 3. Subsequently, the image data is supplied to the laser printer section 32 at an output command, and recorded on a sheet in the form of an image.

The laser printer section 32 includes a manual document tray 45, a laser writing unit 46, and an electrophotographic processing portion 47 for forming an image. The laser writing unit 46 includes a semiconductor laser for emitting a laser beam in response to the image data from the memory 73, a polygonal mirror for deflecting the laser beam at an isometric speed, an f-θ lens for correcting the above deflected laser beam to be deflected at a constant velocity on a photosensitive drum 48 of the electrophotographic processing portion 47, etc.

The electrophotographic processing portion 47 is arranged in a known manner, that is, the same includes a photosensitive drum 48, and around which a charger, a developer, a transferring unit, a separator, a cleaner, a fuser 49, etc. are provided. A transportation path 50 is formed in the downstream side of the fuser 49 with respect to a direction in which a sheet is transported to have an image formed thereon. The transportation path 50 branches into two paths: a transportation path 57 that communicates with the post-processing operation device 34 and a transportation path 58 that communicates with the multi-stage sheet feeding unit 33.

The multi-stage sheet feeding unit 33 includes a two-side unit 55 and a common transportation path 56. The two-side unit 55 includes a reverse transportation path 55a, and a two-side/synthesis transportation path 55b whose sheet inlet communicates with a sheet inlet/outlet of the reverse transportation path 55a. The reverse transportation path 55a is used to reverse the surface of a sheet, and the two-side/synthesis transportation path 55b guides a sheet transported through the transportation path 58 to the electrophotographic processing portion 47.

The common transportation path 56 sends a sheet fed from any of the first cassette 51, second cassette 52, and third cassette 53 to the electrophotographic processing portion 47. The common transportation path 56 extends toward the electrophotographic processing portion 47 and merges with a transportation path 59 extended from the fourth cassette 54 at some point, and the merged transportation path communicates with a transportation path 60. The transportation path 60 merges with the two-side/synthesis transportation path 55b and a transportation path 61 extended from the manual document tray 45 at a merging point 62, and further extends to an image forming position set in a space between the photosensitive drum 48 of the electrophotographic processing portion 47 and the transferring unit. The merging point 62 of the above three transportation paths is positioned near the electrophotographic processing portion 47.

In the laser printer section 32, the image data retrieved from the memory 73 are outputted from the laser writing unit 46 in the form of a laser beam to form an electrostatic latent image on the surface of the photosensitive drum 48 of the electrophotographic processing unit 47. Then, the electrostatic latent image is turned into a visible toner image, which is electrostatically transferred onto a sheet transported from the multi-stage sheet feeding unit 33, and fused thereon by the fuser 49. After the image is formed thereon, the sheet is sent to the post-processing operation device 34 from the fuser 49 through the transportation path 50, or returned to the electrophotographic processing portion 47 through the transportation paths 50 and 58 and the two-side unit 55.

Next, the image processing section of the digital copying machine 30 will be explained. The image processing section processes the image data of the document sent from the scanner unit 31. As shown in FIG. 3, the image processing section includes an image data input portion 70, an image data processing portion 71, an image data output portion 72, the above-mentioned memory 73 serving as a storage section, and a print control unit (hereinafter, referred to as PCU) 74 serving as a control section.

The digital copying machine 30 is under the control of the PCU 74 which is composed of a CPU (Central Processing Unit). The memory 73 is composed of a RAM (Random Access Memory), a hard disk, etc., to store the image data.

The image data input portion 70 includes a CCD part 70a, a histogram processing part 70b, and an error diffusion processing part 70c. The image data input portion 70 converts the image data of the original image read by the CCD 42 into binary data, and makes a histogram of digital amount of the binary data to process the image data through the error diffusing method. The resulting data are stored into the memory 73 temporarily.

The CCD part 70a converts an analog signal representing the contrast of each pixel in the image data into a digital signal, after which it carries out an MTF (Modulation Transfer Function) correction, a black-and-white correction, or a gamma correction on the digital signal. Then, the CCD part 70a outputs the resulting 256-level (8-bit) digital signal to the histogram processing part 70b.

The histogram processing part 70b produces contrast data (histogram data) by adding up the digital signal outputted from the CCD part 70a separately in the 256-level pixel contrast. The histogram data thus obtained are sent to the error diffusion processing part 70c as pixel data, or to the PCU 74 when the occasion demands.

The error diffusion processing part 70c adopts the error diffusing method known as a method of pseudo-half-tone processing. To be more specific, an error caused by converting a pixel into binary data is reflected when converting the adjacent pixels into binary data. Thus, an 8-bit/pixel digital signal outputted from the CCD part 70a is converted into 1-bit (binary data) digital signal and a redistribution computation is carried out to make a copy image rendering the contrast as true as to an original in any specific region.

The image data processing portion 71 includes multi-value processing parts 71a and 71b, a synthesis processing part 71c, a contrast conversion processing part 71d, a scaling processing part 71e, an image processing part 71f, an error diffusion processing part 71g, and a compression processing part 71h. The image data processing portion 71 is a processing portion that converts input image data into image data in a manner the user desires. In other words, the image data processing portion 71 keeps processing the input image data until the final output image data are obtained and subsequently stored into the memory 73. Note that, however, the aforementioned processing parts in the image data processing portion 71 are arranged to operate separately only when the occasion demands.

The multi-value processing parts 71a and 71b convert the binary image data from the error diffusion processing part 70c into the original 256-level data. The synthesis processing part 71c carries out a logical computation for every pixel, in other words, it selectively computes an OR, an AND, and an exclusive-OR. The data subject to the logical computation are the image data stored in the memory 73 and bit data from a pattern generator (PG).

The contrast conversion processing part 71d sets an arbitrary relationship between the input contrast and output contrast for the 256-level data based on a predetermined level converting table. The scale processing part 71e carries out interpolation processing for a designated magnification based on the input data to compute the pixel data (contrast value) of the subject pixel after the scaling. Subsequently, the image data are scaled in the sub-scanning direction first, and thence in the main scanning direction based on the pixel data thus computed.

The image processing part 71f processes the input image data in various manners, and collects information related to a data row to extract the feature and the like. The error diffusion processing part 71g operates in the same manner as the error diffusion processing part 70c in the image data input portion 70. The compression processing part 71h compresses the binary data by a coding method known as the run-length. Note that the compression processing part 71h is activated in the final processing loop after the final output image data are assembled.

The image data output portion 72 includes a restoring part 72a, a multi-value processing part 72b, an error diffusion processing part 72c, and a laser beam output part 72d. The image data output portion 72 restores the compressed image data stored in the memory 73 to the original 256-level data, and diffuses the error in quaternary data which, when formed into an image, renders a smoother half-tone representation than the one formed by the binary data, after which the image data output portion 72 transfers the resulting image data to the laser beam output part 72d.

The restoring part 72a restores the image data compressed by the compression processing part 71h. The multi-value processing part 72b operates in the same manner as the multi-value processing parts 71a and 71b in the image data processing portion 71. Likewise, the error diffusion processing part 72c operates in the same manner as the error diffusion processing part 70c in the image data input portion 70.

The laser beam output part 72d converts the digital image data into a laser ON/OFF signal based on a control signal from an unillustrated sequence controller. The semiconductor laser in the laser writing unit 46 comes on or goes off based on the above ON/OFF signal, whereby an electrostatic latent image is written on the photosensitive drum 48.

The data processed by the image data input portion 70 and image data output portion 72 are, as a general rule, stored in the memory 73 in the form of binary data to reduce an occupied space. However, the data may be stored in the form of quaternary data to maintain the quality.

Figure 4:
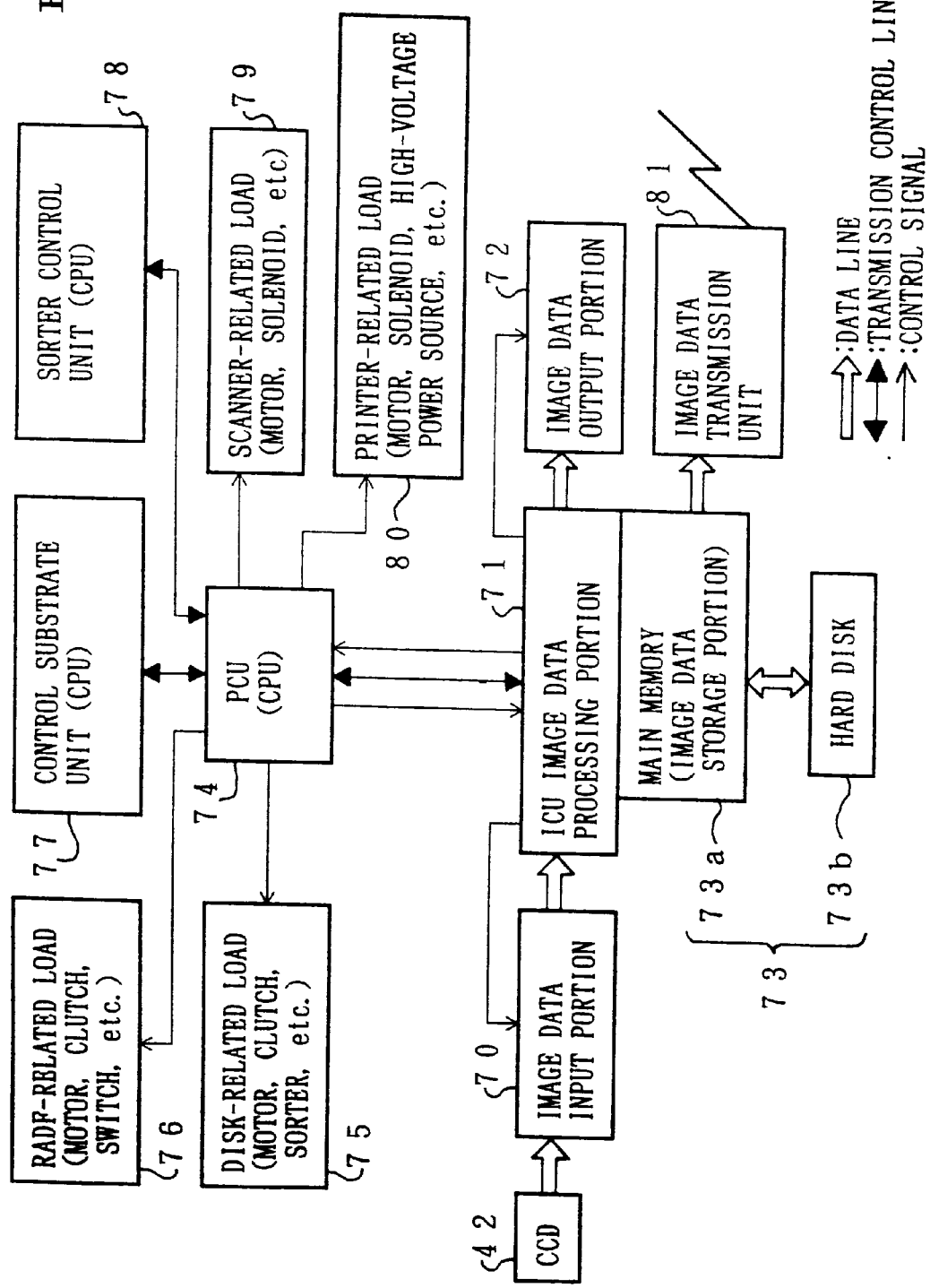
FIG. 4 is a block diagram depicting an arrangement of a control mechanism of the digital copying machine of FIG. 2.

As previously mentioned, the PCU 74 controls the overall operation of the digital copying machine 30, and the control mechanism of the PCU 74 is illustrated in FIG. 4.

As shown in FIG. 4, the PCU 74 is connected to a disk-related load 75, an RADF-related load 76, a control board unit 77, a sorter control unit 78, a scanner-related load 79, a printer-related load 80, and the above-mentioned image data processing portion 71.

The PCU 74 manages the foregoing components separately through the sequence control by outputting a control signal to each. The disk-related load 75 is a load of the components other than the digital copying machine 30 main body, that is, a load of the multi-stage sheet feeding unit 33 and a load of the motor of the sorter in the post-processing operation device 34, a clutch, etc. The RADF-related load 76 is a load of the motor, clutch, switch, etc. of the RADF 36. The scanner-related load 79 is a load of the motor, solenoid, etc. of the scanner unit 40. The printer-related load 80 is a load of the motor, solenoid, high-voltage power source, etc. of the electrophotographic processing portion 47. The sorter control unit 78 includes a CPU and controls the operation of the sorter based on a control signal from the PCU 74.

The control board unit 77 is an input section including a CPU, through which the user sets a copying mode and the like or enters a command in the digital copying machine 30. The control board unit 77 transfers a control signal to the PCU 74 in response to the user's input action. For example, when the user sets a copying mode, the PCU 74 controls the digital copying machine 30 to operate in the set mode using the above control signal. On the other hand, the PCU 74 transfers a control signal indicating the operating condition of the digital copying machine 30 to the control board unit 77. The control board unit 77 displays the current operating condition of the digital copying machine 30 on the display portion in response to the above control signal, thereby enabling the user to confirm the current operating condition.

The memory 73, connected to the image data processing portion 71, is composed of a primary memory 73a made of, for example, a semiconductor memory, and a hard disk 73b. An image data transmitting unit 81, connected to the primary memory 73a, is provided to allow the mutual transmission of information, such as the image data and image control signal, between the digital copying machine 30 and the other digital data apparatuses. The image data transmitting unit 81 corresponds, for example, an interface 93a of a digital copying machine 93, or the interface 93a and a modem 98 in FIG. 11.

The control board unit 77 includes a control panel 90 serving as an input section shown in FIG. 5. The control panel 90 includes a liquid crystal display device 1 at the center which is in effect a touch panel type display portion. A screen switch command area 1a is formed in a part of the screen of the liquid crystal display device 1. The screen switch command area 1a is provided to enable the user to input a command to switch a display screen to a screen for selecting an image edit function he wishes to use. Although it will be described in detail below, when the user directly presses the screen switch command area 1a with his finger, a list of edit functions is displayed on the screen of the liquid crystal display device 1 to enable the user to select his desired edit function. In other words, the user only has to press the corresponding region on the display area with his finger to set his desired edit function.

As shown in FIG. 5, the control panel 90 includes a dial 2 at the left edge for controlling the brightness of the screen of the liquid crystal display device 1. A magnification auto-set key 3, a set of zoom keys 4, two fixed magnification keys 5 and 6, and an original size key 7 are provided between the dial 2 and liquid crystal display device 1. The user presses the magnification auto-set key 3 when he wishes to set the digital copying machine 30 into a mode in which an adequate copy magnification is automatically selected. Also, the user presses either zoom key 4 when he wishes to increase or decrease a copy magnification per 1%. The user presses the fixed magnification key 5 or 6 when he wishes to select a fixed magnification, and the original size key 7 when he wishes to reset a current copy magnification to the standard magnification (original size).

As shown in FIG. 5, the liquid crystal display device 1 also includes a set of copy quantity keys 13, a clear key 14, a start key 15, an all clear key 16, an interruption key 17, a manipulation guide key 18, a message advancing key 19, a memory transmitting mode key 20, a copy/facsimile switching key 21, and a set of one-touch dial keys 22 in the right side.

The user presses the copy quantity key(s) 13 when he sets a desired copy quantity, and the clear key 14 when he wishes to reset the copy quantity or stop the continuous copying operation. The user presses the start key 15 to start the copying operation, and the all clear key 16 when he wishes to reset all the set modes to standard. The user presses the interruption key 17 when he wishes to make a copy while a continuous copying operation is being carried out, and the manipulation guide key 18 when he needs some help in manipulating the digital copying machine 30. When the manipulation guide key 18 is pressed, the manipulation instructions of the digital copying machine 30 are displayed on the liquid crystal display device 1. The user presses the message advancing key 19 when he wishes to advance the messages displayed in response to the user's pressing action of the manipulation guide key 18.

The memory transmitting mode key 20, copy/facsimile mode switching key 21, and one-touch dial keys 22 are the set keys related to a facsimile mode. When the user presses the memory transmitting mode key 20, the document is read into the memory and the stored document data is transmitted to a correspondent. The user presses the copy/facsimile mode switching key 21 when he wishes to switch the digital copying machine 30 from the copy mode to the facsimile mode and v ice versa. Each one-touch dial key 22 is arranged to remember a facsimile/telephone number, so that the user can send data to a desired correspondent through a facsimile transmission or call up the correspondent by a one-touch manipulating action.

The above is an example arrangement of the control panel 90 as to the kinds and alignment of the keys, and the control panel 90 may be modified depending on the model of its own digital copying machine 30.

The above liquid crystal display device 1 can display, for example, a basic screen of FIG. 6(*a*), a first function setting screen of FIG. 6(*b*), a second function setting screen of FIG. 6(*c*), an image quality setting screen of FIG. 7(*a*), a post-processing operation setting screen of FIG. 7(*b*), an initial setting screen of FIG. 8(*a*), a finger print registration screen of FIG. 8(*b*), a department management setting screen of FIG. 8(*c*), a limiter setting screen of FIG. 9(*a*), and a simulation screen of FIG. 9(*b*), as well as the other screens explained below.

The basic screen includes a function setting area, an image quality setting area, a post-processing operation setting area, an initial setting area, a set function confirmation manipulation area, and a cassette setting area, which correspond to set keys 101*a*–101*f*, respectively. The basic screen also displays the cassette, contrast, copy quantity, and magnification the user has set. When the user manipulates the set function confirmation manipulation area, all the functions currently set in the present image forming system are displayed on the liquid crystal display device 1.

The first function setting screen includes six areas for setting edit functions: mirror image, italic, inverse, shadow, trimming, and masking, which correspond to set keys 102*a*–102*f*, respectively. Further, the first function setting screen includes a basic screen key for returning to the basic screen and a next page key for switching to the second function setting screen.

The second function setting screen includes three areas: a synthesis function, an independent scaling function, and a translation function, which correspond to set keys 103*a*–103*c*, respectively. Also, the second function setting screen includes a basic screen key for returning to the basic screen and a previous page key for returning to the previous screen.

The image quality setting screen includes eight areas for setting the contrast, HI-FI mode (high-quality copying mode), background elimination mode, auto-scaling mode, text mode, text-picture mix mode, picture mode, and magnification. Further, the image quality setting screen diplays the contrast and magnification that have been set.

The post-processing operation setting screen includes an input area for specifying whether the document is one-sided or two-sided, another input area for specifying whether a copy is one-sided or two-sided, and an area for setting a bookbinding function. The post-processing operation setting screen further includes three areas for setting post-processing functions, namely, staple sorter, sorter, and finishing, as well as an area for setting the electronic RDH (Recycle Document Handler) function. When the electronic RDH function is set, an electronic RDH processing (retrieving the document data from the memory) is carried out.

The initial setting screen includes six mode setting areas: a finger print registration mode, a department management mode, a simulation mode, a maintenance management mode, a new function registration mode, and an output device selection mode. In addition, the initial setting screen includes a control area for returning to the basic screen.

The finger print register screen includes two input areas for inputting a department code and an individual's name, respectively. As soon as the user inputs the department code and individual's name, the input data are displayed in their respective input areas.

Figure 10:
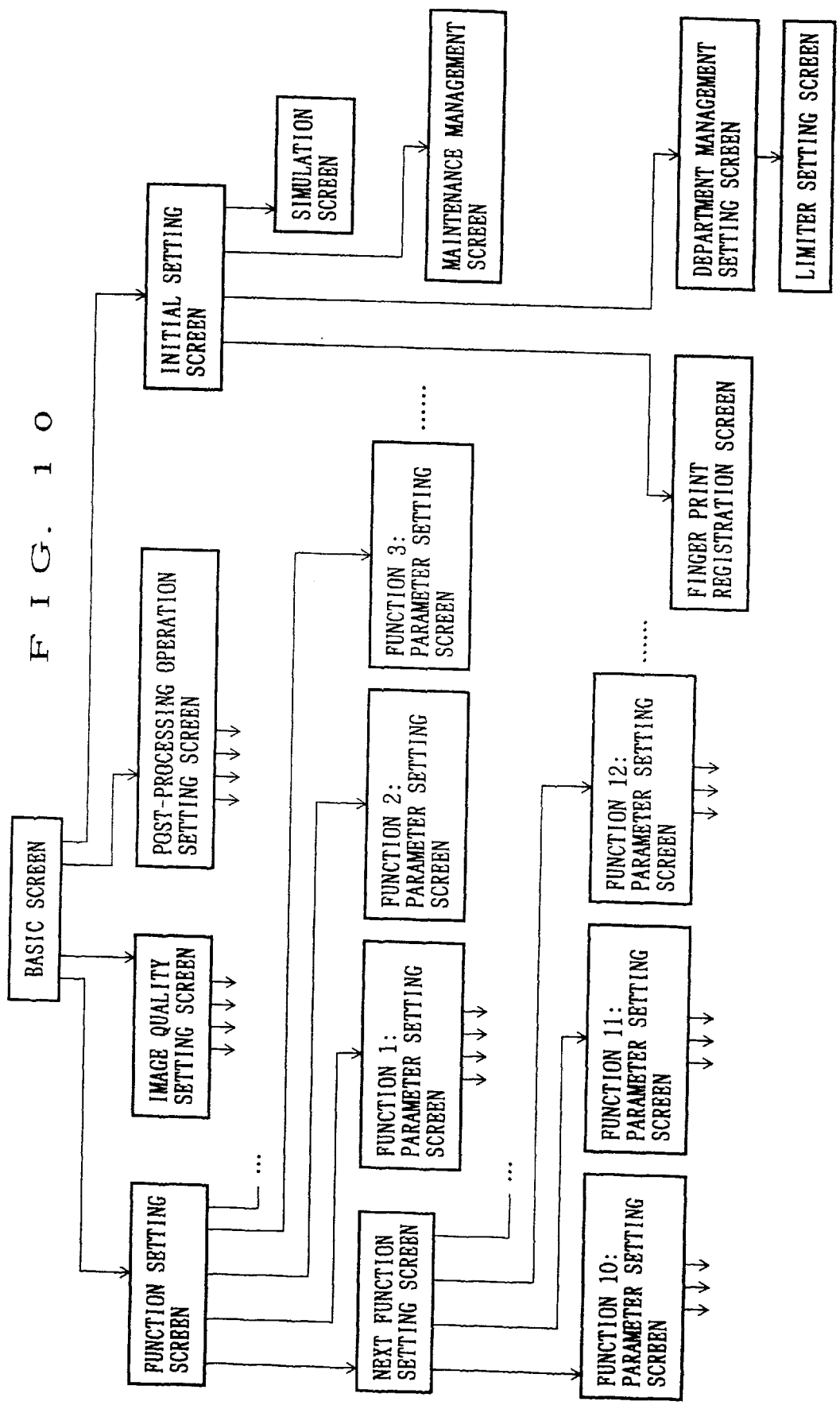
FIG. 10 is a diagram of the screens displayed on the liquid crystal display device of the control panel in FIG. 5.
Figure 12:
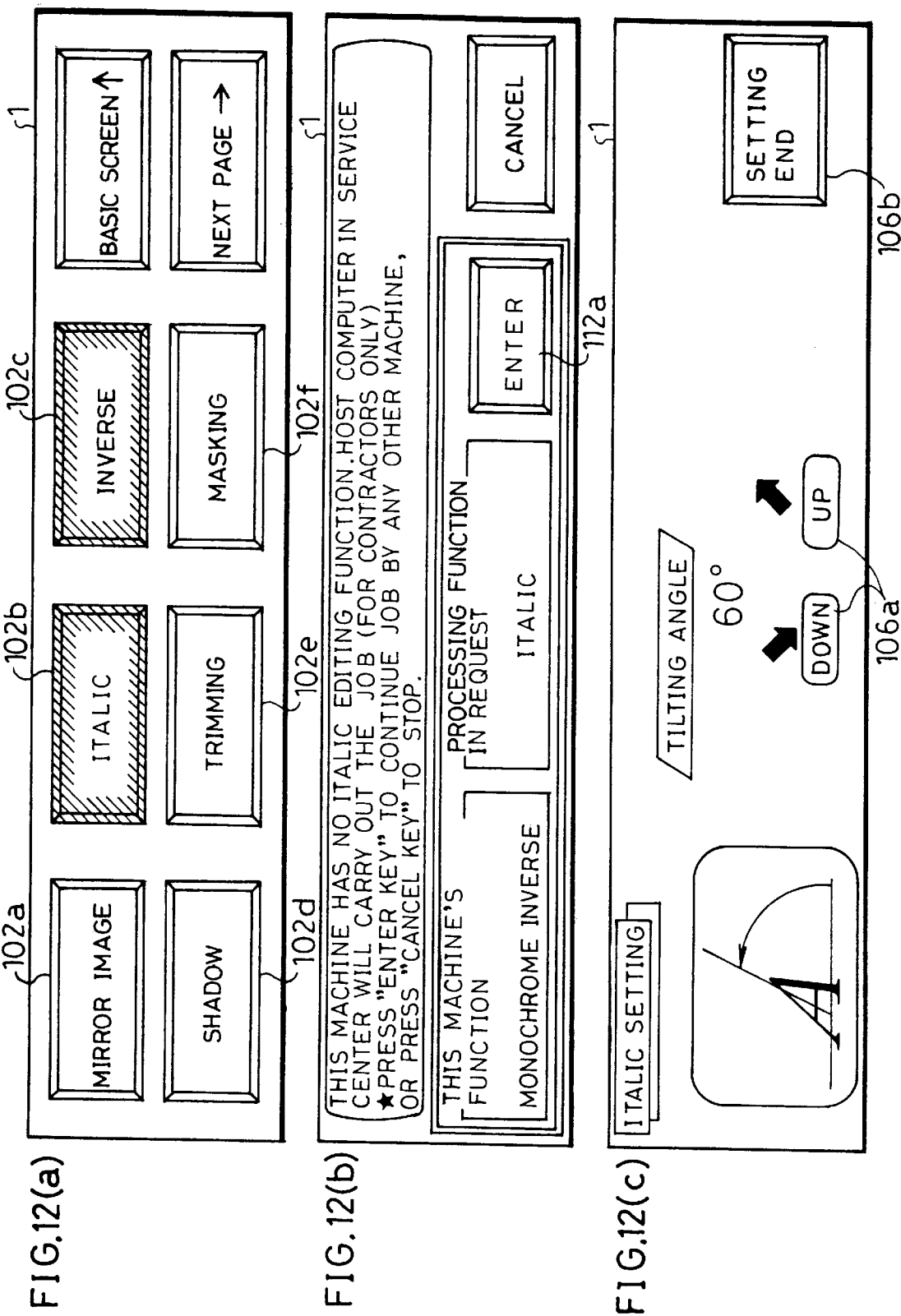
FIG. 12(a) is a view explaining the first function setting screen of FIG. 6(b) after the user selected image edit functions he wishes to use.
FIG. 12(b) is a view explaining a display state of the liquid crystal display associated with an operation in S4 of FIG. 1.
FIG. 12(c) is a view explaining an italic setting screen displayed on the liquid crystal display device of the control panel in FIG. 5.

The foregoing screens switches as shown by the diagram of FIG. 10. To begin with, the liquid crystal display device 1 displays the basic screen, and as soon as the user presses one of the function set area, image-quality set area, post-processing operation set area, and initial set area, the basic screen switches to the screen corresponding to the pressed area. For example, if the user presses the function set area, the basic screen switches to the first function setting screen. Further, if the user presses the set area for the next page, the first function setting screen switches to the second function setting screen (NEXT FUNCTION SETTING SCREEN). On the other hand, if the user presses the set area for the basic screen, the first function setting screen returns to the basic screen. If the user presses the italic function set area on the first function setting screen, the first function setting screen switches to the italic setting screen of FIG. 12(*c*), which corresponds to FUNCTION 2: PARAMETER SETTING SCREEN of FIG. 10, for example. The italic setting screen includes a tilting angle input key 106a as a tiling angle setting area, and a setting end key 106b as a setting end input area. Further, the italic setting screen displays the set tilting angle.

Note that as soon as the user presses any function setting area in the first or second function setting screen, the screen of the liquid crystal display device 1 switches to a corresponding parameter setting screen, such as the above italic setting screen.

Example image edit functions available in the present image forming system by manipulating the setting areas as explained above and the effect of each are set forth in Table 1 below. Note that, however, the image edit functions are not limited to the examples specified below, and a function for making fair copies of handwritten characters and/or pictures is also a possible option.

copying machine 91 includes the scanner unit 40 of FIG. 2 with the resolution of 400DPI in monochrome, and has a relatively low operating rate of 20CPM (Copies Per Minute). The laser printer section 32 of the digital copying machine 91 has also a resolution of 400DPI in monochrome. Further, the digital copying machine 91 includes an interface (I/F) 91a.

The digital copying machine 92 is a middle-grade model whose scanner and printer have a resolution of 400DPI in monochrome, respectively, with an operating rate of 40CPM. The digital copying machine 92 is provided with various kinds of edit functions, a 64M-byte memory (capable of storing up to four Japanese Standard A4 size sheets at the resolution of 400DPI, 8-bit/pixel), and an interface 92a. The above memory corresponds to the primary memory 73a in FIG. 4.

TABLE 1

| IMAGE EDIT FUNCTION | EFFECT |
| --- | --- |
| INDEPENDENT SCALING | SET MAGNIFICATION IN LATERAL AND LONGITUDINAL DIRECTIONS INDEPENDENTLY |
| SHARPNESS | ADJUST IMAGE QUALITY OF A COPY |
| BINDING MARGIN | LEAVE AN ARBITRARY BINDING MARGIN |
| FRAME ELIMINATION | ELIMINATE FRAME IN A COPY |
| CENTERING | MAKE A COPY AT THE CENTER OF A SHEET |
| 1-SET-2-COPY | MAKE A COPY OF A BOOK |
| ADDRESSED COPY | SYNTHESIZE AN ADDRESS WITH A COPY |
| MULTI-SHOT | COMBINE MULTIPLE PAGES IN ONE COPY |
| TRIMMING | TRIM OFF A NON-DESIGNATED AREA |
| MASKING | MASK A DESIGNATED AREA |
| MOVE | MOVE AN IMAGE TO AN ARBITRARY POSITION IN A COPY |
| SYNTHESIS | SYNTHESIZE MORE THAN ONE IMAGE |
| INVERSE | REVERSE NEGATIVE/POSITIVE IN A COPY |
| CROSSHATCH/SHADE | CROSSHATCH/SHADE AN IMAGE |
| SHADOW | ADD SHADOW TO AN IMAGE |
| OUTLINE | BORDER AN IMAGE |
| ITALIC | TILT AN IMAGE |
| MIRROR IMAGE | REVERSE AN IMAGE AS A MIRROR DOES |
| REPEAT COPY | MAKE MULTI-COPY OF AN IMAGE IN ONE SHEET |
| 2-IN-1-COPY | MAKE ONE COPY CUT CF TWO PAGES OF DOCUMENT |
| DATED COPY | ADD THE DATE TO A COPY |
| CENTER MARK | ADD A CENTER MARK TO A COPY |
| ENLARGE/DIVIDE OUTPUT | DIVIDE AN ENLARGED COPY INTO A NUMBER OF SHEETS |
| TRANSLATION | TRANSLATE A DOCUMENT |
| HIGH-QUALITY PROCESSING | MAKE A HIGH-QUALITY COPY |

Figure 11:
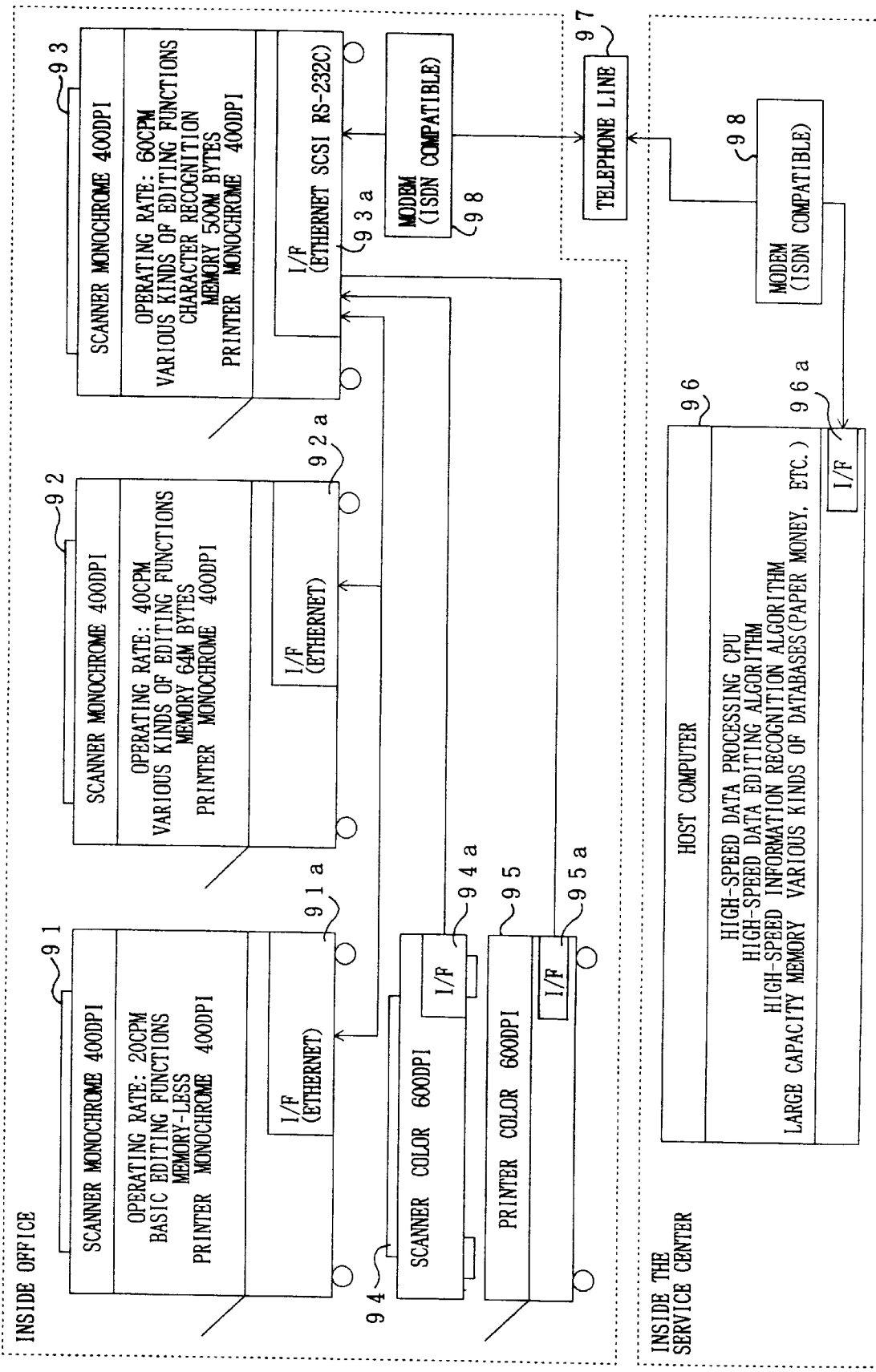
FIG. 11 is a block diagram showing a schematic arrangement of the image forming system in accordance with Embodiment 1 of the present invention.

As shown in FIG. 11, the present image forming system comprises three image forming apparatuses respectively denoted as digital copying machines 91–93, a scanner 94, and a printer 95 serving as an image forming apparatus installed in the office; and a large-scale host computer 96 installed in a service center outside of the office to serve as an image processing apparatus. The service center is a place where various kinds of information services including the high-quality image processing are provided. Basically, the digital copying machines 91–93 have the same arrangement as the above-explained digital copying machine 30, but each has different image processing functions either entirely or partially. The functions available on the digital copying machines 91–93 are those set forth in Table 1 above.

The digital copying machine 91 is an inexpensive, low-grade, "memoryless" model furnished with basic edit functions only. "Memoryless" referred herein means that the machine does not include a page memory capable of storing a great volume of image data, but includes at least a line memory which is sufficient to operate as a normal digital copying machine. Also, the basic edit functions referred herein means a function that can be carried out without using a page memory, such as the inverse function. The digital The digital copying machine 93 is a high-grade model whose scanner and printer have a resolution of 400DPI in monochrome with an operating rate as high as 60CPM. Further, the digital copying machine 93 includes various kinds of edit functions, a character recognition function, a bit data coding function, and a page memory of a capacity as large as 500M bytes (capable of storing up to 100 pages of Japanese standard A4 size sheets at the resolution of 400DPI, 8-bit/pixel at compression ratio of ¼). Thus, the digital copying machine 93 can change the page order of the image data, or store the document data in different formats. The above memory corresponds to the primary memory 73a and hard disk 73b of FIG. 4 combined. The digital copying machine 93 also includes an interface 93a. Also, the digital copying machines 91–93 are interconnected through an Ethernet which is a network permitting high-speed image data transmission. Further, the interface 93a can adopt a general standard known as SCSI (Small Computer System Interface) or RS-232C, so that the data can be transmitted to and from other data devices.

The scanner 94 can read a color image at a resolution of 600DPI. The printer 95 can produce a color image copy at a recording density of 600DPI. The scanner 94 and printer 95 are connected to the digital copying machine 93 through their respective interfaces 94a and 95a to enable the mutual data transmission with the digital copying machine 93.

The host computer 96 includes a high-speed data processing CPU, a high-speed data editing algorithm, a high-speed data recognizing algorithm, a large memory having a far larger capacity compared with the memory 73 of the digital copying machine 93, various kinds of databases for recognizing paper money and the like, and an interface 96a.

The digital copying machine 93 and host computer 96 are connected to each other through their respective interfaces 93a and 96a via a telephone line 97. Note that, however, the connecting member is not limited to the telephone line 97, and any other adequate transmission line, such as an optical fiber, will do. A general ISDN-capable modem (modulator) 98 is provided to each of the digital copying machine 93 side and host computer 96 side (ISDN represents Integrated Services Digital Network). The modem 98 converts a digitalized electric signal into a signal which can be transmitted through the telephone line 97. The modem 98 can adopt the PM (Phase Modulation), AM (Amplitude Modulation), FM (Frequency Modulation), or the like as the modulation method. Here, the interfaces 91a–96a, telephone line 97, and two modems 98 constitute transfer means.

The digital copying machines 91–93 and host computer 96 can mutually transmit various kinds of data through the telephone line 97. The data referred herein include control command codes, bit data like the image contrast data, etc. Each of the digital copying machines 91–93 includes a facsimile function, so that each can receive and transmit data through the telephone line 97. Also, each of the digital copying machines 91–93 includes a printer mode, so that each can print out document data sent from a personal computer or a word processor.

Only one office is connected to the service center in FIG. 11, but in practice, the offices of a number of users are connected to the service center throughout the country. The functions of the digital copying machine installed in the office depend on its price, memory capacity, and the like, and every office has different purpose and demand. Thus, the digital copying machines are not limited to the above example digital copying machines 91–93, and a great line-up of models are available.

The host computer 96 is provided to make the high-quality image processing functions including the image editing functions and high-speed image processing available, and furnished with at least the functions provided to a typical digital copying machine. However, the host computer 96 may omit too basic functions, such as those provided in an very inexpensive machine. In other words, only the functions suitable as those provided from the service center are installed in the host computer 96.

Also, new image processing functions have been steadily developed to meet the improvements of the infrastructure and job efficiency in the information society. Thus, newly developed functions are added to the host computer 96 or the functions with relatively low utilization are replaced with the newly developed functions to keep pace with the development of the image processing functions.

Here, example image edit functions that are installed in the above digital copying machines 91–93 and host computer 96 of the present embodiment are tabulated for ready comparison in Table 2 below.

TABLE 2

| IMAGE EDIT FUNCTION | 91 | 92 | 93 | HOST 96 |
|---|---|---|---|---|
| INDEPENDENT SCALING | o | o | o | o |
| SHARPNESS |  | o | o | o |
| BINDING MARGIN | o | o | o | o |
| FRAME ELIMINATION | o | o | o | o |
| CENTERING |  | o | o | o |
| 1-SET-2-COPY |  | o | o | o |
| ADDRESSED COPY |  |  | o | o |
| MULTI-SHOT |  | o | o | o |
| TRIMMING MASKING |  | o | o | o |
| MOVE |  | o | o | o |
| SYNTHESIS |  |  | o | o |
| INVERSE.CROSSHATCH/SHADE | o | o | o | o |
| SHADOW.OUTLINE |  |  | o | o |
| ITALIC.MIRROR IMAGE |  |  | o | o |
| REPEAT COPY | o | o | o | o |
| 2-IN-1-COPY |  |  | o | o |
| DATED COPY.CENTER MARK |  |  | o | o |
| ENLARGE/DIVIDE OUTPUT |  |  |  | o |
| TRANSLATION |  |  |  | o |
| HIGH-QUALITY PROCESSING |  |  |  | o |

The basic operation of the present image forming system arranged as above will be explained in the first place. As previously mentioned, the digital copying machines 91–93 in the office and the host computer 96 in the service center can mutually transmit the data through the telephone line 97. Thus, a digital signal transmitted from any of the digital copying machines 91–93 is modulated by the modem 98 in the digital copying machine 93 side and sent to the host computer 96 side through the telephone line 97, after which the modulated signal is de-modulated by the modem 98 in the host computer 96 side and entered into the host computer 96. The content of the digital signal includes the control command codes and bit data like the image contrast data. Thus, the host computer 96 analyzes the content of the control command codes and starts the image processing using the specified image editing function(s) for the subject image data. The image data processed by the host computer 96 is returned to the digital copying machine 93 in a reverse manner to that for an inbound transmission, and outputted onto a sheet as an image by the digital copying machine 93, for example.

As set forth in Table 2 above, the level of the image editing functions is higher in order of the digital copying machines 91, 92, and 93, while the host computer 96 has the image processing functions in the highest level. Thus, if the user wishes to use an image processing function which is not installed in any of the digital copying machines 91–93 in the office, or he can not use a desired image editing function because the capacity of the memory 73 in any of the digital copying machines 91–93 in the office is short, the image data is transferred from the office side to the service center side and processed in an adequate manner. Then, the processed image data is returned to the office side, so that an image done with the desired image processing can be outputted on a sheet in the office side.

Figure 1:
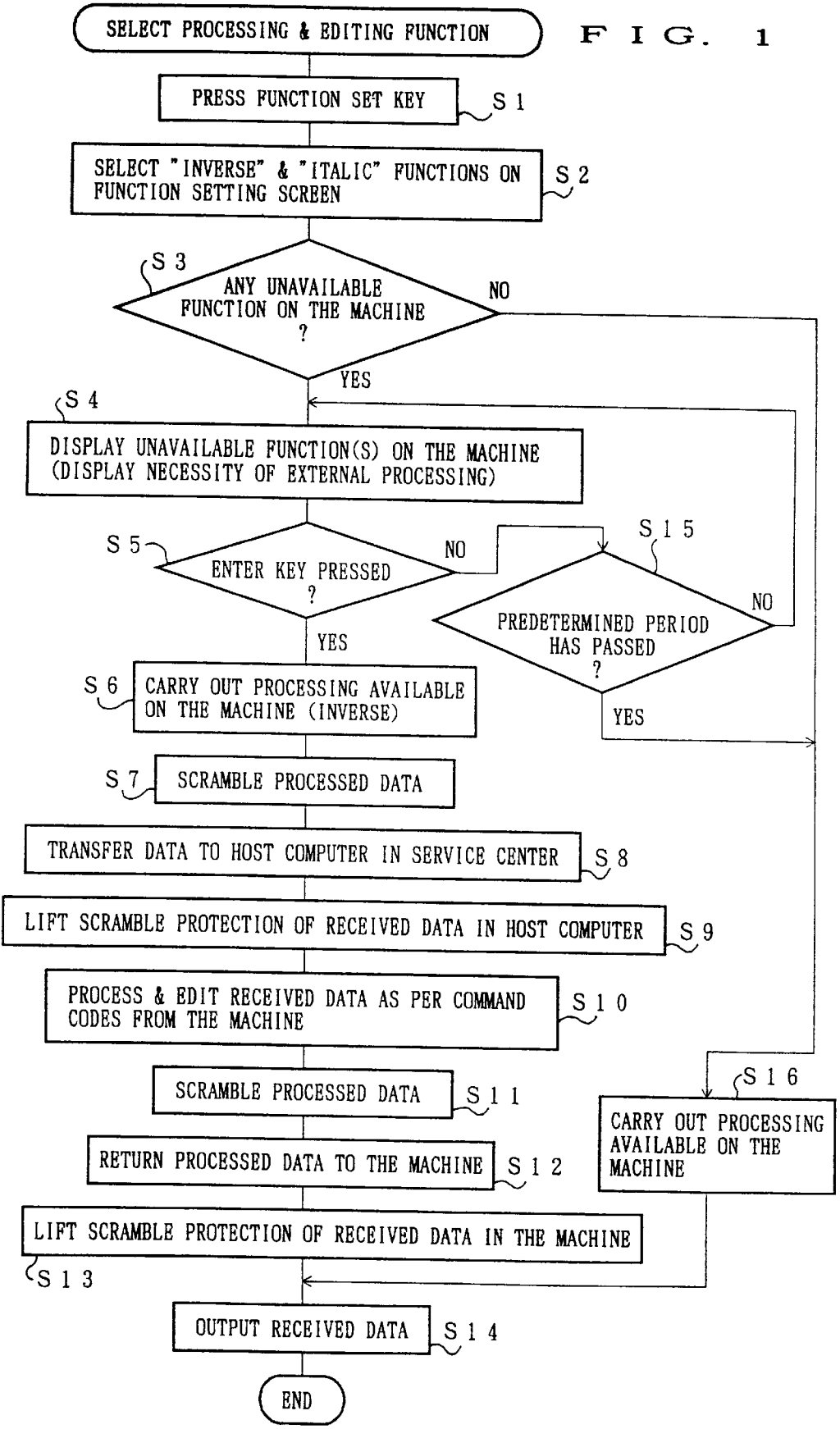
FIG. 1 is a flowchart detailing an operation of an image forming system in accordance with Embodiment 1 of the present invention.

Next, the following will detail an operation of the present image forming system when the image processing is carried out using the image processing service provided from the service center with reference to the flowchart of FIG. 1. Assume that the user selects "inverse" and "italic" on the digital copying machine 91 as the desired image processing for an original image. Here, the function setting screen of the liquid crystal display device 1 is arranged to display the functions provided to the host computer 96.

In this case, as soon as the user presses the function set key 101a on the basic screen of the liquid crystal display device 1 of FIG. 6(a) (S1), the screen of the liquid crystal display device 1 switches to the first function setting screen of FIG. 6(b). Subsequently, as soon as the user presses the italic set key 102b and inverse set key 102c on the first function setting screen (S2), the areas corresponding to these two keys 102b and 102c are displayed with a reversed background as shown in FIG. 12(a) to indicate that the user has pressed the same.

Then, the PCU 74 of the digital copying machine 91 checks whether any of the set functions are unavailable on the digital copying machine 91 (S3). Here, as shown in Table 2 above, the digital copying machine 91 is furnished with the "inverse" function but is not furnished with the "italic" function. Thus, the checking result in S3 is YES. Accordingly, the PCU 74 shows a display on the liquid crystal display device 1 as illustrated in FIG. 12(b) (S4), informing that the "italic" function is not available on the digital copying machine 91 and will be carried out by the host computer 96.

Then, as soon as the user presses the enter key 112a on the current screen (S5), the screen of the liquid crystal display device 1 switches to the italic setting function screen of FIG. 12(c). After the user enters a desired tilting angle using the angle input key 106a on the display screen and presses the setting end key 106b, the PCU 74 starts to effect the inverse function which is available on the digital copying machine 91 (S6). Here, the data of the original image read by the scanner section 31 are processed, for example. Since the digital copying machine 91 does not include the page memory but the line memory alone, the image data is read per line and processed successively. The line memory is provided inside the PCU 74 and used when the PCU 74 operates.

Then, the PCU 74 scrambles the image data done with the "inverse" processing (S7) and transfer the scrambled data to the host computer 96 in the service center successively (S8). Here, a control command code directing the "italic" processing and the subject image data is entered into the host computer 96 through the interface 91a, a line connecting the digital copying machines 91 and 93, interface 93a, modem 98 in the digital copying machine 93 side, telephone line 97, modem 98 in the host computer 96 side, and interface 96a.

The data is scrambled to prevent the leakage of the image data. More specifically, since the office side and service center side communicate with each other through a general network in the present image forming system, anyone can access the general network at any time, and an unauthorized third party, or a so-called hacker, can easily access the image data flowing through the network.

Upon receipt of the scrambled image data from the digital copying machine 91, the host computer 96 lifts the scramble protection (S9), and confirms the requested processing specified by the command code, and carries out the "italic" processing for the image data done with the "inverse" processing (S10).

After the image data processing ends, the host computer 96 scrambles the processed image data (S11) and returns the same to the image-data-sender digital copying machine 91 in a route reverse to the inbound transmission (S12).

Then, the digital copying machine 91 lifts the scramble protection from the received data (S13), and outputs the resulting image data on a sheet as an image (S14) in the same manner as the digital copying machine 30.

If a predetermined period has passed before the user presses the enter key 112a in S5 (S15), the digital copying machine 91 effects only the "inverse" function available on the self (S16), and proceeds to S14. The predetermined period is measured by a timer provided in the PCU 74. Further, if all the set functions are available on the digital copying machine 91 in S3, the digital copying machine 91 proceeds to S16.

As has been explained, in the present image forming system, if the user selects an image editing function which is not installed in any of the digital copying machines 91–93 in the office side, the digital copying machine currently manipulated issues a request to the host computer 96 in the service center to effect the selected image editing function on its behalf. In other words, the digital copying machines 91–93 in the office can use a variety of the latest image editing functions (the image processing functions) installed in the host computer 96 at a very small communication charge. Therefore, the digital copying machines 91–93 in the office do not have to include high-level image editing functions or the like, and even if they become relatively low-grade models, they do not have to be replaced with new models.

Figure 13:
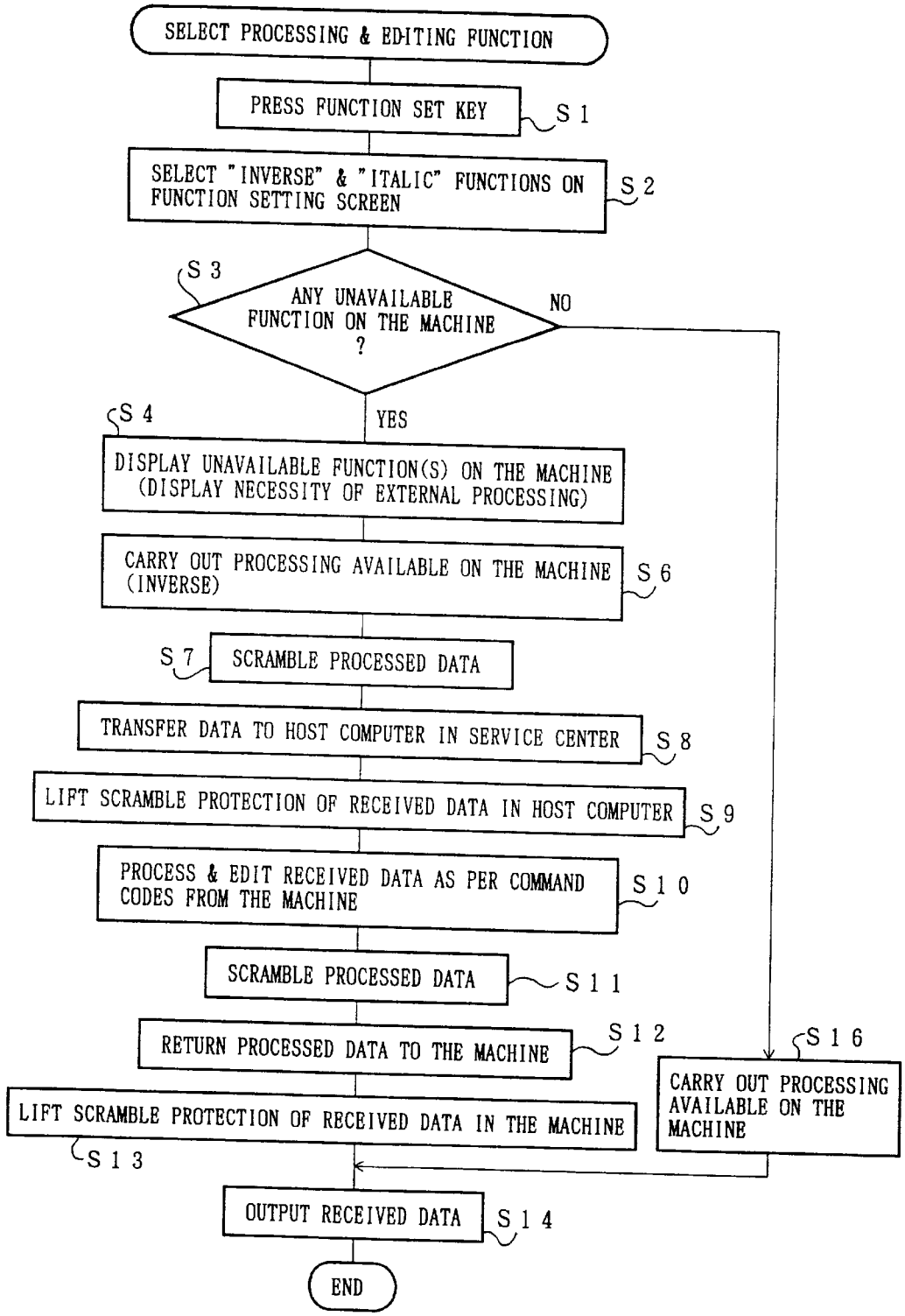
FIG. 13 is a flowchart detailing another operation of the image forming system of FIG. 1.

In the example shown in FIG. 1, since the service center charges every service provided at the request, the service center carries out the processing after the user of the digital copying machine 91 agrees to pay. Thus, a request is not issued to the service center until the user presses the enter key 112a in S5. However, as shown in FIG. 13, a request may be issued when the user has selected a function unavailable on the digital copying machine 91 without the user's pressing action of the enter key 112a in S5.

Figure 14:
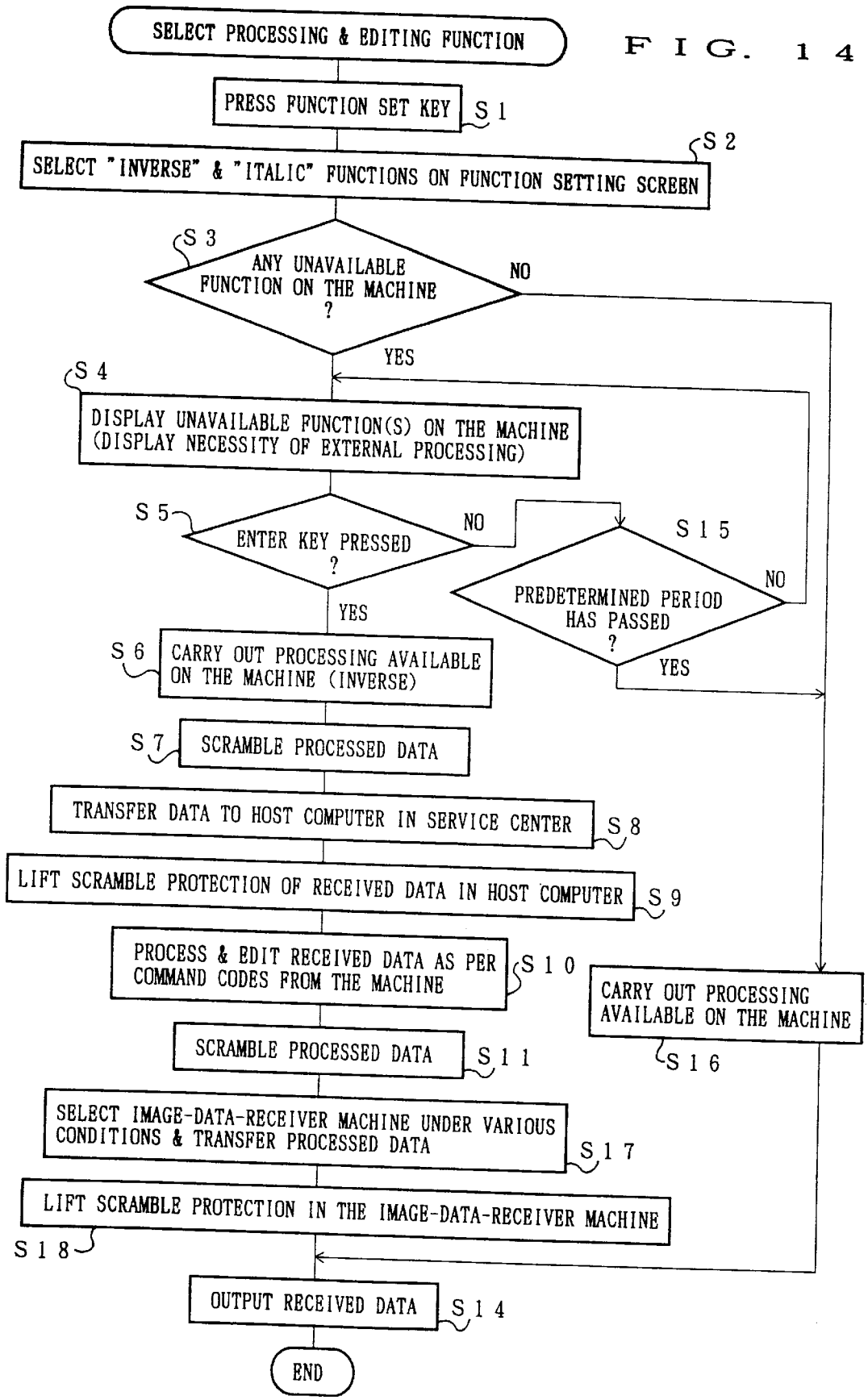
FIG. 14 is a flowchart detailing a further operation of the image forming system of FIG. 1.

Moreover, in the example shown in FIG. 1, the image data processed by the host computer 96 is returned to the image-data-sender digital copying machine 91 for the output in S12, but as shown in S17 and S18 in FIG. 14, the processed image data may be returned to a machine selected under various conditions, so that the image will be outputted from the selected digital copying machine or printer.

Next, and with reference to the flowcharts of FIGS. 15 (a) and 15 (b), the procedure for installing a newly developed image processing functions (new function) in the host computer 96 and the procedure to register the new function in the machines in the office side will be explained. Here, assume that the new function is registered in the digital copying machine 93.

Figure 15:
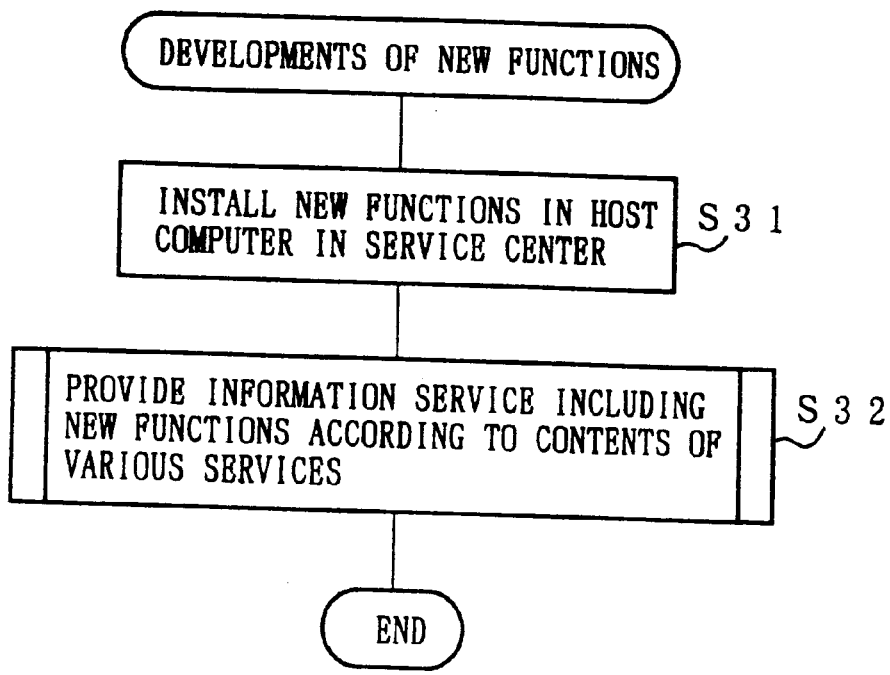
FIG. 15(a) is a flowchart detailing a procedure to install a new function into a host computer in the image forming system of FIG. 11.
FIG. 15(b) is a flowchart detailing an operation of S32 in the flowchart in FIG. 15(a)
Figure 15:
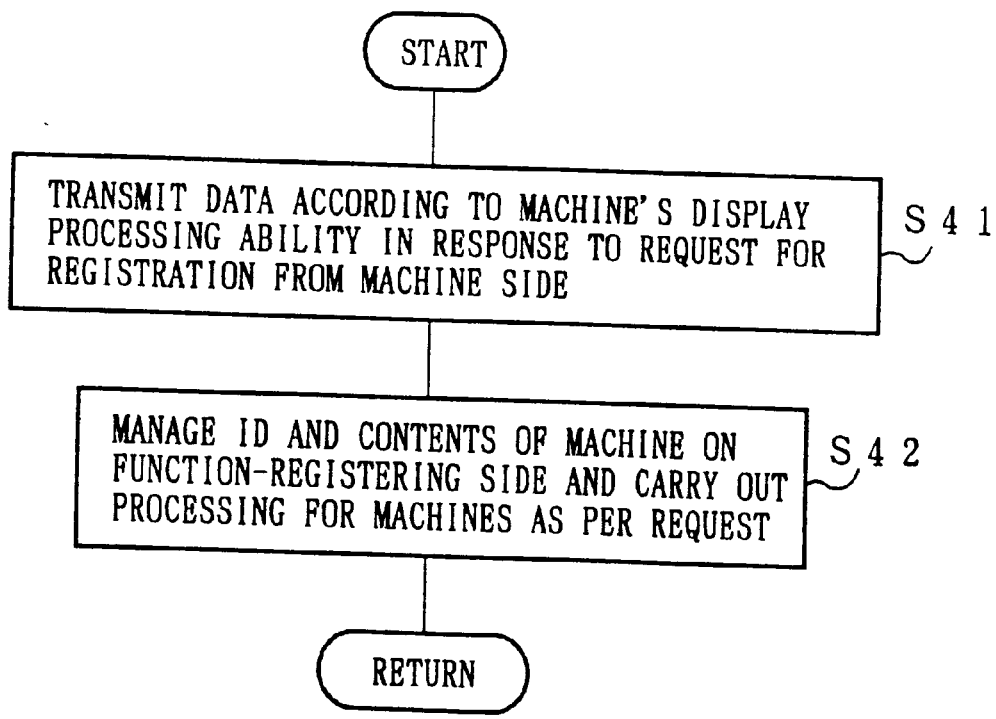

As shown in FIG. 15 (a), a newly developed image processing algorithm (software program) is installed in the host computer 96 in the service center (S31). Accordingly, the host computer 96 provides the information service including the new function in line with the contents of various services for the digital copying machine 93 (S32).

As shown in FIG. 15(b), during the operation in S32, the host computer 96 transmits data that correspond to the display processing ability of the digital copying machine 93 upon receipt of a request for the registration from the digital copying machine 93 (S41). Then, the host computer 96 manages the ID (Identification Number) and contents registered with respect to the image processing functions (image editing functions) of the digital copying machine 93, and carries out predetermined processing at a request issued from the digital copying machine 93 (S42).

During the operation in S41, the host computer 96 first informs the digital copying machine 93 of the contents of the new function, so that the new function thus installed can be selected on the digital copying machine 93. Here, the host computer 96 transmits the contents of the new function (herein, "TRANSLATION: ENGLISH TO JAPANESE", "TRANSLATION: JAPANESE TO ENGLISH" and "DICTIONARY FUNCTION") to the digital copying machine 93 through the telephone line 97 with a command indicating the new function at the top. The contents of the transmission data is determined by the contents of data withheld in the display circuit of the liquid crystal display device 1 in the digital copying machine 93 (the data-receiver machine). For example, when display character data are withheld in an external character ROM as font data, the display contents of the new function are indicated by transmitting the corresponding external character codes.

Figure 16:
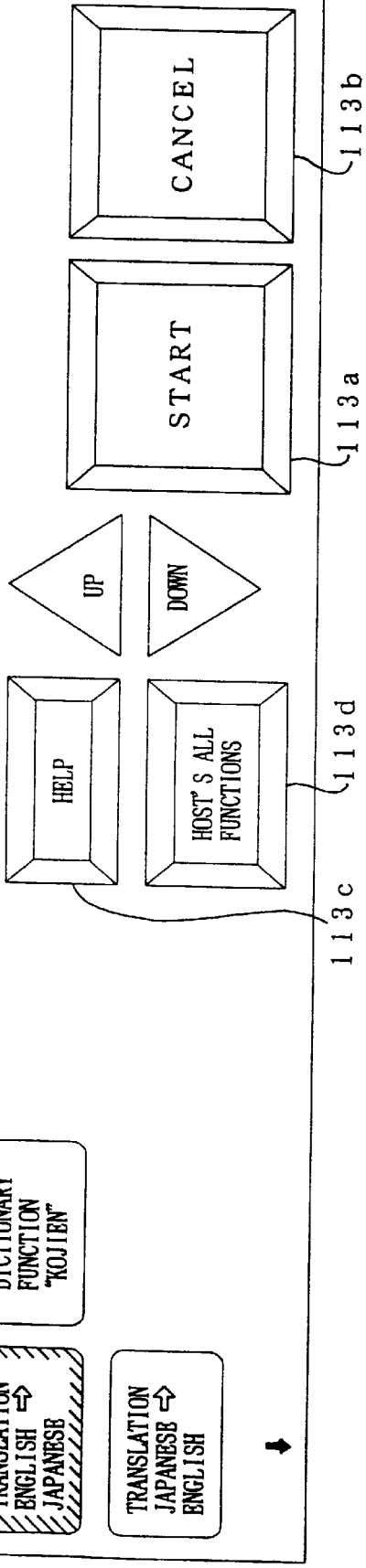
FIG. 16 is a view explaining a display state of the liquid crystal display device of the digital copying machine associated with the operation in S32 in the flowchart in FIG. 15(a)

Upon receipt of the data from the host computer 96, the liquid crystal display device 1 of the digital copying machine 93 switches to the function registration screen as shown in FIG. 16 to enable the user to confirm new functions. Here, the user may not wish to use all the new functions. Therefore, the user can select the new functions he wishes to register in the digital copying machine 93 by pressing the display regions of the desired new functions. Here, assume that "TRANSLATION: ENGLISH TO JAPANESE" is selected. The selected display region, "TRANSLATION: ENGLISH TO JAPANESE", is displayed with a reversed background as shown in FIG. 16. When the user presses the start key 113a under these conditions, the function "TRANSLATION: ENGLISH TO JAPANESE" is registered as one of the available functions. The function thus registered is displayed as the "TRANSLATION: ENGLISH TO JAPANESE" set key 103c on the second function setting screen as shown in FIG. 6(c), for example. In contrast, when the user presses the cancel key 113b on the function registration screen, the operation is terminated and the registration is erased. Additionally, the start key 113a and the cancel key 113b can be provided on any other function registration screen in the same manner.

Figure 17:
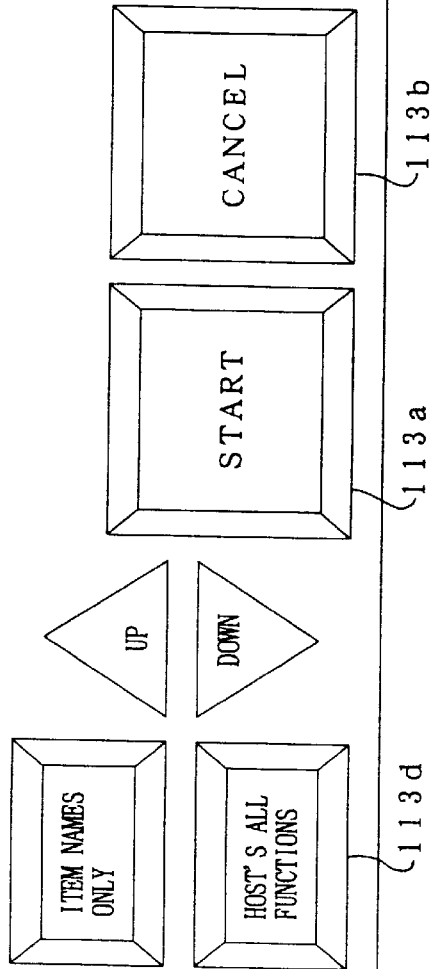

Moreover, if the user presses the help key 113c on the function registration screen of FIG. 16, the liquid crystal display device 1 switches to a screen shown in FIG. 17, which displays a brief explanation of the contents of the new function besides the display region of the same. Here, FIG. 17 shows the display state after the user has selected the new function "TRANSLATION: ENGLISH TO JAPANESE". Further, when the user presses the host's all function display key 113d on the function registration screen of FIG. 16, the liquid crystal display device 1 switches to a screen shown in FIG. 18, whereby all the functions installed in the host computer 96 are displayed. In the drawing, all the functions can not be displayed at one time because of the limited display region. Therefore, it is arranged that the functions are successively displayed by operating the scroll key 113e.

Here, the information of new functions is transmitted from the host computer 96 to each office either collectively at regular intervals, or each time a new function is added, which is referred to as a regular information service herein. Further, the office side may confirm new functions at any time, which is referred to as an optional information service herein. Next, the regular information service carried out by the service center will be explained with reference to FIG. 19, and the optional information service will be explained with reference to FIG. 20.

For the regular information services, the user registers at the host computer 96 for the regular information service, whereby an information supplying cycle for the user is registered in the host computer 96 (S51).

Upon completion of the registration at the host computer 96 as described above, the host computer 96 transmits information of the new functions to the machines in the office side in their respective registered cycles, while confirming the ON-state of the power of each machine (S52 and S53).

Upon receipt of the information of the new functions from the host computer 96, each machine in the office side stores the information (S54), registers the new functions as described above (S55), and adds them to the function selection screen (S56).

Moreover, in the case of an optional information service, the user registers at the host computer 96 for the optional information service (S61). Upon completion of the registration, the host computer 96 transmits the information of the new functions to the machines in the office side in an optional cycle, while confirming the ON-state of the power of each machine (S62 and S63). Then, the operations in S64–S66 are carried out in the same manner as those in S54–S56.

In the above explanation, the digital copying machines 91–93 are used as example machines in the user side with which the host computer 96 transmits the image data mutually. However, since a combination of the scanner 94 and printer 95 can function as a digital coping machine, the combination may transmit the image data mutually with the host computer 96 like a typical digital copying machine. In this case, image data read by the scanner 94 is transferred to the host computer 96 where image processing is carried out, and the processed image data is transferred to the printer 95 where printing is carried out. Further, the image data may be inputted to the printer 95, processed by the host computer 96, and returned to the printer 95 to be printed out. Thus, the printer 95 alone may communicate with the host computer 96. The same can be said for the arrangements of the other Embodiments of the present invention discussed below.

The digital copying machines 91–93 are used as the image forming apparatuses and the host computer 96 is used as the image processing apparatus herein; however, the arrangement is not limited to the above. The image forming system of the present invention may use, for example, the multi-function image processing section of the digital copying machine 93 as the image processing apparatus and the digital copying machines 91 and 92 as the image forming apparatuses. The same can be said for the arrangements of the other Embodiments of the present invention discussed below.

EMBODIMENT 2

The following description will discuss Embodiment 2 of the present invention.

An image forming system of the present invention (hereinafter, referred to as the present image forming system) has an arrangement as illustrated in FIG. 11. The present image forming system is designed in such a manner that each of the digital copying machines 91–93 in the office side can make copies using a memory of a large capacity of the host computer 96. Here, the operation of the present image forming system will be explained by referring to, for example, a communication operation between the digital copying machine 92 and host computer 96. In this case, the digital copying machine 92 is provided with an electronic RDH function. With the electronic RDH function, 20 copies of a 10-page document are made by storing temporarily the image data of the document in a memory, and retrieving the image data of each page successively from the memory for 20 times. The electronic RDH function becomes available through the manipulation of the post-processing set key 101c shown in FIG. 6(a). Here, as soon as the user presses the post-processing set key 101c, an electronic RDH set key is displayed on the post-processing setting screen as shown in FIG. 7(b).

Figure 21:
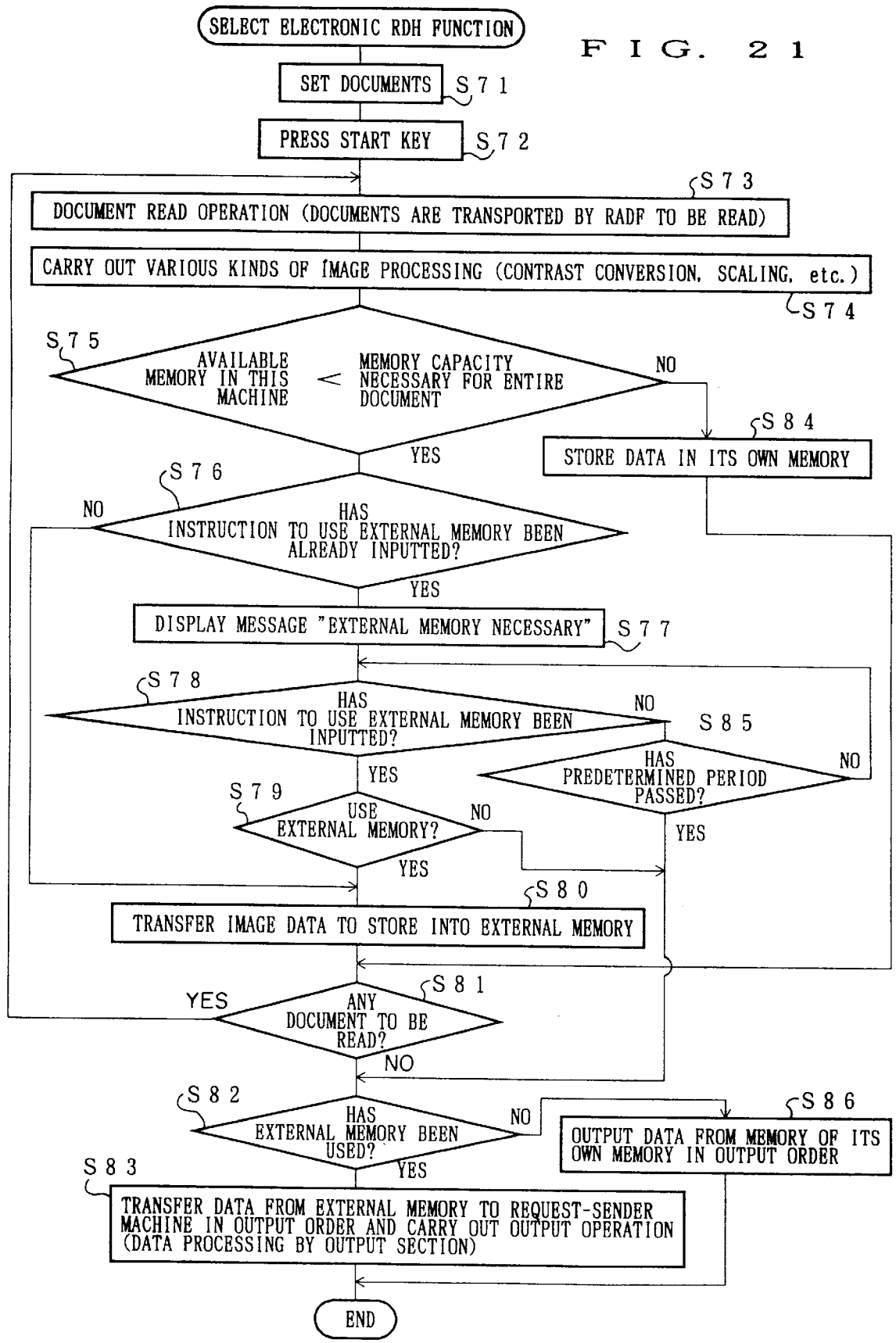
FIG. 21 is a flowchart detailing an operation of an image forming system in accordance with Embodiment 2 of the present invention.

As previously mentioned, the digital copying machine 92 has a page memory of 64M bytes as the memory 73. Therefore, the page memory can successively store the 256-level image data of up to four pages of A-4 size document in the memory 73. This capacity is sufficient for a normal copying process, where the original image is temporarily stored to make copies later. However, when a plurality of copies of a 10-page document are made using the electronic RDH function, the page memory is short for 6 pages. Therefore, in this case, the electronic RDH function is effected using the large capacity memory of the host computer 96. The following description will detail the operation in this case with reference to the flowchart of FIG. 21.

The electronic RDH function is selected in the digital copying machine 92 and a document is set on the RADF 36 shown in FIG. 2 (S71), and as soon as the user turns on the start key 15 shown in FIG. 5 (S72), the document is transported by the RADF 36 per page so that images of the document are read by the scanner unit 40. The resulting image data is successively accumulated in the memory 73 (S73). Further, the image data is successively processed, such as a density conversion and a variable magnification based on the setting, in the image data processing portion 71 (S74). Here, when the electronic RDH set key is pressed, the liquid crystal display device 1 displays an external memory selection key 121a as shown in FIG. 22 (a), and an available memory capacity is displayed on an available memory capacity display section 121b. However, a message shown in FIG. 22(a) is not displayed yet at this point.

In the meantime, the available memory capacity of the memory 73 drops below the memory capacity required for reading the rest of the pages of the document while the document is being read by the scanner unit 40 (S75), and if the external memory selection key 121a has not been pressed beforehand (S76), a message requesting to use the external memory is displayed on the liquid crystal display device 1 as shown in FIG. 22(a) (S77).

Then, as the user presses the external memory selection key 121a (S78), the liquid crystal display device 1 switches to a message display screen as shown in FIG. 22(b).

On the above screen, the external memory selection key 121a is displayed with a reversed background, thereby indicating it has been pressed, and the available memory capacity display section 121b displays a capacity which is a sum of the available memory capacities of its own memory 73 and the large-capacity memory.

Next, when the user presses a continue key 121c in accordance with the message shown in FIG. 22(b) (S79), the image data is transferred to the host computer 96 to use the large capacity memory of the host computer 96 as an external memory (S80). The screen of the liquid crystal display device 1 at this point is shown in FIG. 22(c). Here, either of the two types of image data, that is, image data that is being successively read thereafter or the image data that have been read and accumulated in the memory 73, are transferred. Further, the transferring operation of the image data is carried out in the same manner as the aforementioned transmitting operation of the image data- The host computer 96 stores the received image data in its own large capacity memory.

Then, S73–S80 are repeated until all pages of the document have been read (S81). Then, upon completion of the reading of the document, if the external memory is used (S82), the image data is transferred from the host computer 96 to the digital copying machine 92 in order of output, so that an image is outputted on a sheet (S83). In this case, the copies are successively outputted from the last page to the first page of the document. Here, like in the image data writing operation, the image data is retrieved from the memory 73 of the digital copying machine 92 through the data lines inside the digital copying machine 93, and the image data is retrieved from the host computer 96 through the telephone line 97.

In contrast, when the available capacity of the memory 73 of the digital copying machine 92 is larger than the memory capacity required for reading the rest of the pages of the document in S75, the digital copying machine 92 keeps storing the image data to its own memory 73 (S84), and proceeds to S81. Later, the digital copying machine 92 outputs the image data stored in its own memory 73 onto sheets in order of output through S81 and S82 (S86).

Moreover, if the predetermined period has passed before the user presses the external memory selection key 121a in S78 (S85), the digital copying machine 92 proceeds to S82, and in S86, the digital copying machine 92 outputs the image data that have been stored in its own memory 73 onto sheets in order of output.

Additionally, in the above explanation, all the page memory of the digital copying machine 92 is used to store the image data read from the document images; however, a part of the memory corresponding to several sheets may be secured for use in the control operation of the digital copying machine 92.

EMBODIMENT 3

The following description will discuss Embodiment 3 of the present invention.

In an image forming system of the present invention (hereinafter, referred to as the present image forming system), the image data is transmitted between the office side and the service center side using, for example, the arrangement shown in FIG. 11. For example, the image processing for the subject image data is carried out at the service center as per the request issued by a user side machine in the office, and the processed image data is transferred selectively to the machine(s) in the user side in the request-sender office. In the present embodiment, more than one digital copying machine, which corresponds to the digital copying machine 30, is used as the machines in the user side, and each has different image reproducing functions either entirely or partially.

For example, even when the host computer 96 has carried out high-level image processing on the image data, if the request-sender digital copying machine can not reproduce an image out of the processed image data at all, or at the same high quality, the time, costs, etc. the host computer 96 spent for the processing would be wasted. A good example would be a case where the user wishes to make a copy of an original image, such as a photograph, with density as true to the original using a high-quality image processing, while the request-sender digital copying machine can not reproduce such a high-quality image out of the processed image data.

In the present image forming system, the host computer 96 in the service center confirms the printing function of the currently manipulated digital copying machine in the user side, compares the function with the contents of the image processing the user has selected, and judges whether the request-sender digital copying machine is suitable to output the processed image data as an image. Then, the host computer 96 informs the request-sender digital copying machine of the judging result. Further, when the judgement turns out to be negative and if an eligible machine is located near the request-sender digital copying machine, the host computer 96 recommends that the output of the image be carried out by such an eligible machine.

The example criteria for judging whether the machine in question is suitable for the image output operation are: the image recording density of the machine, the largest sheet size that can be used in the machine, the sizes of sheets that have been set to be fed in the machine, and whether the machine is ready for the recording operation, that is, whether the machine has empty toner, a paper jam, or is in regular inspection. The host computer 96 functions as a suitability judging herein.

Figure 24:
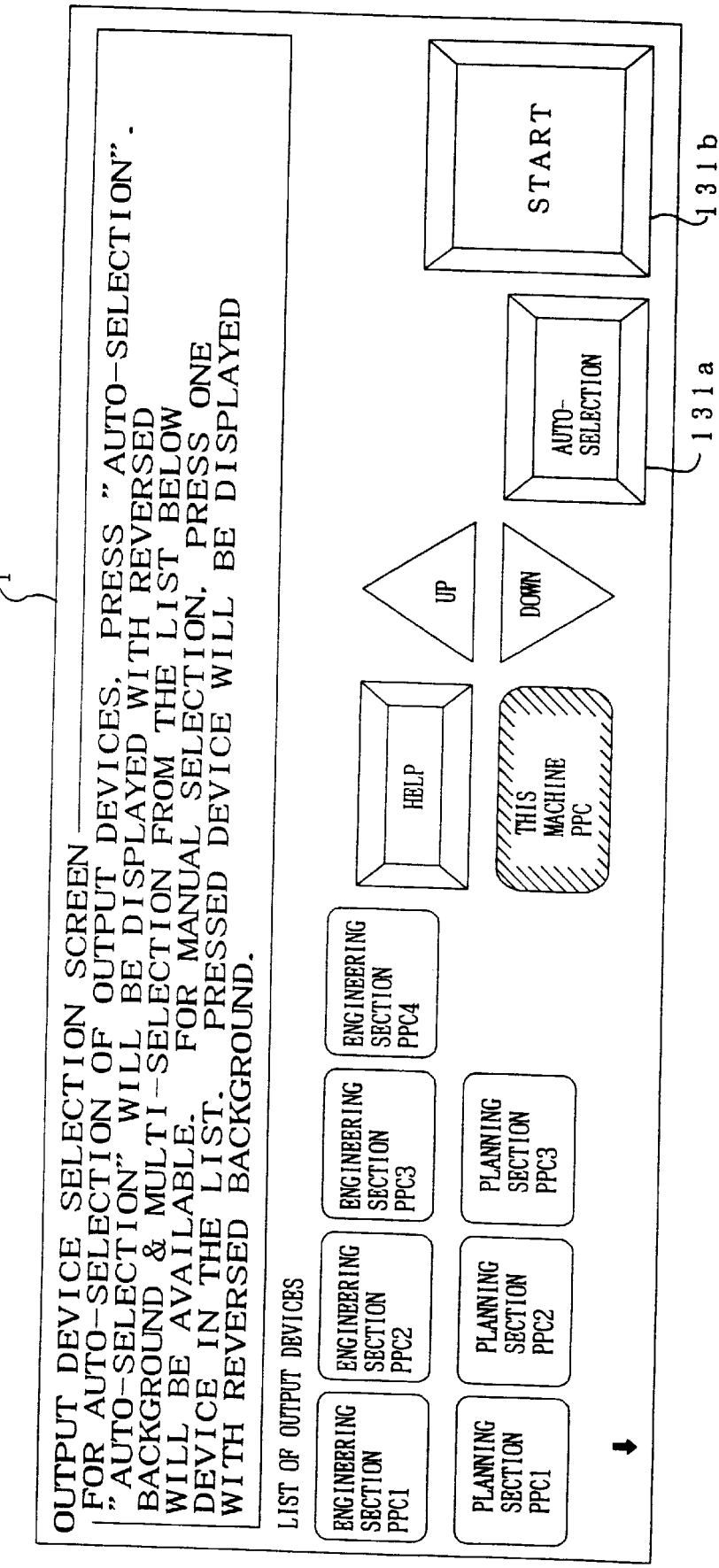
FIG. 24 is a view explaining a display state of the liquid crystal display device in an auto-selection mode in the above image forming system.

Here, when each of the digital copying machines issues a request for the image processing to the host computer 96, its liquid crystal display device 1 switches to an output device selection screen shown in FIG. 24. On this screen, an output device list showing all the digital copying machines connected to the host computer 96 are displayed together with messages as well as an auto-selection mode set key 131a and a start key 131b.

Figure 23:
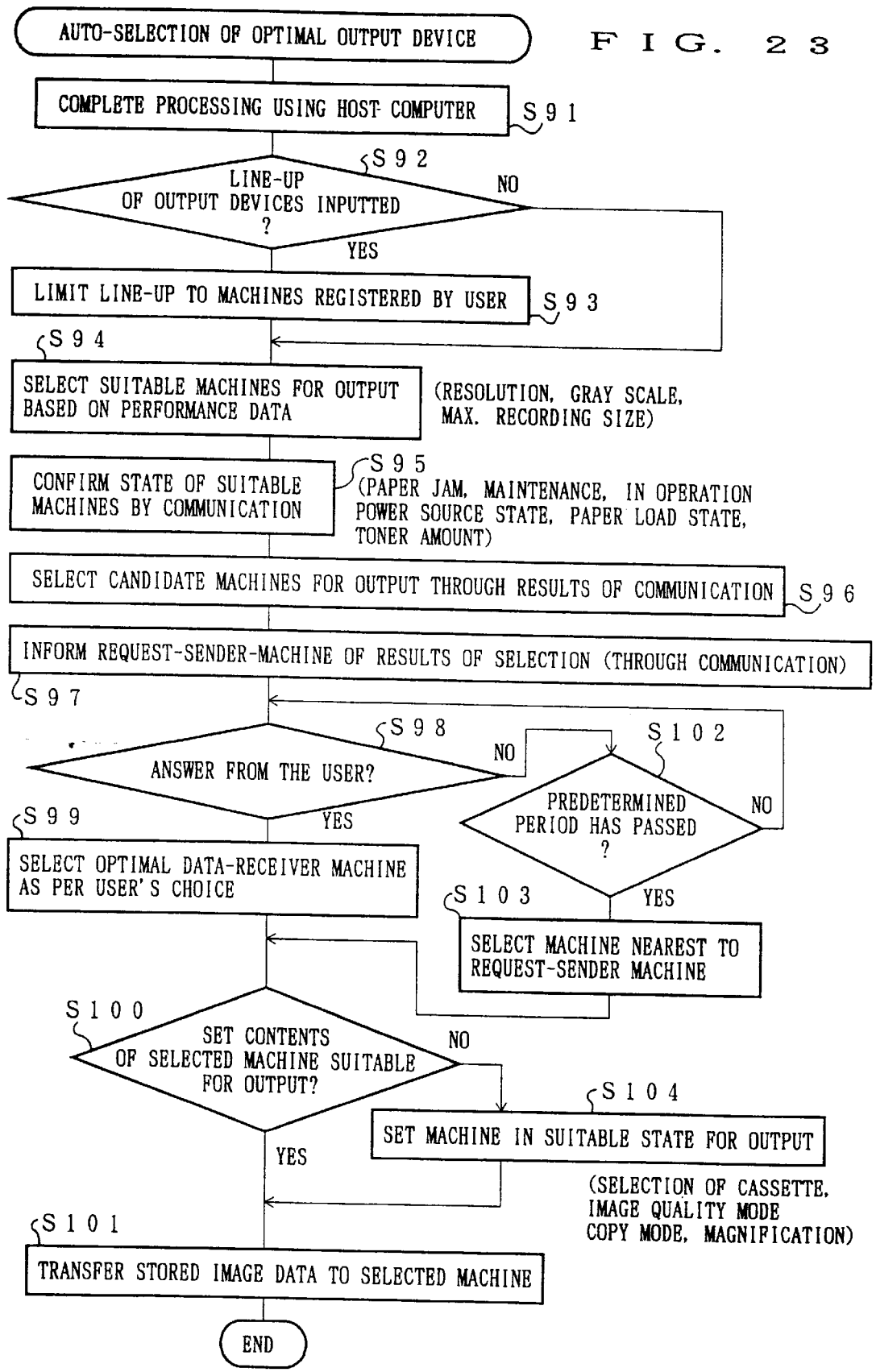
FIG. 23 is a flowchart detailing an operation of an image forming system in accordance with Embodiment 3 of the present invention.

The operation of the present image forming system is carried out in an auto-selection mode as will be described below with reference to the flowchart in FIG. 23.

Figure 25:
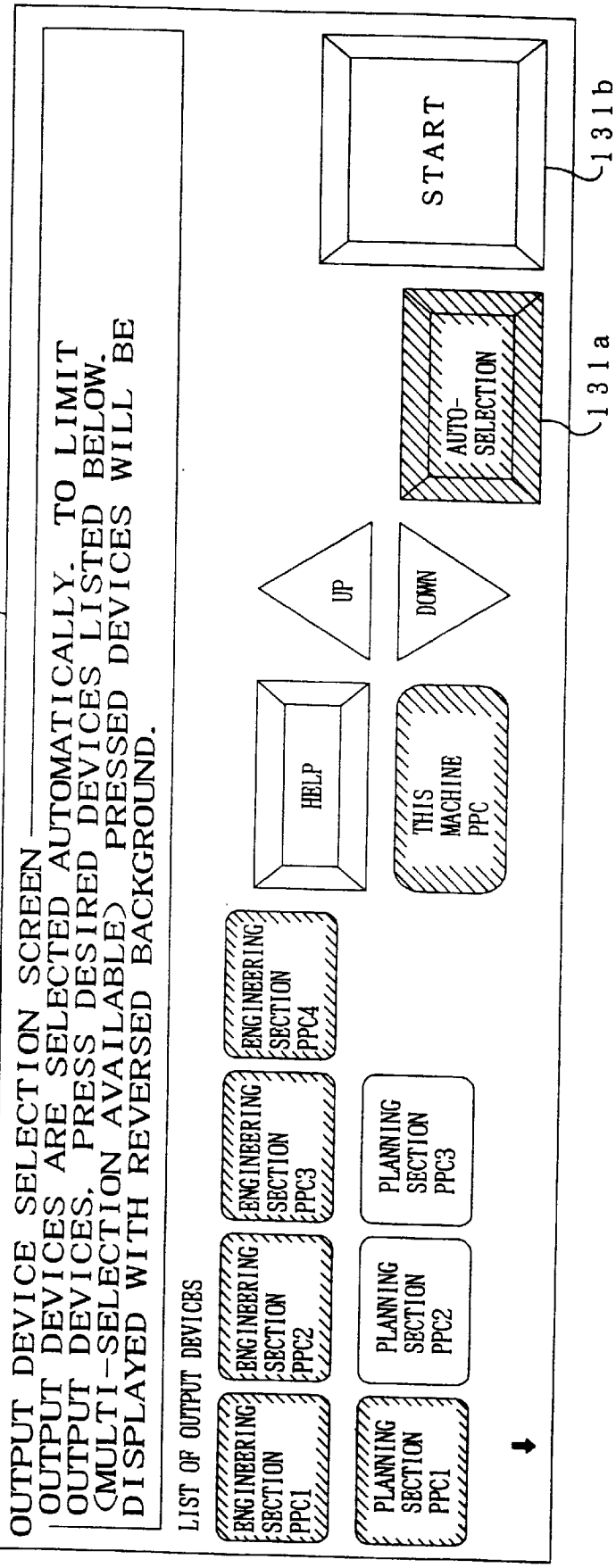

In the auto-selection mode, the host computer 96 automatically selects a digital copying machine to which the image data is returned, and the user can set this mode by pressing the auto-selection mode set key 131a on the output device selection screen shown in FIG. 24. As soon as the user presses the key 131a, the region of the key 131a is displayed with a reversed background as shown in FIG. 25. Further, in the screen of FIG. 25, the user can limit the line-up of the output devices. In this case, of all the digital copying machines shown in the list of output devices, the user presses the display regions of those machines he wishes to include in the line-up, whereby the pressed display regions are displayed with a reversed background.

Here, when the user selects manually a digital copying machine that serves as the output device, the user presses the display region of a desired digital copying machine among the digital copying machines including "This Machine PPC" in the list. Accordingly, the pressed display region of the digital copying machine is displayed with a reversed background, whereupon the manual mode is set. In this case, the image data processed by the host computer 96 is returned to the digital copying machine thus selected, and outputted as an image from the same.

In the auto-selection mode, the host computer 96 carries out the requested image processing with the image data transferred from a digital copying machine in the office side in the first place (S91).

Next, the host computer 96 selects a digital copying machine to which the processed image data is returned. In this case, if the line-up of the digital copying machines has not been entered beforehand, the host computer 96 proceeds to S94 (S92). If the line-up of the digital copying machines has been entered already through the above-mentioned operation, the host computer 96 limits the digital copying machines to which the image data is returned to the machines in the line-up (S93).

Next, the host computer 96 selects a suitable data-receiver digital copying machine from the line-up of the digital copying machines with reference to the kinds of the applied image processing and various factors in the digital copying machines, such as the resolution, gray scales, and maximum recording size (S94) When more than one digital copying machine satisfies the conditions, all of such digital copying machines are listed as suitable digital copying machines as a result of selection, which is the case herein.

Further, the host computer 96 confirms whether or not the suitable digital copying machines thus selected can output an image through communications with the digital copying machines: the available machines are selected as candidate machines while unavailable machines are left out (S95) The unavailable machines referred herein means, for example, those having a paper jam trouble, being under maintenance, currently operating, having the power turned OFF, or those which can not feed the size of sheet required for the output of the image, or those having an insufficient amount of toner.

After selecting candidate digital copying machines as described above (S96), the host computer 96 transmits the information of the selection results to the request-sender digital copying machine (S97). Upon receipt of the information, the request-sender digital copying machine shows a display shown in FIG. 26 on the liquid crystal display device 1, in which "This Machine PPC", "Engineering Section PPC1", "Engineering Section PPC2" and "Planning Section PPC1" are displayed as the candidate digital copying machines. Further, the display region of the nearest digital copying machine to the request-sender digital copying machine is flashed. In this case, "This Machine PPC" is flashed for being the request-sender digital copying machine.

Figure 26:
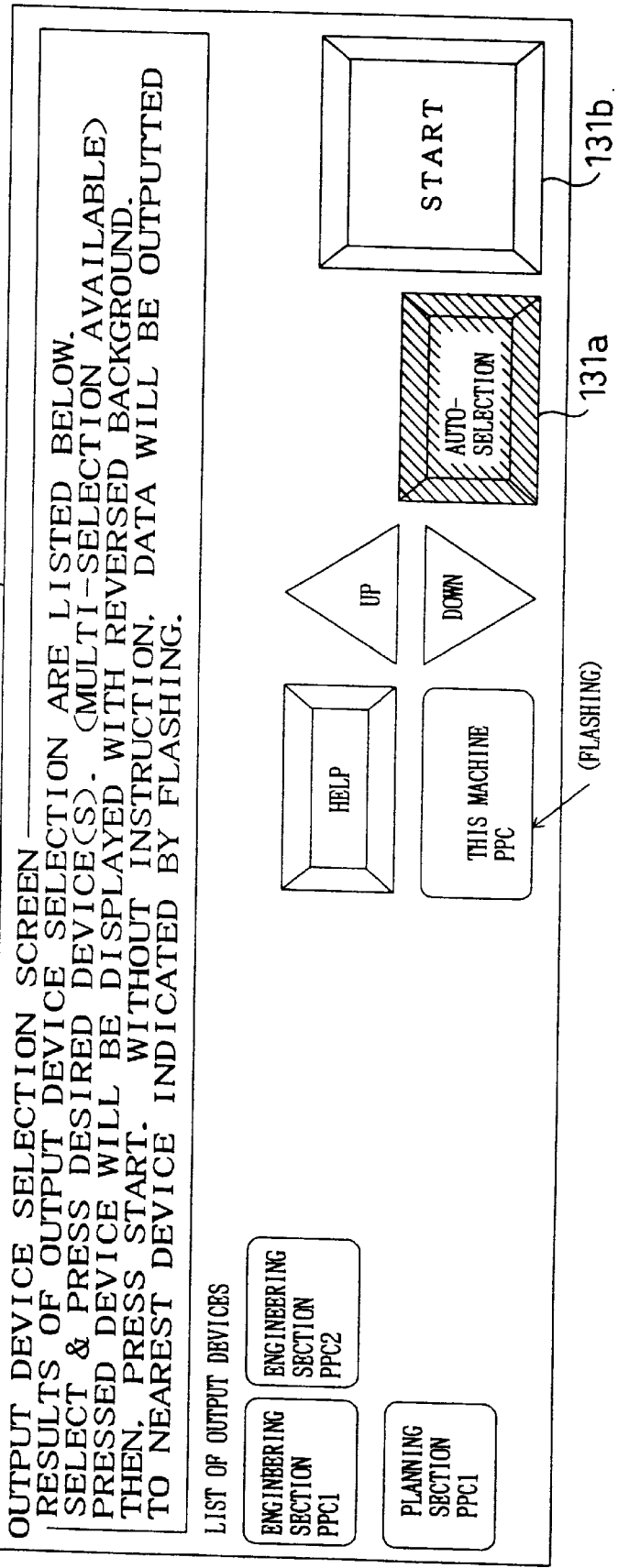
FIG. 26 is a view explaining a display state of the above liquid crystal display device associated with the operation in S97 in FIG. 23.

Next, in the display screen as shown in FIG. 26, when the user selects a desired digital copying machine among the digital copying machines shown in the list of output devices (S98), the host computer 96 specifies the digital copying machine as the optimal machine to which the processed image data are transferred, that is, as a copying machine that outputs the image onto a sheet (S99). Here, during the selection in S98, the user presses the display region of a desired digital copying machine first, and thence presses the start key 131b.

If the user does not make the selection in S98 within a predetermined period (S102), the host computer 96 specifies "This Machine PPC", which is the nearest digital copying machine to the request-sender digital copying machine, as the optimal machine to which the processed image data are returned (S103).

Next, the host computer 96 or the digital copying machine specified as the optimal machine judges whether the optimal digital copying machine is in a condition for the image output (S100). Here, the condition for the image output referred herein means a condition where factors, such as the cassette, image-quality mode, copying mode, and magnification, have been properly set.

If the result of the judgement is YES, the host computer 96 transfers the processed image data stored in its own memory to the digital copying machine specified as the optimal machine (S101). In contrast, if the result of the judgement is NO, the host computer 96 waits until the digital copying machine specified as the optimal machine shifts in the condition for the image output (S104), whereupon it starts to transfer the processed image data. Consequently, any digital copying machine to which the image data have been transferred outputs an image onto a sheet based on the image data.

EMBODIMENT 4

The following description will discuss Embodiment 4 of the present invention.

An image forming system of the present invention (hereinafter, referred to as the present image forming system) transmits the data between the office and the service center using, for example, the arrangement of FIG. 11. The host computer 96 in the service center has a function for judging whether the image data of a document read by the scanner section 31 shown in FIG. 2 and sent from a digital copying machine is suitable for the image processing requested by the digital copying machine. Then, if the judging result turns out to be negative, the host computer 96 requests the image-data-sender digital copying machine to retransfer the image data.

This arrangement is made so as to prevent unwanted situations: the host computer 96 can not carry out the request image processing because the image data is defective, or the host computer 96 carries out the processing uselessly on the image data whose quality is too low. The image data becomes defective when the image quality of the original document read by the scanner section 31 is too low, the scanner section 31 that reads a document image has a low resolution, the document is dislocated while being read, or noise caused by a bad condition of the telephone line 97 gives adverse effects on the image data. The host computer 96 functions as an image information suitability judging section herein.

Figure 27:
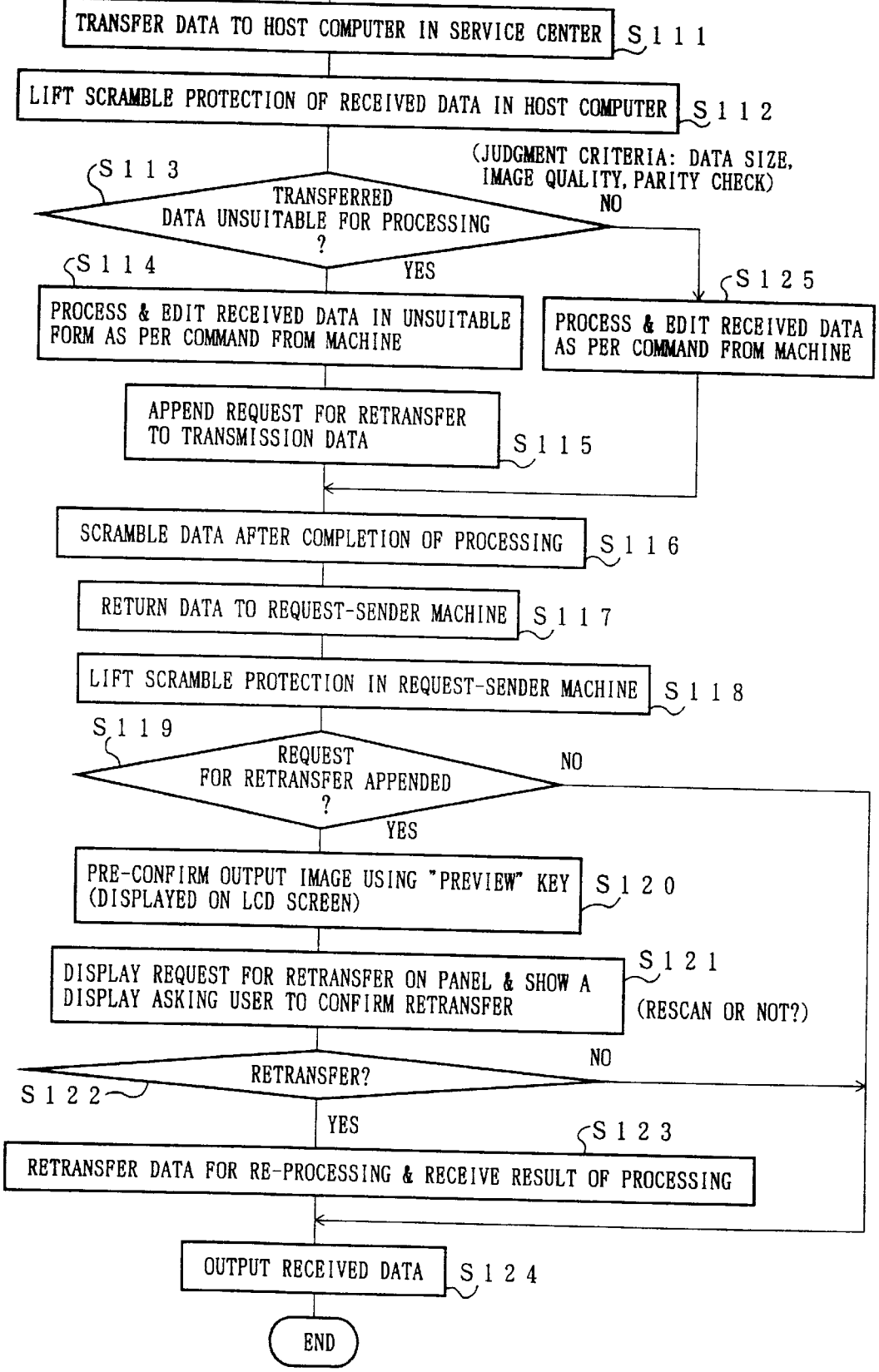
FIG. 27 is a flowchart detailing an operation of an image forming system in accordance with Embodiment 4 of the present invention.

Next, the following description will detail the operation of the above image forming system with reference to the flowchart in FIG. 27. Here, assume that the image data is retransferred from the digital copying machine while the "Translation Function" is selected. As shown in Table 2 above, the "Translation Function" is not installed in any of the digital copying machines 91–93 shown in FIG. 11, and the host computer 96 is requested to effect the function on their behalf.

In this operation, the image data read by the scanner section 31 for translation is transferred from the digital copying machine to the host computer 96 in the service center first (S111) in the same manner as FIG. 1.

Then, the host computer 96 lifts the scramble protection from the received data (S112), and judges whether the received image data is suitable for the translation processing (S113).

Next, even if the judging result turns out to be negative, the host computer 96 effects the "translation" function as per request from the digital copying machine (S114). Then, the host computer 96 appends the reasons for requesting the retransfer to the processed data as information, which will be used as return data (S115). In contrast, if the judging result turns out to be positive in S113, the host computer 96 effects the "translation" function as per request from the digital copying machine, and in this case, the resulting processed image data will be used as the return data (S125). Subsequently, the host computer 96 proceeds to the operation of S116.

Next, the host computer 96 scrambles the return data (S116), and transfers the same to the request-sender digital copying machine (S117).

The digital copying machine lifts the scramble protection from the return data from the host computer 96 (S118). If the information of the request for retransfer is appended to the image data (S119), the digital copying machine takes in the processed image data and displays the same on the liquid crystal display device 1 (S120). Further, the digital copying machine displays the reasons for the request for retransfer on the liquid crystal display device 1, as well as a display asking whether the user wishes to retransfer the image or not (S121). In contrast, if the information of the request for retransfer is not appended to the image data in S119, the digital copying machine outputs the image data onto a sheet as an image (S124).

As shown in FIG. 28(a), the display on the liquid crystal display device 1 shown in S121 warns the user that the image data is not suited for the "translation" processing. Further, the reasons for the warning are classified into three categories: image quality (processing level); data sizes; and parity errors, which are displayed on a "WARNING LIST". These categories are used as criteria for the user when he determines an action to the request for retransfer. Here, in FIG. 28(a), a value 90% displayed at the data size row means that the image data of an A-4 size document the host computer 96 has received is 10% short due to some trouble. Further, a preview key 141a, a rescanning key 141b and a continue key 141c are displayed on the screen shown in FIG. 28(a).

As soon as the user presses the preview key 141a, the processed image data, that is, the result of translation, is displayed as shown in FIG. 28 (c), which is an operation of the operation panel 90 as an information confirming section. The user presses the preview key 141a when he wishes to visually confirm the image quality (processing level) before he decides whether to output the image data or not. In the screen shown in FIG. 28 (c), the image quality can be confirmed across the output image data by scrolling the screen using a U-key 141d, a D-key 141e, an R-key 141f and an L-key 141g. As soon as the user presses a confirmation key 141h after he has confirmed the image quality, the screen is returned to the one shown in FIG. 28(a).

Further, as soon as the user presses the rescanning key 141b (S122), the document image is scanned again by the scanner section 31 in the digital copying machine, and the resulting image data for translation is transferred to the host computer 96 again. Accordingly, the host computer 96 carries out the "translation" processing with the image data, and returns the processed image data to the image-data-sender digital copying machine like in the first time. Upon receipt of the returned image data, the digital copying machine operates in the same manner as above (S123). Consequently, the liquid crystal display device 1 shows the display shown in FIG. 28(b). On the display screen, a value 100% displayed at the data size row in the "WARNING LIST" indicates that substantially no problem is raised in outputting the processed image data. Nevertheless, the proceeded image is displayed on a CHECK screen, because each user has his own criteria as to the processing level (OCR recognition rate).

Subsequently, the digital copying machine outputs the returned image data as an image (S124). In contrast, if the user presses the continue key 141c in S122, the digital copying machine outputs the processed image data which were returned as a copy image for the first time in S124 without retransferring the image data to the host computer 96.

As described above, when the image processing is requested by the user, the present image forming system not only carries out the image processing as per request, but also judges whether the image data is suitable for the requested image processing or not, and if the judging result turns out to be negative, the present image forming system requests the retransfer of the image data. This arrangement makes it possible to obtain a desired image accurately in a reliable manner.

In the present image forming system, the digital copying machine retransfers the image data at the user's key input action, namely, the user's judgment, in response to the retransfer request from the host computer 96. However, the rescanning may be started automatically upon receipt of the retransfer request from the host computer 96 to retransfer the image data to the host computer 96. When arranged in this manner, S120 and S121 in the flowchart of FIG. 27 are omitted.

EMBODIMENT 5

The following description will discuss Embodiment 5 of the present invention.

An image forming system of the present invention (hereinafter, referred to as the present image forming system) transmits the data between the office side and the service center side using, for example, the arrangement of FIG. 11. Like in the aforementioned image forming systems, the host computer 96 in the service center carries out the processing requested from the digital copying machine 91, 92 or 93 with the original image data read by, for example, the scanner section 31 shown in FIG. 2, and transferred from the digital copying machine 91, 92 or 93.

Each time the host computer 96 receives a request from any of the digital copying machines 91–93 to carry out the image processing on its behalf, the host computer 96 judges which of the digital copying machines 91–93 has issued the request for the image processing. Then, the host computer 96 successively stores various data in its large memory, such as the date when the request for the image processing was issued, time when the image processing started, contents of the image processing, and processing time, for each of the digital copying machines 91–93. FIG. 31 shows an example management list of the utilization including the above-mentioned data of record.

Further, by analyzing the information stored in the large capacity memory at a predetermined period or each predetermined cycle, the service center can manage the information, such as which kinds of image processing the digital copying machines 91–93 in the user side have requested, and also learn the utilization of the host computer 96 by the digital copying machines 91–93. When the user is charged for the image processing service, this arrangement facilitates the calculation of charges. Moreover, the services can be readily charged to the user by transmitting an invoice through the communication line, that is, the telephone line 97. Furthermore, since the utilization (use frequency) of various image processing functions can be estimated based on the information, the user's preference of the image processing functions can be learned. FIG. 29 shows an example invoice. This format may be modified to a table showing the utilization of the service center by a certain digital copying machine. The host computer 96 functions as a history managing device herein.

On the other hand, when each of the digital copying machines 91–93 receives the utilization information from the host computer 96, the machine displays the information on the liquid crystal display device 1, or outputs the same onto a sheet. The utilization information may be automatically outputted upon receipt of the same, or may be outputted manually after the user has confirmed the display on the liquid crystal display device 1 indicating the receipt of the information. FIG. 30 shows a state in which the utilization information is displayed on the liquid crystal display device 1. On this display, the contents of the display can be scrolled up or down by using an up-key 151a or a down-key 151b. Further, the information can be outputted onto a sheet by pressing a print key 151c. Here, a display key 151d is used for instructing the display of the utilization information.

When the digital copying machine 91, 92 or 93 automatically outputs the utilization information upon receipt of the same, the outputted sheet is readily mixed with other papers having formed images thereon on the paper tray. Thus, the user may lose or fail to notice the information. To prevent such a problem, the utilization information is preferably outputted onto a sheet that is different from frequently used sheets. Here, the sheet different from the frequently used sheets means a sheet, such as the one having the largest size, length or width, and the one which is least frequently used of all kinds of sheets stored in the multi-stage sheet feeding unit 33 shown in FIG. 2. Among these sheets, it is most preferable to use the sheet having the largest size, so that the user will not lose or fail to notice the information.

Figure 32:
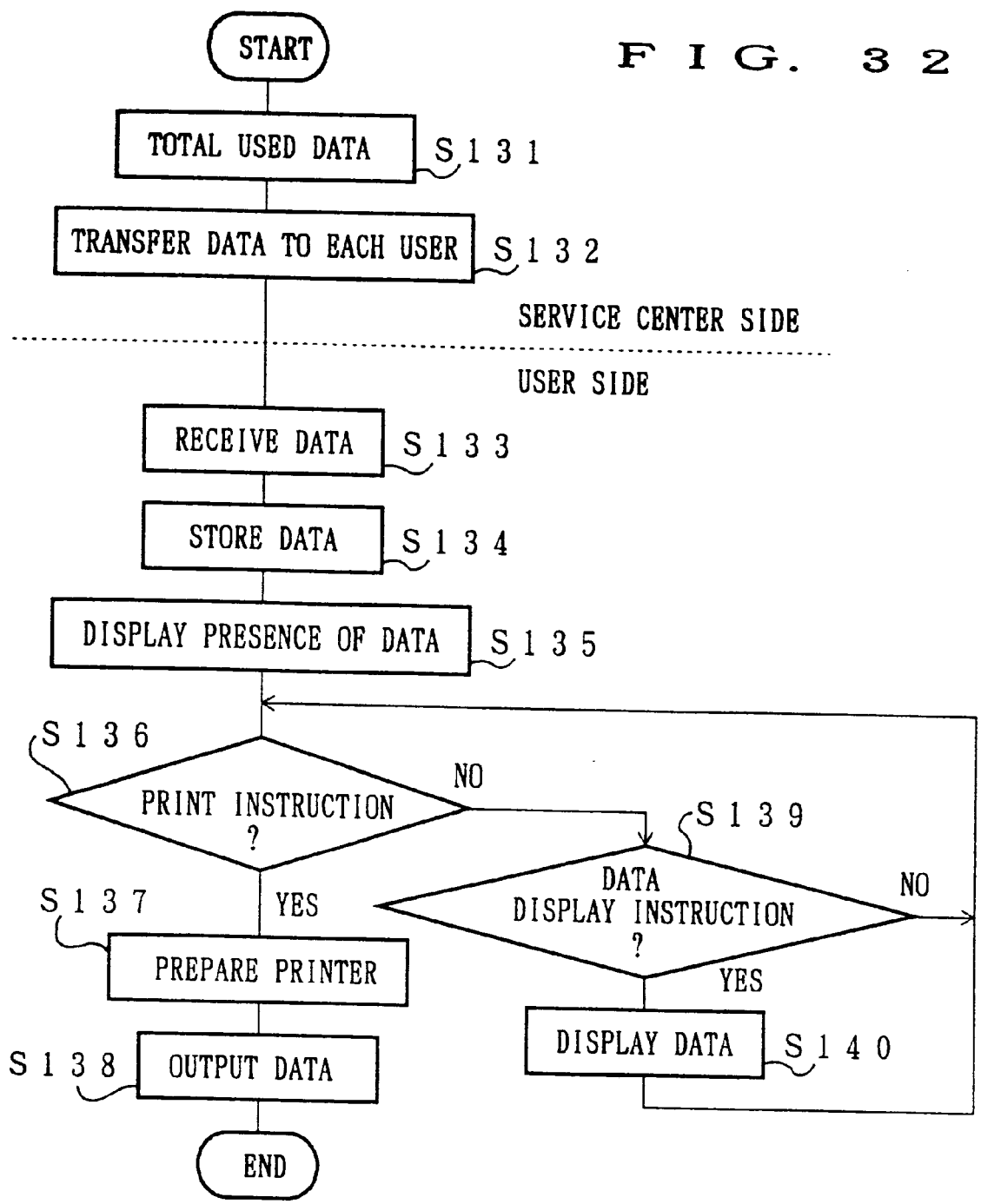
FIG. 32 is a flowchart detailing an operation of the host computer to manage the utilization information and an operation of the digital copying machine after receiving the same.

Next, the operation of the above image forming system will be detailed with reference to the flow chart in FIG. 32.

The host computer 96 in the service center analyzes the utilization by each of the digital copying machines 91–93 to collect utilization information (S131), and the individual information is transferred to each of the corresponding digital copying machine 91, 92 and 93 (S132).

When the digital copying machine 91, 92 or 93 in the user side receives the utilization information (S133), the machine stores the information in its own memory (S134), and displays a message indicating the receipt of the utilization information on the liquid crystal display device 1 (S135).

In the digital copying machine 91, 92 or 93, when the user presses the print key 151c shown in FIG. 30 based on the display (S136), the laser printer section 32 serving as a printer prepares for a printing operation for the utilization information (S137), and upon completion of the preparation, outputs the utilization information onto a sheet as shown in FIG. 29, for example (S138).

In contrast, if the user presses the display key 151d prior to the printing instruction in S136 (S139), the utilization information is displayed on the liquid crystal display device 1 as shown in FIG. 30, for example (S140).

FIG. 33 shows the operation in a case where the machine automatically outputs the utilization information upon receipt of the same from the host computer 96 without a printing instruction from the user in S136. More specifically, when an auto-output mode is set (S141), the machine proceeds to S137, and prints out the utilization information in S138. The sheet used herein is, for example, a sheet having the largest size among the sheets that can be supplied by the multi-stage paper feeding unit 33 as described above.

Further, in the present image forming system, each time the digital copying machine 92 or 93, which has a page memory and is located in the user side, issues a request for the image processing to the host computer 96, the digital copying machine 92 or 93 also stores the utilization information. This function is defined as a function of a request state managing section composed of the memory 73 and PCU 74. This function enables the user to estimate the service charges on the digital copying machine 92 or 93 before an invoice is issued from the service center, if the digital copying machine 92 or 93 and the host computer 96 manage the utilization information in the same manner.

Also, when the invoice is transmitted from the host computer 96 through the telephone line 97, the user can reconcile the contents of the invoice with the utilization information stored in the digital copying machine 92 or 93. For readily comparison, the digital copying machine 92 or 93 synthesizes the utilization information stored in its own memory 73 and the utilization information transmitted from the host computer 96, displays the resulting utilization information on the liquid crystal display device 1 as shown in FIG. 34, and prints out the same as shown in FIG. 35. This function is defined as a function of a confirming section composed of the memory 73 and PCU 74.

EMBODIMENT 6

The following description will discuss Embodiment 6 of the present invention.

An image forming system of the present invention (hereinafter, referred to as the present image forming system) transmits the data between the office side and the service center side using, for example, the arrangement of FIG. 11. Like in the aforementioned image forming systems, the host computer 96 in the service center carries out the image processing requested by the digital copying machine 91, 92 or 93 with the document image data read by the scanner section 31 shown in FIG. 2, for example, and transferred from the digital copying machine 91, 92 or 93.

In the present image forming system, when the digital copying machine 91, 92, or 93 issues a request for the image processing for a subject image, the host computer 96 stores information about the subject image and the information as to the applied image processing in its large capacity memory as additional information.

In other words, in the present image forming system, image data of specimen images, for example, image data related to copy-prohibited objects, such as securities and paper money, are pre-registered in the host computer 96. Thus, the host computer 96 compares the image data received from the digital copying machine 91, 92 or 93 for the image processing with the registered specimen images, and judges whether the received image data coincide with the image data of any of the specimen images. This function is a function of a specimen image judging section of the image processing apparatus if the received image data are not judged to coincide with the image data of any of the registered specimen images, the host computer 96 carries out the predetermined image processing. The host computer 96 functions as an image processing section herein. In contrast, if the received image data are judged to coincide with the image data of one of the registered specimen images, the host computer 96 transmits information to the corresponding digital copying machine 91, 92, or 93 in the user side to request the user to confirm the original image. The confirmation request information is transmitted for the three following purposes: to inform that the image transmitted from the digital copying machine 91, 92 or 93 is not suitable for the copying operation; to give a warning that the user should confirm the document; and to request the user to retransfer the original image. When the digital copying machine 91, 92 or 93 receives the confirmation request information, the machine displays messages to achieve the purposes specified above on the liquid crystal display device 1 based on the confirmation request information. The host computer 96 stores information related to the image data that has transmitted first, such as the contents of the requested image processing, the managing information for identifying the request-sender digital copying machine 91, 92 or 93, and the image data per se altogether. This host computer 96 functions as a history managing device of the image processing apparatus herein.

Next, the operation of the above image forming system will be detailed with reference to FIGS. 36 and 37. Here, assume that the digital copying machine 92 communicates with the host computer 96, and that the digital copying machine 92 issues a request to the host computer 96 to carry out the image processing which is not available on the self.

As shown in FIG. 36, a desired image processing mode is set in the digital copying machine 92 (S171), and as soon as the user turns on the start key 15 of FIG. 5 (S172), the digital copying machine 92 starts to read an original image using the scanner section 31 (S173). The resulting image data is temporarily stored in the memory 73. Then, the digital copying machine 92 transfers the read image data to the host computer 96 together with command codes indicating a desired image processing and requesting to carry out the image processing on its behalf (S174).

Subsequently, the digital copying machine 92 shifts to the stand-by mode, while the host computer 96 receives the image data and confirms the contents of the same. Here, if the request for retransferring the image data is issued from the host computer 96 (S175), the digital copying machine 92 retransfers the image data by repeating S172–S174.

If no request for retransfer is issued in S175, and the processed image data is returned from the host computer 96 (S176), the digital copying machine 92 outputs the image data onto a sheet (S177).

In contrast, as shown in FIG. 37, in a case that the host computer 96 is set in a mode for updating the aforementioned specimen image data (S151), the host computer 96 updates the specimen image data (S152).

Moreover, if the host computer 96 receives a request for the image processing from the digital copying machine 92 in the user side when the host computer 96 is updating the specimen image data (S153), the host computer 96 judges whether the received image data is the image data of any of the registered specimen images (S154). When the judging results turn out to be positive (S155), the host computer 96 transmits the aforementioned confirmation request information including the image data retransfer request to the digital copying machine 92 (S156), and sets the timer (S157) and the counter (S158). Herein, the host computer 96 also stores information, such as the contents of the requested image processing for the subject image data, the managing information for identifying the request-sender digital copying machine 92, and the image data per se, in its own large capacity memory. The timer regulates the upper limit of waiting time for the retransfer of the image data from the digital copying machine 92, and the counter regulates the upper limit of the number of times of retransfer.

Subsequently, if the host computer 96 again receives the image data from the digital copying machine 92 (S161) before the timer has counted up to a predetermined period (S162), the digital copying machine 92 proceeds to S154 to repeat the succeeding steps. Further, when the number of times of the retransfer of the image data from the digital copying machine 92 has reached a predetermined value (S159), the host computer 96 cancels the image processing mode set by the request from the digital copying machine 92 (S160), and ends the operation after informing the digital copying machine 92 of the cancellation.

In contrast, if the image data received from the digital copying machine 92 does not coincide with the image data of any of the registered specimen images in S155, the host computer 96 carries out predetermined image processing with the image data (S163), and stores the information related to the processing as history information (S164) as shown in FIG. 31, for example. Then, the host computer 96 returns the processed image data to the digital copying machine 92, whereby the operation is completed (S165).

As described above, in the present image forming system, the host computer 96 manages the information related to the specimen images. Therefore, the digital copying machines 91–93 in the user side do not have to manage the above information. In other words, the digital copying machines 91–93 can omit the managing function for the specimen images and hence a large-capacity memory, thereby realizing an inexpensive arrangement.

Moreover, the host computer 96 can add new or necessary specimen image data, or replace unnecessary information with the new or necessary specimen image data to meet the changes in technical or social demands or the like through the above-mentioned updating operations in S151 and S152. Although the updating operations are carried out in the host computer 96 alone, it has become possible to meet various requests from the digital copying machines 91–93.

EMBODIMENT 7

The following description will describe Embodiment 7 of the present invention.

An image forming system of the present invention (hereinafter, referred to as the present image forming system) is arranged in such a manner that a copying machine can inhibit the image recording operation of the copy-prohibited image even the copying machine is not furnished with a judging section for judging whether the copying of the subject image data is prohibited or not. In other words, the digital printing technique, such as electrophotographic technique, has been steadily progressing, and the technique for inhibiting the copying should be advanced at the same pace. However, the latest technique would be worthless unless the same can be applied to the old models as well. To solve the above problem, the user can always use the latest technique at the minimum investment in the present image forming system. A copy-inhibited image referred to as the specimen image means an image related to money, such as paper money and gift certificates, and securities, for which the copying is prohibited under law, or confidential documents, copy-prohibited documents under specific rules, etc.

As shown in FIG. 4, the digital copying machine 93 serving as both the image forming apparatus and image processing apparatus in the present image forming system includes the PCU 74 serving as a specimen image judging section. The PCU 74 is furnished with a function for judging whether an input image from the image data input portion 70 is a copy-prohibited image or not based on the pre-recorded data in the ROM (Read Only Memory) including the memory 73.

More specifically, the PCU 74 judges whether the input image is a copy-prohibited image or not by comparing the same with the pre-registered data of various copy-prohibited specimen images. In other words, the judgment is made based on whether the input image and any of the specimen images have the same value. Optionally, the PCU 74 may make a judgment under a unique rule to the user, such as judging the input image as being the copy-prohibited image whenever an image has "confidential" in red at the upper right corner.

In addition, besides either the negative or positive judgment, a gray judgment may be possible. The gray judgment referred herein means that the copying is highly likely to be prohibited. This kind of judgment is used when the input image data does not coincide with the specimen image data precisely, but are very close.

Further, the digital copying machine 93 pre-records the copy-prohibited specimen image data in the memory 73. However, the copy-prohibited specimen image data can be recorded into a mask ROM or the like when the digital copying machine 93 is delivered, or loaded down into the memory 73 from the other digital copying machines through the interface 93a serving as a transferring device.

Then, when the PCU 74 judges that the input image as being the copy-prohibited image, the PCU 74 indicates that the copying of the subject document is prohibited on the liquid crystal display device 1 on the control substrate 77.

If the input image is the copy-prohibited image with 100% accuracy, the above indication of being the copy-prohibited image can be displayed straightforward. However, there may be a case when the input image is highly likely to be the copy-prohibited image but whether the accuracy is 100% or not is dubious. In such a case, the image data processing portion 71 processes the input image, and outputs the processed image data to the image data output portion 72 with a lower image quality. The image quality is lowered to prevent a crime. More specifically, if a high-quality copy is made when the subject image is highly likely to be paper money, the user may use the copy illegally, but a copy with a lower quality can prevent such a crime beforehand. The image quality is lowered by lowering the resolution or making a monochromic color copy instead of a full-color copy.

The digital copying machine 93 also receives image information from another machine, for example, the digital copying machine 91, and judges whether the subject image is the copy-prohibited image or not. The digital copying machine 93 returns the judging result to the request-sender digital copying machine 91 through the interfaces 91a and 93a.

Further, when more than one digital copying machine 93 is connected within the present image forming system, the judgment can be made by any of the digital copying machine 93, or a second judgment can be made by another digital copying machine 93 after the first judgment is made by one of the digital copying machines 93.

A control operation for judging whether being the copy-prohibited image or not will be detailed with reference to the flowchart of FIG. 38 and FIGS. 39(a), 39(b), and 39(c).

When the digital copying machine 91 which is not furnished with the specimen image judging section starts the copying operation in the present image forming system (S201), the digital copying machine 91 transmits the input image to the digital copying machine 93 which is furnished with the specimen image judging section in the present image forming system through the interfaces 91a and 93a together with a request for the judgment on whether being the copy-prohibited image or not (S202). The request-sender digital copying image 91 does not erase the subject image data and withholds the same in its own memory 73 until the judging result is returned Next, after a predetermined period has passed (S203) and if the judging result is returned within the predetermined period (S204), the request-sender digital copying machine 91 starts the control of the copying operation based on the judging result. More specifically, if the subject image can be copied (S205), the normal copying operation is carried out (S206). In other words, the image is printed out (S212).

On the other hand, if the copying of the subject image is prohibited, the digital copying machine 93 further judges whether the copying of the subject image is prohibited completely or not (S207). If the copying of the subject image is prohibited completely, the digital copying machine 93 transmits the judging result to the digital copying machine 91 through the interfaces 93a and 91a. Accordingly, the digital copying machine 91 displays a screen, as shown in FIG. 39(a), for cancelling the copying of the subject image on the liquid crystal display device 1 serving as a confirmation notifying section for the user and stops the copying operation (S208).

If the judging result is gray, that is, the subject image is highly likely to be the copy-prohibited image, the digital copying machine 91 checks whether there is any other copying machine having a higher judging level within the image forming system (S209). If there is such a copying machine having a higher judging level (S210), the digital copying machine 91 returns to S202 and issues a request for the judgment on whether being the copy-prohibited image or not to the above copying machine.

Herein, the judging level of the specimen image judging section in each digital copying machine 93 is stored in the memory 73 of the digital copying machine 91, so that the PCU 74 can select the copying machine having a higher level specimen image judging section.

If there is no digital copying machine 93 having a higher judging level as shown in FIG. 39(b), the PCU 74 displays a screen indicating that the copying operation is carried out with a lower image quality, and after the user confirms the operation, the PCU 74 resumes the copying operation with a lower image quality (S211) and prints out an image (S212).

In the present embodiment, when the subject image appears to be a copy-prohibited image, the copying operation is carried out with a lower image quality. However, as shown in FIG. 39(c), a screen may be displayed to indicate that the copying appears to be illegal, and ask whether the user still wishes to make a copy by taking the risk, so that the user can select either to carry out the copying normally or stop the copying.

On the other hand, in S204, the judging result may not be returned for a considerable time because the request-receiver machine is having a trouble, such as a power shut-down and network trouble.

To avoid the above problem, a predetermined period is set, and if the judging result is not returned within the predetermined period, the digital copying machine 91 resumes the operation without receiving the judging result on the assumption that the request-receiver machine is having a trouble (S213).

However, when the judging result is returned from the request-receiver machine before the operation in S212 starts (S214), the digital copying machine 91 immediately proceeds to S205 and resumes the operation based on the judging result.

The digital copying machine 91 resumes the operation without receiving the judging result from the request-receiver machine by resuming the copying operation with a lower image quality, or issuing a request to use another copying machine having the judging means, besides resuming the normal copying operation. If the digital copying machine 91 issues a request for the judgment to another copying machine having the judging means and the copying of the subject image is judged to be allowable, the digital copying machine 91 prints out the image withheld from the start (S212).

Next, the judging operation of the digital copying machine 92 having a simple copy-prohibited image judging means will be explained with reference to the flowchart in FIG. 40.

Figure 38:
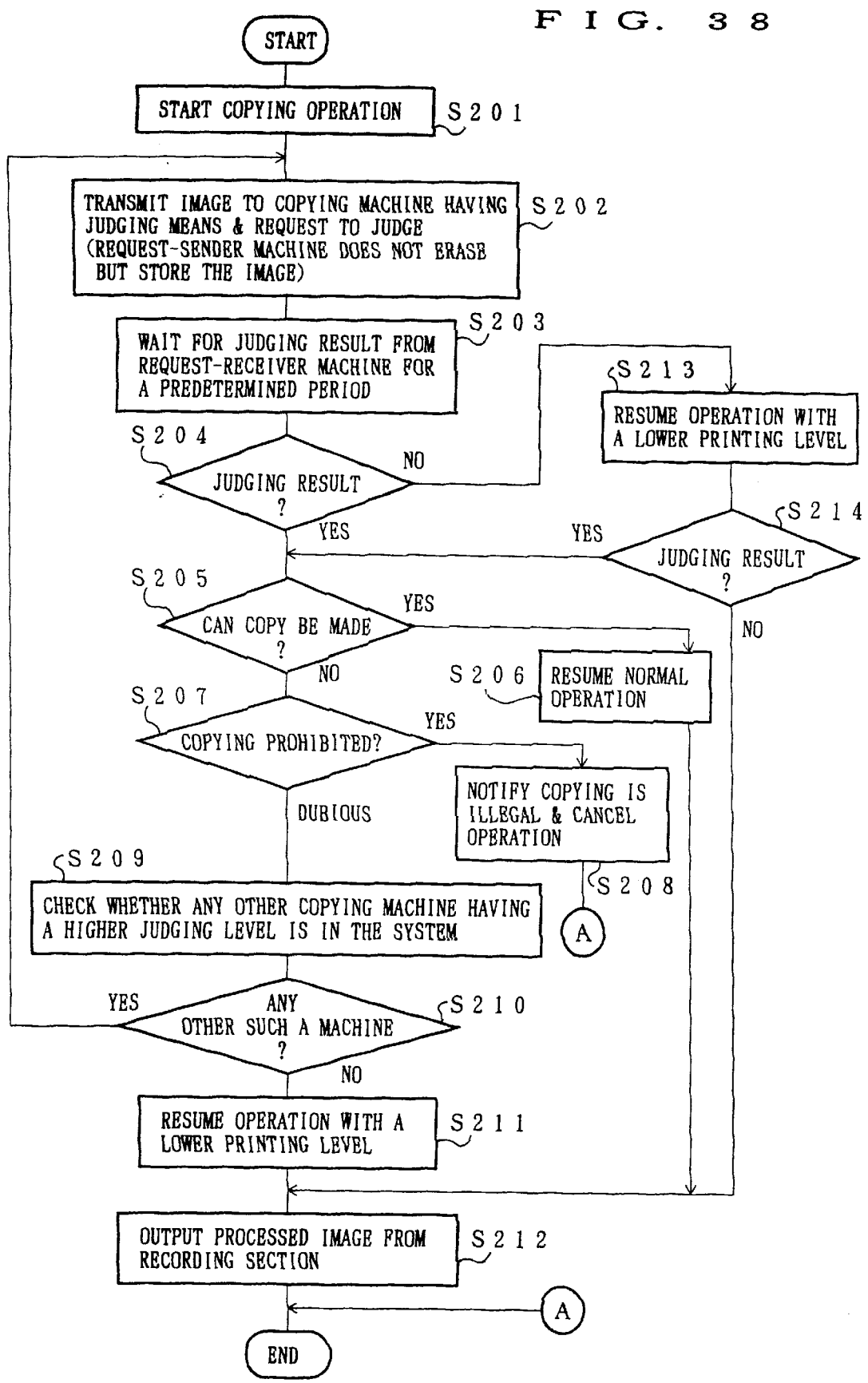
FIG. 38 is a flowchart detailing an operation of an image forming system in accordance with Embodiment 7 of the present invention.

The procedure herein basically is the same as the flowchart in FIG. 38, where the digital copying machine 91 having no specimen image judging section judges whether the subject image is the copy-prohibited image or not. The difference is that the request-sender digital copying machine 92 has simple copy-prohibited specimen image judging means and that an image which obviously does not seem to be a copy-prohibited specimen image is judged by its own copy-prohibited specimen image judging means, so that the copying operation is completed without issuing a request for the judgment to any other machine through the network. Therefore, providing simple image judging means is more advantageous than providing no image judging means in terms of processing speed.

Figure 40:
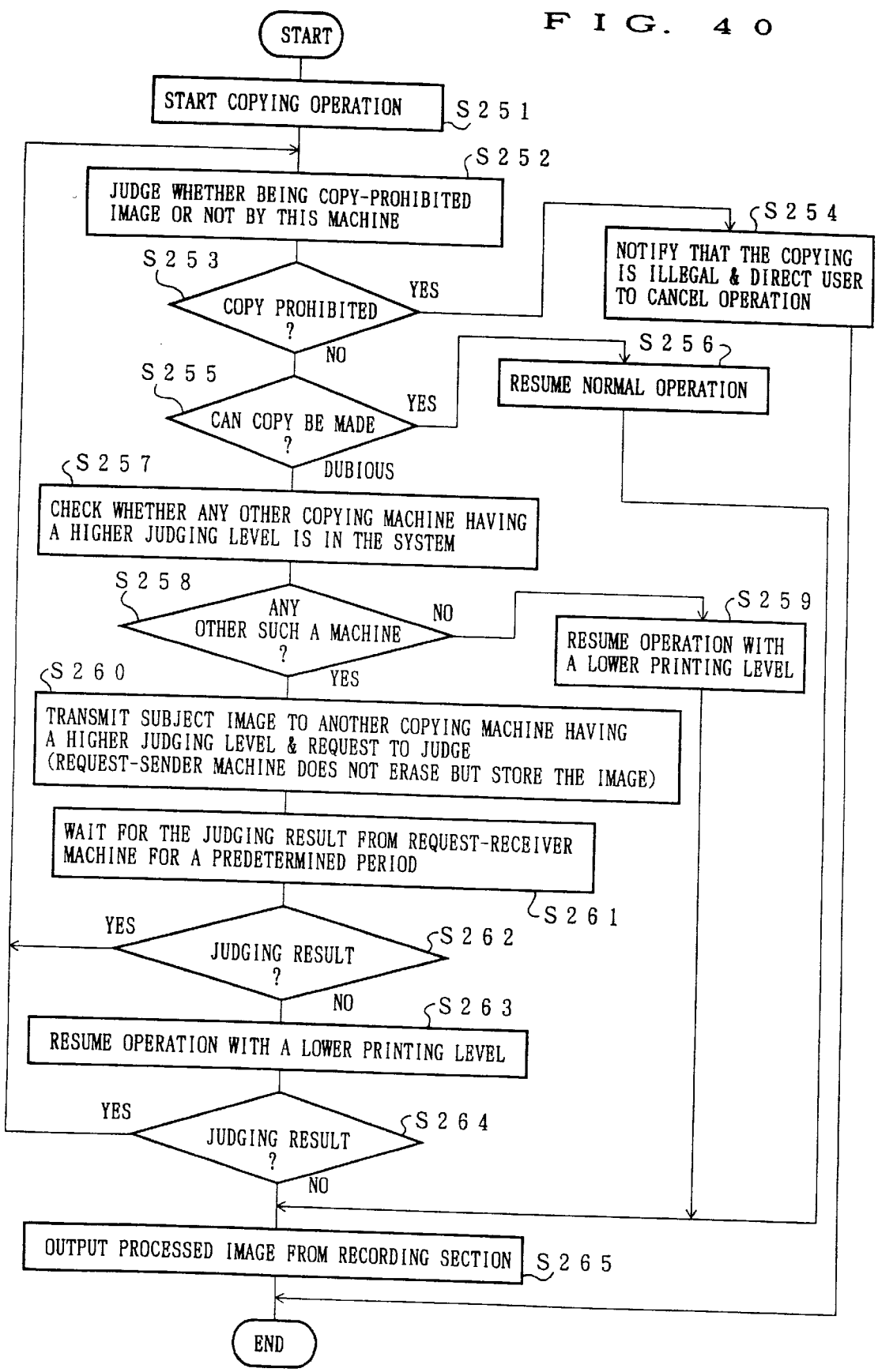
FIG. 40 is a flowchart detailing another operation of the image forming system in accordance with Embodiment 7 of the present invention.

More specifically, as shown in FIG. 40, when the digital copying machine 92 starts the copying operation (S251), the digital copying machine 92 judges whether the input image is the copy-prohibited image or not using its own specimen image judging section (S252 and S253).

If the input image is the copy-prohibited image, the digital copying machine 92 stops the copying operation by indicating that the copying of the input image is illegal as explained with reference to FIG. 39 (S254).

Otherwise, the digital copying machine 92 judges whether the input image can be copied or not (S255). If the judging result is positive, the digital copying machine 92 resumes the normal copying operation (S256), and prints out the subject image (S265).

If the input image can not be copied, the digital copying machine 92 further checks whether there is any other copying machine with a higher judging level within the image forming system (S257). If there is not such a copying machine within the system (S258), the digital copying machine 92 carries out the copying operation with a lower image quality (S259 and S265).

If there is a copying machine with a higher judging level, for example, the digital copying machine 93 having the high-level specimen image judging section, the image copying machine 92 transmits the input image through the interfaces 92a and 93a with a request for the judgment on whether the subject image is the copy-prohibited image or not (S260).

Then, the digital copying machine 92 waits for the judging result from the request-receiver digital copying machine 93 for a predetermined period (S261), and upon receipt of the judging result (S262), the digital copying machine 92 returns to S253 and start to control the copying operation again based on the judging result.

On the other hand, if the digital copying machine 92 does not receive the judging result within the predetermined period, the digital copying machine 92 resumes the copying operation with a lower image quality (S263 and S265). If the digital copying machine 92 receives the judging result from the request receiver digital copying machine 93 after it has resumed the copying operation and before it has completed the printout operation of the image (S264), the digital copying machine 92 returns to S253 as previously mentioned to carry out the operation again from the start based on the judging result.

As has been explained, in the case of either FIG. 38 or FIG. 40, the request for the judgment is issued to a copying machine having a higher judging level than the request-sender digital copying machine. The copying machine having a higher judging level referred herein means a copying machine which pre-stores a large volume of data related to the copy-prohibited images in its own memory 73. Because if the volume of the data related to the copy-prohibited images is small, the copying machine is more likely to judge the subject image as being similar to the copy-prohibited images than recognizing the same as being the copy-prohibited images with 100% accuracy. Alternativelyhithe copying machine having a higher judging level may be defined as a copying machine that uses a more precise, in other words, CPU time-consuming algorithm, when comparing the input image with the pre-stored copy prohibited images.

According to the above judging criteria, the level of the image judging means provided to each of the digital copying machines 92 and 93 within the image forming system is determined semi-automatically. However, the level may be set at the user's choice.

As has been explained, in the present image forming system, as soon as the user enters an image processing command through the control panel 90 of the digital copying machine 91, the image information is sent to the digital copying machine 93 from the digital copying machine 91 and processed in a predetermined manner as previously explained in Embodiment 1. Then, the processed image information is returned to the digital copying machine 91, and outputted in the form of a visible image from the image data output portion 72. At this point, the PCU 74 of the digital copying machine 93 serving as the specimen image judging section checks whether the subject image information is the image information of any of the registered specimen images.

When the PCU 74 judges that the input image information as being the image information of one of the registered specimen images, the information indicating this is sent to the digital copying machine 91 through the interfaces 93a and 91a.

This operation makes it possible to discover that the image information the user has entered is the image information of one of the registered specimen images, such as paper money, at the request-sender digital copying machine 91.

Thus, the request-sender digital copying machine 91 prevents the user from making copies of a copy-prohibited image, such as paper money and securities, either intendedly or erroneously, and therefore, preventing forgery of paper money or securities beforehand.

If the above-explained function is installed in the digital copying machine 93 alone, the digital copying machines 91 connected to the same do not have to include the same function. Thus, a cost increase of the digital copying machines 91 can be reduced.

Further, if there is more than one digital copying machine 93 having the specimen image judging section within the system, the judgment on whether being the copy-prohibited image or not can be made by fully utilizing these digital copying machines 93. For example, even when some of the digital copying machines 93 break down, the judgment can be made if at least one digital copying machine 93 having the specimen image judging section is operating within the image forming system.

Also, in the present image forming system, when the PCU 74 of the digital copying machine 93 judges that the image information sent from the digital copying machine 92 with the request for the image processing is the image information of one of the specimen images, the digital copying machine 93 sends the information indicating so to the request-sender digital copying machine 91. Accordingly, the digital copying machine 91 directs the user to confirm the original image through the liquid crystal display device 1.

Consequently, when the user is trying to make copies of the specimen images like paper money or securities, a warning is given to the user, thereby preventing a bad use of the digital copying machine 91 within the image forming system.

Also, in the present image forming system, when the digital copying machine 91 or 92 is notified that the input image information is the image information of one of the registered specimen images, the digital copying machine 91 or 92 outputs the image information to another digital copying machine 93 through the interfaces 91a or 92a and 93a, so that the image information is judged by the PCU 74 of another digital copying machine 93 again.

When the image information is judged further by another digital copying machine 93, the digital copying machine 91 or 92 selects the digital copying machine 93 having the PCU 74 with a higher judging level, namely a faster judging speed and a better judging algorithm, than the PCU 74 of the digital copying machine 93 used in the first judgment.

Consequently, a very accurate judgment on whether the image information is one of the specimen images or not becomes possible using more than one specimen image judging section.

In the present image forming system, the digital copying machine 91 or 92 resumes the image output operation when the PCU 74 of the digital copying machine(s) 93 does not return the judging result within the predetermined period.

Thus, if the digital copying machine(s) 93 having the PCU 74 is having a trouble after receiving the request for the judgment and can not return the judging result, the request-sender digital copying machine 91 or 92 can resume the image output operation smoothly.

In the present image forming system, the digital copying machine 91 or 92 resumes the image output operation with a lower image quality.

Thus, if it turns out that the subject image is highly likely to be the specimen image, the image output operation is resumed with a lower image quality to prevent a crime.

In the present image forming system, when the digital copying machine 91 or 92 issues a request for the judgment on whether the image information is the specimen image or not to the digital copying machine 93, the digital copying machine 93 returns the judging result alone to the digital copying machine 91 or 92.

Thus, when the judgment on whether the image information is a specimen image or not is made by more than one digital copying machine 93, the load imposed on communication means (network) can be minimized.

More specifically, if the request-receiver machine returns both the judging result and the processed image to the request-sender machine, generally a large volume of image data are sent both in inbound and outbound directions, which imposes a considerable load on the network. Therefore, the present image forming system is arranged to prevent the above inconvenience.

In the present image forming system, the digital copying machine 91 or 92 stores the subject image information into its own memory 73 while issuing a request for the judgment to the PCU 74 of the digital copying machine 93.

Thus, the request-sender digital copying machine 91 or 92 can resume the output operation based on the image information withheld therein upon receipt of the judging result alone. This arrangement is effective in terms of not only minimizing the load imposed on the network, but also accelerating an overall operation speed of the image forming system by eliminating the overhead of the data transmission. It is not recommended to erase the data when the judging result is not returned from the request-receiver machine.

In the present image forming system, if the digital copying machine 91 or 92 receives the judging result from the digital copying machine 93 after it has resumed the output operation of the subject image, the digital copying machine 91 or 92 resumes the output operation of the subject image based on the judging result again from the start.

Thus, even when the request-receiver machine receives the judging result after it has resumed the output operation on the assumption that the request-receiver machine is having a trouble, the request-receiver machine can resume the output operation again from the start based on the judging result if the judging result is received before the output operation is completed.

In the present image forming system, the digital copying machine 91 or 92 may transmit the image data to the digital copying machine 93 for any purpose other than judging whether the subject image data coincide with the image information of any of the specimen images or not. The digital copying machine 91 or 92 may transmit the image data to the digital copying machine 93 to use the function(s) installed therein.

The PCU 74 of the digital copying machine 91 or 92 may display a screen on the liquid crystal display device 1 in the manner explained in Embodiment 1 with reference to FIG. 12(b) to indicate that the subject image data are transmitted to the digital copying machine 93 for the judgment on whether being a specimen image or not, so that the digital copying machine 93 processes the subject image data only when the user enters a command to use the digital copying machine 93. Therefore, the digital copying machine 93 does not start to process the subject image data unless the user enters the command to use the digital copying machine 93. This arrangement enables the user to confirm that the subject image data will be processed by the digital copying machine 93.

In the present image forming system, it is preferable that the PCU 74 of the digital copying machine 93 serving as the image processing apparatus is furnished with the image information suitability judging section like in Embodiment 4, so that the PCU 74 can judge whether the image data transferred from the digital copying machine 91 serving as the image forming apparatus are suitable for the requested image processing. When the judging result is negative, the request-receiver machine requests the request-sender digital copying machine 91 to retransfer the subject image data again.

This is done to prevent the unwanted situation that the digital copying machine 93 can not carry out the requested image processing because the image data is defective, or the digital copying machine 93 carries out the processing uselessly using the image data whose quality is too low. The image data is judged as not being suitable for the processing when the quality of the original document read by the request-sender digital copying machine 91 is too low, the scanner section 31 (see FIG. 2) of the digital copying machine 91 that reads the original image has a low resolution, the document is displaced while being read, or noise caused by a bad condition of the communication line gives adverse effect on the image data. The PCU 74 of the digital copying machine 93 functions as the image information suitability judging section herein.

The PCU 74 of the digital copying machine 93 judges the suitability based on the image data quality, for example, in the manner explained in Embodiment 4.

In the present image forming system, the control panel 90 of the request-sender digital copying machine, for example, the digital copying machine 91, may function as the information confirming section like in Embodiment 4, so that the user can check the state of the image data processed by the digital copying machine 93 serving as the image processing apparatus first, and thence enter whether the processed image is acceptable or not into the PCU 74 of the digital copying machine 91.

The PCU 74 of the digital copying machine 91 supplies the processed image data to the laser printer section 31 (see FIG. 2) only when the user enters the confirmation for the processed image. On the other hand, if the user does not enter the confirmation for the processed image through the control panel 90, the PCU 74 of the digital copying machine 91 outputs the subject image data to the digital copying machine 93 again with information requesting to carry out the image processing again on its behalf. Accordingly, the digital copying machine 93 processes the subject image data as per request based on the above re-processing request information from the digital copying machine 91.

This arrangement enables the user to confirm the processed image data on the control panel 90, so that he can retransfer the image data to the digital copying machine 93 for the portion where he finds the processing is unsatisfactory, and requests the same to carry out the image processing again. This arrangement enables the digital copying machine 91 not to output a low-quality image data as a visible image uselessly.

In the present image forming system, the PCU 74 of the request-sender digital copying machine, for example, the digital copying machine 91, may decide whether the subject image should be processed by itself or an external image processing apparatus, for example, the digital copying machine 93. When the PCU 74 decides the image processing should be carried out by the digital copying machine 93, the PCU 74 transmits the image data to the digital copying machine 93 with a request for the image processing. When the PCU 74 decides the image processing should be carried out by its own digital copying machine 91, the PCU 74 processes the image data using the image data processing portion 71 (see FIG. 3) of the digital copying machine 91.

This arrangement can prevent an unwanted situation that the high-performance digital copying machine like the digital copying machine 93 is used unconditionally. Moreover, when the service provided by the high-performance digital copying machine is charged, the user can save the cost.

In the present image forming system, the PCU 74 of the digital copying machine 93 serving as the image processing apparatus may function as the suitability judging device like in Embodiment 3, so that the PCU 74 can judge whether the processed image data can be suitably processed by the image recording section of the request-sender image forming apparatus, for example, the laser printer section 31 of the digital copying machine 91, and display the judging result on the liquid crystal display device 1 of the digital copying machine 91.

This arrangement makes it possible to give a warning to the user when the digital copying machine 93 is carrying out the image processing which is above the processing ability of the laser printer section 31 of the digital copying machine 91.

Alternatively, when the PCU 74 of the digital copying machine 93 judges that the laser printer section 31 of the digital copying machine 91 can not output the processed image data as a visible image, the PCU 74 may search another image forming apparatus having an image recording section capable of outputting the processed image data throughout the network, so that the processed image data are outputted from another eligible image forming apparatus.

According to the above arrangement, when the request-sender image forming apparatus, the laser printer section 31 of the digital copying machine 91 herein, can not output the processed image data, the user still can obtain a desired image through another image forming apparatus having the image recording section, for example, the digital copying machine 92.

The PCU 74 of the digital copying machine 93 may judge the suitability by checking whether the recording density of the image data is within a range of the density the laser printer section 31 of the digital copying machine 91 serving as the request-sender image forming apparatus can operate on. Alternatively, the PCU 74 may do the same by judging whether a size of a sheet on which the image data should be recorded can be used in the digital copying machine 91 or not, or a sheet of a larger size than the above specified size can be used in the digital copying machine 91 or not. This arrangement enables the user to obtain the image data reproduced on a sheet of a suitable or larger size at an adequate recording density.

Also, the PCU 74 may judge the suitability whether the laser printer section 31 of the digital copying machine 91 is ready for the operation or not. When arranged in this manner, if the digital copying machine 91 is having trouble like a paper jam or being under the regular inspection, the image still can be outputted from another digital copying machine.

In the present image forming system, like in Embodiment 5, the PCU 74 of the request-receiver image processing apparatus, such as the digital copying machine 93, may function as the history managing device, so that the PCU 74 can store the content of the image processing done by the digital copying machine 93 as history information of the request-sender image forming apparatus, for example, the digital copying machine 91.

Consequently, it has become possible to obtain the information as to what kinds of image processing the request-sender image forming apparatus, the digital copying machine 91 herein, has requested to the digital copying machine 93, or the utilization of the digital copying machine 93 by the request-sender image forming apparatus. Also, it has become possible to learn user's preference of the image processing functions.

It is preferable that the PCU 74 of the digital copying machine 93 serving as the history managing device can also adds up the history information, because this arrangement facilitates the management of the utilization of the digital copying machine 93 serving as the image processing machine by each user, and the issuance of an invoice when the service provided from the digital copying machine 93 is not free.

Further, the PCU 74 of the image processing apparatus, for example, the digital copying machine 93, may transfer the history information to the digital copying machine 91 through the transferring device, so that the PCU 74 of the digital copying machine 91 displays the received history information on the liquid crystal display device 1. Alternatively, the PCU 74 of the digital copying machine 91 may output the history information onto a recording sheet using the laser printer section 31 upon receipt of the same.

According to the above arrangement, the user can readily check the utilization of the digital copying machine 93 serving as the image processing apparatus, or the charges for the provided service. Also, if the history information is outputted onto a recording sheet having the largest size available in the digital copying machine 91, which is seldom used, the user will never fail to notice the information whenever it is outputted.

Also, the PCU 74 of the digital copying machine 91 serving as the image forming apparatus may function as the request state managing section, so that the PCU 74 stores the content of the image processing requested to the image processing apparatus, for example, the digital copying machine 93, as another kind of history information. This arrangement enables the user of the digital copying machine 91 to compare the history information from the digital copying machine 93 and the history information stored in the PCU 74 of the digital copying machine 91.

In the present image forming system, like in Embodiment 1, the digital copying machine 93 serving as the image processing apparatus may output information as to a variation of the image processing available thereon, and process the subject image based on a control signal from the request-sender image forming apparatus, for example, the digital copying machine 91. When arranged in this manner, the PCU 74 of the digital copying machine 91 displays the kinds of the image processing available on the digital copying machine 93 based on the information sent from the digital copying machine 93 through the transferring device, while outputting a control signal directing the image processing specified by the user through the control panel 90 of the digital copying machine 91 to the digital copying machine 93 through the transferring device together with the image data.

Consequently, the user of the digital copying machine 91 can readily learn the image processing functions installed in the digital copying machine 93 visually on the digital copying machine 91, thereby making it easier for the user to select the image processing function he wishes to use, and hence improving the convenience.

EMBODIMENT 8

The following description will describe Embodiment 8 of the present invention.

Figure 41:
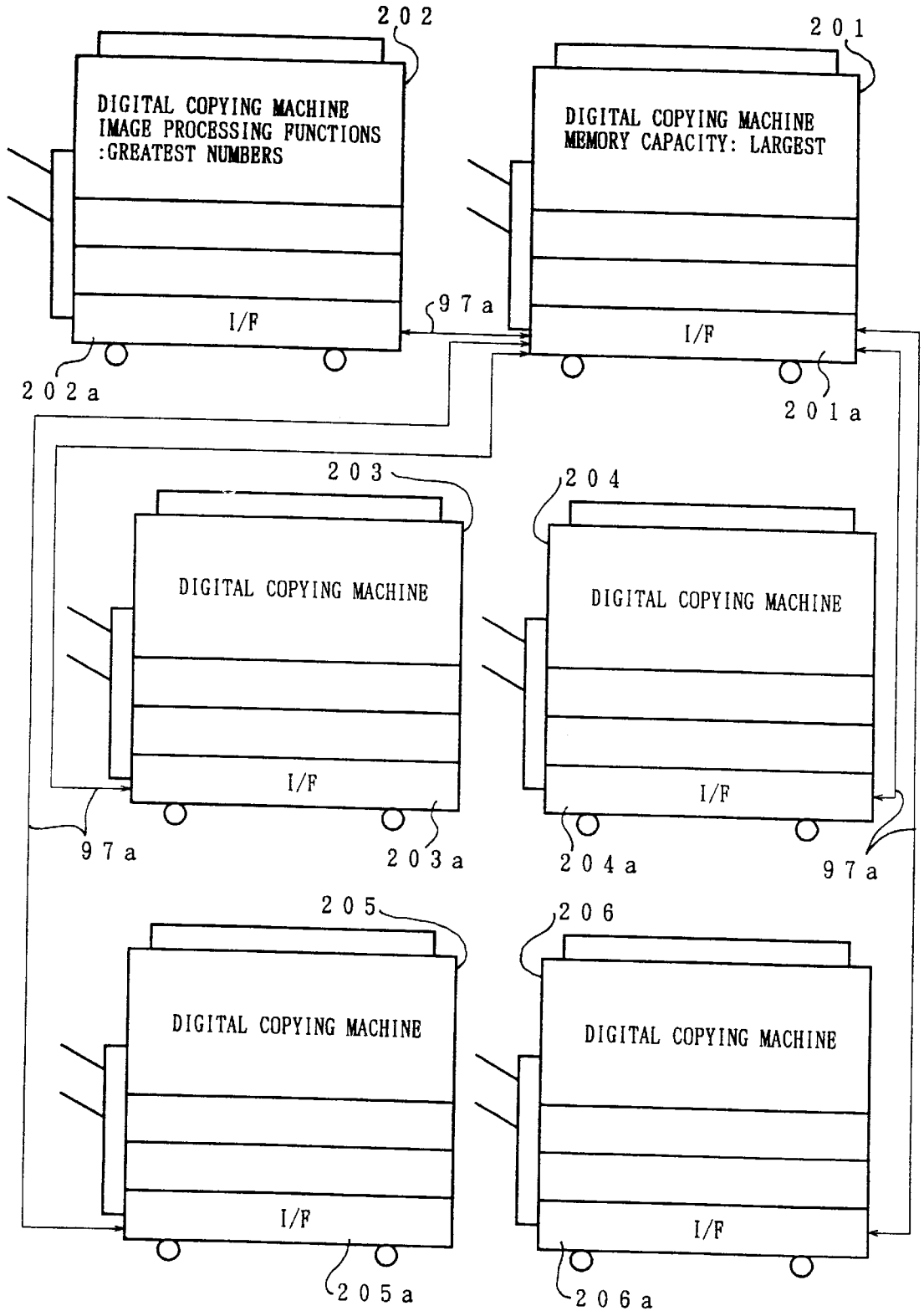
FIG. 41 is a view explaining a schematic arrangement of an image forming system in accordance with Embodiment 8 of the present invention.

As shown in FIG. 41, an image forming system of the present invention (hereinafter, referred to as the present image forming system) includes six digital copying machines 201–206 having their respective interfaces 201*a*–206*a* for mutual communication. In the present image forming system, a combination of the digital copying machine 201 having the largest memory 73 and the digital copying machine 202 having the greatest numbers of image processing functions is used as a primary image processing apparatus.

The digital copying machines 201 and 202 are connected to each other for mutual communication through their respective interfaces 201*a* and 202*a* and a communication line 97*a*. Likewise, each of the digital copying machines 203–206 is connected to the digital copying machine 201 for the mutual communication through their respective interfaces 203*a*–206*a* and 201*a* and the communication line 97*a*. Also, the digital copying machines 202–206 are interconnected through the digital copying machine 201 for mutual communication.

In the present image forming system, the digital copying machines 201 and 202 carry out the operation explained in Embodiment 1. For example, the functions of the digital copying machine 202 correspond to functions of the digital copying machine 93 in FIG. 11, and the digital copying machine 201 has fewer functions and larger memory capacity than the digital copying machine 93. Likewise, the functions of each of the digital copying machines 203 and 204 correspond to the functions of the digital copying machine 92, while the functions of the digital copying machines 205 and 206 correspond to the functions of the digital copying machine 91.

The digital copying machines 201 and 202 forming the primary image processing apparatus play their own roles: the digital copying machine 201 is responsible for the image data management demanding the memory 73 of a considerable capacity, while the other digital copying machine 202 is responsible for the image processing. More specifically, when a request for the image processing is issued from the digital copying machine 203, the image data transmitted from the digital copying machine 203 are stored in the memory 73 of the digital copying machine 201 first, and thence sent to the digital copying machine 202 successively for processing.

The processed image data is stored in the memory 73 of the digital copying machine 201 again and returned to the digital copying machine 203. The above control is carried out by the PCU 74 of the digital copying machine 201, for example.

When the primary digital copying machine is composed of more than one digital copying machine playing their respective roles, not only the cost can be saved but also the efficiency of the image forming system can be improved compared with a case where a single digital copying machine serves as the high-performance primary digital copying machine.

The image data may be transmitted to the digital copying machine 201 from the request-sender digital copying machine, for example, the digital copying machine 203, when the PCU 74 of the digital copying machine 203 judges its own memory 73 is too small for the operation. When arranged in this manner, if the volume of the image data is small and the PCU 74 judges that its own memory 73 is sufficient, the image data is not sent to the digital copying machine 201 but stored into the memory 73 of the digital copying machine 202.

The present image forming system may be modified in the following manner.

Figure 42:
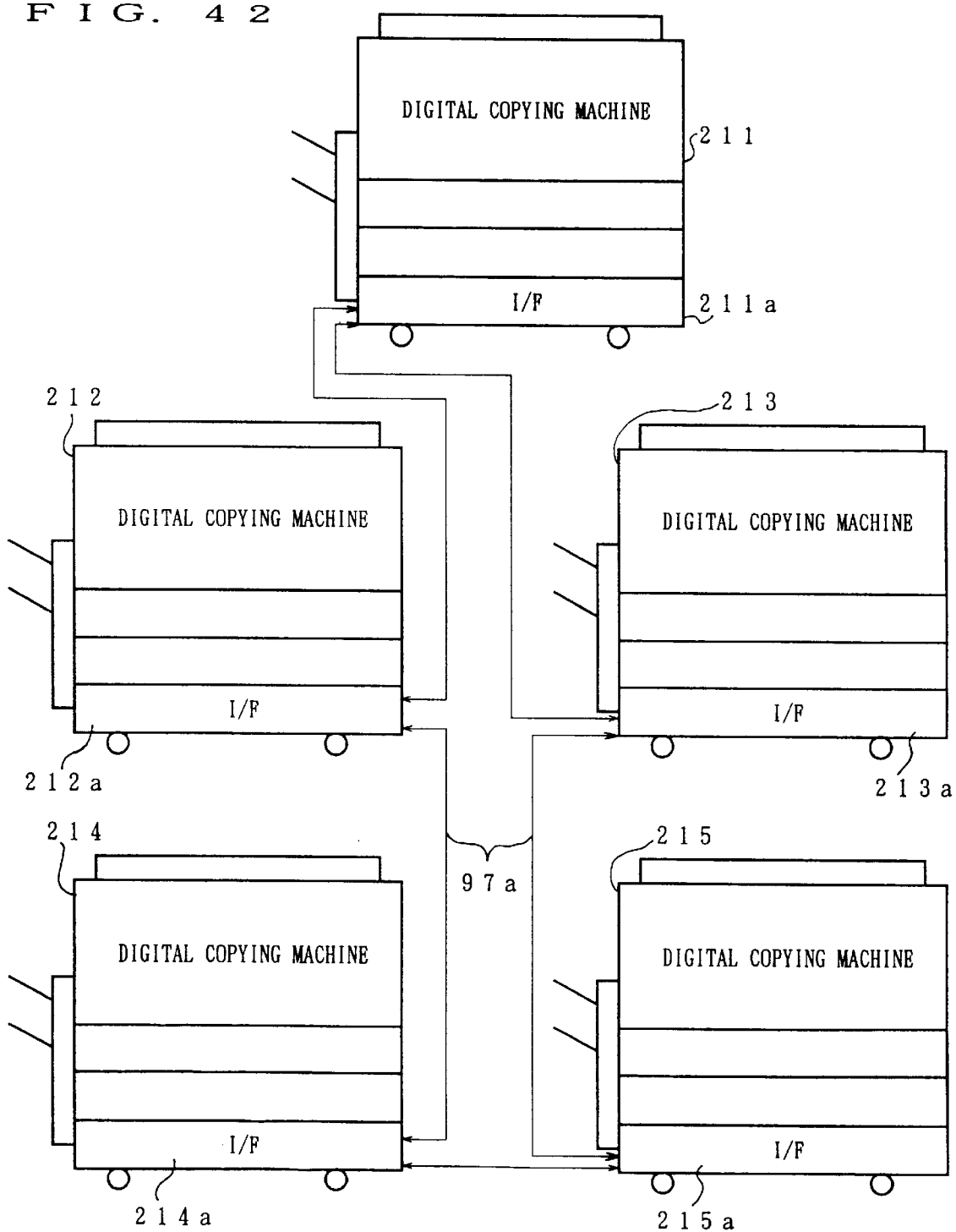
FIG. 42 is a view explaining another schematic arrangement of the image forming system in accordance with Embodiment 8 of the present invention.

As shown in FIG. 42, the modified image forming system includes five digital copying machines 211–215 having their respective interfaces 211a–215a for mutual communication. The digital copying machines 211–215 are interconnected through their respective interfaces 211a–215a and the communication line 97a to form a loop network. Each of the digital copying machines 211–215 corresponds to the digital copying machine 30, for example.

In the modified image forming system, when each of the digital copying machines 211–215 is not furnished with the image processing function the user wishes to use, each issues a request to carry out the image processing on its behalf. For this reason, each of the digital copying machines 211–215 withholds the information of the other digital copying machines, such as the available image processing functions and memory capacity. Each digital copying machine may automatically issue a request for the image processing to one of the other eligible digital copying machines or displays a list of the eligible digital copying machines on the liquid crystal display device 1, so that the user can readily make a selection.

The present image forming system can operate in the same manner as its counterpart in Embodiment 1. Here, the digital copying machine that receives a request from the request-sender digital copying machine is not the primary digital copying machine but the other digital copying machines having the requested image processing function.

The above image forming system, in which no machine serves as the primary digital copying machine, is effective when each of the digital copying machines 211–215 have different image forming functions.

As has been explained, an image forming system of the present invention, comprising at least one image forming apparatus and at least one image processing apparatus, and a transferring device for transferring information between said image forming apparatus and said image processing apparatus through mutual communication, is arranged in such a manner that, (1) said image forming apparatus includes:
   an image recording section for forming a visible image based on image information;
   an input section through which a command related to image processing is inputted; and
   a control section for outputting the image information to said image processing apparatus upon input of a command requesting said image processing apparatus to carry out the image processing on behalf of said image forming apparatus through said input section, said control section also for supplying processed image information obtained by said image processing apparatus to said image recording section, and (2) said image processing apparatus includes:
   an image processing section for carrying out certain image processing with the image information inputted through said transferring device, said image processing section also for outputting the processed image information to said image forming apparatus which has outputted the command; and a specimen image judging section for judging whether the image information inputted through said transferring device is image information of any of registered specimen images, and that said image processing apparatus sends information conveying a judging result to said image forming apparatus through said transferring device when said specimen image judging section judges that the image information inputted through the transferring device is the image information of one of the registered specimen images.

According to the above arrangement, as soon as the user enters a command related to the image processing into the image forming apparatus through the input section, the control section outputs the image information read by, for example, an image reading section provided to the image forming apparatus, to the image processing apparatus through the transferring device. The image processing apparatus carries out certain image processing with the input image information, and outputs the resulting processed image information to the image forming apparatus through the transferring device. Upon input of the processed image information, the control section of the image forming apparatus supplies the same to the image recording section, which forms a visible image based on the processed image information.

Here, the specimen image judging section of the image processing apparatus judges whether the subject image information is the image information of any of the registered specimen images. When it turns out that the subject image information is the image information of one of the registered specimen images, the image processing apparatus sends the information indicating this to the image forming apparatus through the transferring device.

Since the image forming apparatus can request the image processing apparatus to carry out the image processing on its behalf in the above arrangement, when more than one image forming apparatus is connected to the image processing apparatus through the transferring device, each image forming apparatus does not have to include all kinds of image processing functions. Thus, if a higher or new image processing function has been developed and is not installed in any of the image forming apparatus within the system yet, the user does not have to replace the existing image forming apparatuses with new models but only has to install the higher or new image processing function in the image processing apparatus alone when he wishes to use such an image processing function. Consequently, an economic burden imposed on the users of the image forming apparatuses can be reduced.

Further, the above arrangement makes it possible to discover whether the subject image information is the image information of any of the registered specimen images at the image forming apparatus that has outputted the command requesting to carry out the image processing on its behalf. Consequently, a crime, such as forgery of paper money or securities, can be prevented. Moreover, if such a judging function is installed in the image processing apparatus, each image processing apparatus connected to the same does not have to include the judging function, thereby reducing a cost increase of the image forming apparatuses.

Also, it is preferable that the image forming system of the present invention is further arranged in such a manner that said image forming apparatus further include a confirmation notifying section for directing a user to confirm an original image in response to the information from said image processing apparatus indicating that the image information inputted through said transferring device is the image information of one of the registered specimen images.

According to the above arrangement, when the specimen image judging section of the image processing apparatus judges that the subject image information transferred from the image forming apparatus is the image information of one of the registered specimen images, the image processing apparatus sends the information indicating so to the image forming apparatus that has outputted the command. Accordingly, the confirmation notifying section of the image forming apparatus directs the user to confirm the original image.

Consequently, it has become possible to give a warning to the user when he tries to make copies of the specimen images, such as paper money and securities, thereby preventing a bad use of the image forming apparatus within the image forming system of the present invention.

Also, the image forming system of the present invention may be further arranged in such a manner that:
  said image forming system comprises a plurality of said image processing apparatuses; and
  upon receipt of the information indicating that the image information inputted through said transferring device is the image information of one of the registered specimen images from said image processing apparatus, said image forming apparatus operates in following manners:
    i) said image forming apparatus outputs the input image information to another image processing apparatus through said transferring device, so that the specimen image judging section of said another image processing apparatus judges whether the input image information is the image information of any of the registered specimen images, and
    ii) said image forming apparatus selects an image processing apparatus whose specimen image judging section has a higher judging level than specimen image judging section of the image processing apparatus used in a preceding judgment.

According to the above arrangement, upon receipt of the information indicating that the input image information is one of the registered specimen images, the image forming apparatus outputs the subject image information to another image processing apparatus through the transferring device, so that the specimen image judging section of the above image processing apparatus judges whether the subject image information is the image information of any of the registered specimen images again. In this case, the image forming apparatus selects an image processing apparatus whose specimen image judging section has a higher judging level than the counterpart used in the preceding judgment.

Consequently, it has become possible to judge accurately whether the subject image is any of the registered specimen images using more than one specimen image judging section.

Also, the image forming system of the present invention may be further arranged in such a manner that each image forming apparatus suspends an operation of forming the visible image as soon as outputting a command to the specimen image judging section of another image processing apparatus, and resumes the operation when a judging result is not returned from said another image processing apparatuses within a predetermined period.

According to the above arrangement, the image forming apparatus resumes the visible image forming operation when the judging result is not returned from the image processing apparatus within a predetermined period since the image forming apparatus has requested the specimen image judging section of the image processing apparatus to make a judgement on the subject image information.

Thus, even if the image processing apparatus having the specimen image judging section is having trouble after it has received the request for the judgment, the image forming apparatus that has outputted the command can resume the visible image forming operation smoothly.

Also, the image forming system of the present invention may be further arranged in such a manner that said image forming apparatus resumes the operation and forms the visible image with a lower image quality when the judging result is not returned from said another image processing apparatus within the predetermined period.

According to the above arrangement, the image forming apparatus resumes the visible image forming operation with a lower image quality. Thus, when the subject image is highly likely to be one of the specimen images, a crime can be prevented by resuming the visible image forming operation with a lower image quality.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming system comprising at least one image forming apparatus, at least one image processing apparatus, and a transferring device for transferring information between said image forming apparatus and said image processing apparatus through mutual communication,
  wherein said image forming apparatus includes:
    an image recording section for forming a visible image based on image information;
    an input section through which a command related to image processing is inputted; and
    a control section for outputting the image information to said image processing apparatus upon input of a command requesting said image processing apparatus to carry out the image processing on behalf of said image forming apparatus through said input section, said control section also for supplying processed image information obtained by said image processing apparatus to said image recording section,
  wherein said image processing apparatus includes:
    an image processing section for carrying out certain image processing with the image information inputted through said transferring device, said image processing section also for outputting the processed image information to said image forming apparatus which has outputted the command;
    a specimen image judging section for judging whether the image information inputted through said transferring device is image information of any of registered specimen images; and
    a storage section for storing the image information, so that the control section of said image forming apparatus transfers the image information to the storage section of said image processing apparatus through said transferring device to be stored therein, and
  wherein said image processing apparatus sends information conveying a judging result to said image forming apparatus through said transferring device when said specimen image judging section judges that the image information inputted through the transferring device is the image information of one of the registered specimen images.

2. The image forming system of claim 1, wherein:

said image forming system comprises a plurality of image processing apparatuses; and upon receipt of the information indicating that the image information inputted through said transferring device is the image information of one of the registered specimen images from one of said plurality of image processing apparatuses, said image forming apparatus operates in following manners:

i) said image forming apparatus outputs the input image information to another image processing apparatus through said transferring device, so that the specimen image judging section of said another image processing apparatus judges whether the input image information is the image information of any of the registered specimen images, and ii) said image forming apparatus selects an image processing apparatus whose specimen image judging section has a higher judging level than specimen image judging section of the image processing apparatus used in a preceding judgment.

3. The image forming system of claim 1 further comprising a suitability judging device for judging whether it is suitable or not to process the processed image information by the image recording section of said image forming apparatus that has outputted the command requesting to carry out the image processing on its behalf.

4. The image forming system of claim 3, further comprising a plurality of image forming apparatuses and wherein:

said plurality of image forming apparatuses are connected to said image processing apparatus; and said suitability judging device, upon judging that it is not suitable to process the processed image information by the image forming apparatus that has outputted the command requesting to carry out the image processing on its behalf, tries to find another image forming apparatus whose image recording section is suitable to process the processed image information, and transfers the processed image information to said another image forming apparatus thus found.

5. The image forming system of claim 3, wherein said suitability judging device judges whether it is suitable or not to process the processed image information by said image recording section based on a sheet size necessary to record the processed image information by said image recording section and a largest sheet size applicable for said image forming apparatus.

6. The image forming system of claim 3, wherein said suitability judging device judges whether it is suitable or not to process the processed image information by said image recording section based on a sheet size necessary to record the processed image information by said image recording section and sizes of sheets contained in said image forming apparatus to be fed into said image recording section.

7. The image forming system of claim 3, wherein said suitability judging device judges whether it is suitable or not to process the processed image information by said image recording section based on whether said image forming apparatus is ready for a recording operation using said image recording section.

8. An image forming system comprising:

at least one image forming apparatus;

at least one image processing apparatus;

a transferring device for transferring information between said image forming apparatus and said image processing apparatus through mutual communication;

wherein said image forming apparatus includes:

an image recording section for forming a visible image based on image information;

an input section through which a command related to image processing is inputted, and a control section for outputting the image information to said image processing apparatus upon input of a command requesting said image processing apparatus to carry out the image processing on behalf of said image forming apparatus through said input section, said control section also for supplying processed image information obtained by said image processing apparatus to said image recording section;

wherein said image processing apparatus includes:

an image processing section for carrying out certain image processing with the image information inputted through said transferring device, said image processing section also for outputting the processed image information to said image forming apparatus which has outputted the command, and a specimen image judging section for judging whether the image information inputted through said transferring device is image information of any of registered specimen images;

wherein said image processing apparatus sends information conveying a judging result to said image forming apparatus through said transferring device when said specimen image judging section judges that the image information inputted through the transferring device is the image information of one of the registered specimen images; and wherein said image forming apparatus further includes a confirmation notifying section for directing a user to confirm an original image in response to the information from said image processing apparatus indicating that the image information inputted through said transferring device is the image information of one of the registered specimen images.

9. An image forming system comprising:

at least one image forming apparatus;

a plurality of image processing apparatuses;

a transferring device for transferring information between said image forming apparatus and each of said plurality of image processing apparatuses through mutual communication;

wherein said image forming apparatus includes:

an image recording section for forming a visible image based on image information, an input section through which a command related to image processing is inputted, and a control section for outputting the image information to one of said plurality of image processing apparatuses upon input of a command requesting said one of said plurality of image processing apparatuses to carry out the image processing on behalf of said image forming apparatus through said input section, said control section also for supplying processed image information obtained by said one of said plurality of image processing apparatuses to said image recording section;

wherein each of said plurality of image processing apparatuses includes:

an image processing section for carrying out certain image processing with the image information inputted through said transferring device, said image processing section also for outputting the processed image information to said image forming apparatus which has outputted the command, a specimen image judging section for judging whether the image information inputted through said transferring device is image information of any of registered specimen images;

wherein one of said plurality of image processing apparatuses sends information conveying a judging result to said image forming apparatus through said transferring device when said specimen image judging section judges that the image information inputted through the transferring device is the image information of one of the registered specimen images; and wherein upon receipt of the information indicating that the image information inputted through said transferring device is the image information of one of the registered specimen images from said one of said plurality of image processing apparatuses, said image forming apparatus operates in following manners:

i) said image forming apparatus outputs the input image information to another image processing apparatus through said transferring device, so that the specimen image judging section of said another image processing apparatus judges whether the input image information is the image information of any of the registered specimen images, ii) said image forming apparatus selects an image processing apparatus whose specimen image judging section has a higher judging level than specimen image judging section of the image processing apparatus used in a preceding judgment, and iii) wherein each image forming apparatus suspends an operation of forming the visible image as soon as outputting a command to the specimen image judging section of said another image processing apparatus, and resumes the operation when a judging result is not returned from said another image processing apparatus within a predetermined period.

10. The image forming system of claim 9, wherein said image forming apparatus resumes the operation and forms the visible image with a lower image quality when the judging result is not returned from said another image processing apparatus within the predetermined period.

11. An image forming system comprising:

at least one image forming apparatus;

at least one image processing apparatus; a transferring device for transferring information between said image forming apparatus and said image processing apparatus through mutual communication;

wherein said image forming apparatus includes:

an image recording section for forming a visible image based on image information, an input section through which a command related to image processing is inputted, a control section for outputting the image information to said image processing apparatus upon input of a command requesting said image processing apparatus to carry out the image processing on behalf of said image forming apparatus through said input section, said control section also for supplying processed image information obtained by said image processing apparatus to said image recording section, and a storage section for storing information;

wherein said image processing apparatus includes:

an image processing section for carrying out certain image processing with the image information inputted through said transferring device, said image processing section also for outputting the processed image information to said image forming apparatus which has outputted the command, a specimen image judging section for judging whether the image information inputted through said transferring device is image information of any of registered specimen images, and a storage section for storing information;

wherein said image processing apparatus sends information conveying a judging result to said image forming apparatus through said transferring device when said specimen image judging section judges that the image information inputted through the transferring device is the image information of one of the registered specimen images; and wherein the control section of said image forming apparatus stores the image information into the storage section of said image forming apparatus, and when a memory capacity of the storage section of said image forming apparatus becomes short, the control section of said image forming apparatus transfers the image information to the storage section of said image processing apparatus through said transferring device to be stored therein.

12. An image forming system comprising:

at least one image forming apparatus;

at least one image processing apparatus;

a transferring device for transferring information between said image forming apparatus and said image processing apparatus through mutual communication;

wherein said image forming apparatus includes:

an image recording section for forming a visible image based on image information, an input section through which a command related to image processing is inputted, and a control section for outputting the image information to said image processing apparatus upon input of a command requesting said image processing apparatus to carry out the image processing on behalf of said image forming apparatus through said input section, said control section also for supplying processed image information obtained by said image processing apparatus to said image recording section;

wherein said image processing apparatus includes:

an image processing section for carrying out certain image processing with the image information inputted through said transferring device, said image processing section also for outputting the processed image information to said image forming apparatus which has outputted the command, and a specimen image judging section for judging whether the image information inputted through said transferring device is image information of any of registered specimen images;

wherein said image processing apparatus sends information conveying a judging result to said image forming apparatus through said transferring device when said specimen image judging section judges that the image information inputted through the transfer ring device is the image information of one of the registered specimen images;

wherein said image forming apparatus further includes a display section, so that the control section of said image forming apparatus shows a display on said display section, indicating that said image processing apparatus will be used, before said image processing apparatus starts to process the image information;

wherein said control section controls said image processing apparatus to process the image information after a command to use said image processing apparatus is entered through said input section; and wherein said control section controls said image processing apparatus not to process the image information when the command to use said image processing apparatus is not entered.

13. An image forming system of comprising:

at least one image forming apparatus;

at least one image processing apparatus;

a transferring device for transferring information between said image forming apparatus and said image processing apparatus through mutual communication;

wherein said image forming apparatus includes:
an image recording section for forming a visible image based on image information,
an input section through which a command related to image processing is inputted, and
a control section for outputting the image information to said image processing apparatus upon input of a command requesting said image processing apparatus to carry out the image processing on behalf of said image forming apparatus through said input section, said control section also for supplying processed image information obtained by said image processing apparatus to said image recording section;

wherein said image processing apparatus includes:
an image processing section for carrying out certain image processing with the image information inputted through said transferring device, said image processing section also for outputting the processed image information to said image forming apparatus which has outputted the command, and
a specimen image judging section for judging whether the image information inputted through said transferring device is image information of any of registered specimen images;

wherein said image processing apparatus sends information conveying a judging result to said image forming apparatus through said transferring device when said specimen image judging section judges that the image information inputted through the transferring device is the image information of one of the registered specimen images; and wherein said image processing apparatus further includes:
an image information suitability judging section for judging whether it is suitable or not to process the image information inputted through said transferring device, and
a control section for sending a command to said image forming apparatus to retransfer the image information when a judging result by said image information suitability judging section is negative.

14. The image forming system of claim 13, wherein said image information suitability judging section makes a judgment based on a quality of the image information.

15. An image forming system comprising:

at least one image forming apparatus;

at least one image processing apparatus;

a transferring device for transferring information between said image forming apparatus and said image processing apparatus through mutual communication;

wherein said image forming apparatus includes:
an image recording section for forming a visible image based on image information,
an input section through which a command related to image processing is inputted, and
a control section for outputting the image information to said image processing apparatus upon input of a command requesting said image processing apparatus to carry out the image processing on behalf of said image forming apparatus through said input section, said control section also for supplying processed image information obtained by said image processing apparatus to said image recording section;

wherein said image processing apparatus includes:
an image processing section for carrying out certain image processing with the image information inputted through said transferring device, said image processing section also for outputting the processed image information to said image forming apparatus which has outputted the command, and
a specimen image judging section for judging whether the image information inputted through said transferring device is image information of any of registered specimen images;

wherein said image processing apparatus sends information conveying a judging result to said image forming apparatus through said transferring device when said specimen image judging section judges that the image information inputted through the transferring device is the image information of one of the registered specimen images;

wherein said image forming apparatus further includes an information confirming section for enabling a user to confirm a condition of the processed image information obtained by said image processing apparatus and input whether the processed image information is satisfactory or not;

wherein the control section of said image forming apparatus supplies the processed image information to said image recording section upon receipt of an input confirming that the condition of the processed image information is satisfactory, and upon receipt of an input indicating that the condition of the processed image information is not satisfactory, the control section of said image forming apparatus sends the image information to said image processing apparatus again together with information requesting re-processing of the image information; and wherein said image processing apparatus carries out the image processing again with the image information inputted through said transferring device in response to the information requesting the re-processing of the image information from said image forming apparatus.

16. An image forming system comprising:

at least one image forming apparatus;

at least one image processing apparatus;

a transferring device for transferring information between said image forming apparatus and said image processing apparatus through mutual communication;

wherein said image forming apparatus includes:

an image recording section for forming a visible image based on image information, an input section through which a command related to image processing is inputted, and a control section for outputting the image information to said image processing apparatus upon input of a command requesting said image processing apparatus to carry out the image processing on behalf of said image forming apparatus through said input section, said control section also for supplying processed image information obtained by said image processing apparatus to said image recording section;

wherein said image processing apparatus includes:

an image processing section for carrying out certain image processing with the image information inputted through said transferring device, said image processing section also for outputting the processed image information to said image forming apparatus which has outputted the command, and a specimen image judging section for judging whether the image information inputted through said transferring device is image information of any of registered specimen images;

wherein said image processing apparatus sends information conveying a judging result to said image forming apparatus through said transferring device when said specimen image judging section judges that the image information inputted through the transferring device is the image information of one of the registered specimen images;

wherein said image forming apparatus further includes an image processing section for carrying out certain image processing with the image information;

wherein said control section selects one of the image processing section of said image forming apparatus and said image processing apparatus for carrying out the image processing depending on a kind of the image processing specified through said input section;

wherein said control section supplies the image information to the image processing section of said image forming apparatus when selecting said image forming apparatus, and supplies the image information processed by said image processing section to said image recording section of said image forming apparatus; and wherein said control section supplies the image information to said image processing apparatus, and supplies the processed image information obtained by said image processing apparatus to said image recording section when selecting said image processing apparatus.

17. An image forming system comprising:

at least one image forming apparatus;

at least one image processing apparatus;

a transferring device for transferring information between said image forming apparatus and said image processing apparatus through mutual communication;

wherein said image forming apparatus includes:

an image recording section for forming a visible image based on image information, an input section through which a command related to image processing is inputted, and a control section for outputting the image information to said image processing apparatus upon input of a command requesting said image processing apparatus to carry out the image processing on behalf of said image forming apparatus through said input section, said control section also for supplying processed image information obtained by said image processing apparatus to said image recording section;

wherein said image processing apparatus includes:

an image processing section for carrying out certain image processing with the image information inputted through said transferring device, said image processing section also for outputting the processed image information to said image forming apparatus which has outputted the command, and a specimen image judging section for judging whether the image information inputted through said transferring device is image information of any of registered specimen images;

wherein said image processing apparatus sends information conveying a judging result to said image forming apparatus through said transferring device when said specimen image judging section judges that the image information inputted through the transferring device is the image information of one of the registered specimen images;

a suitability judging device for judging whether it is suitable or not to process the processed image information by the image recording section of said image forming apparatus that has outputted the command requesting to carry out the image processing on its behalf; and wherein said suitability judging device judges whether it is suitable or not to process the processed image information by said image recording section based on a recording density of said image recording section.

18. An image forming system comprising:

at least one image forming apparatus;

at least one image processing apparatus;

a transferring device for transferring information between said image forming apparatus and said image processing apparatus through mutual communication;

wherein said image forming apparatus includes:

an image recording section for forming a visible image based on image information, an input section through which a command related to image processing is inputted, and a control section for outputting the image information to said image processing apparatus upon input of a command requesting said image processing apparatus to carry out the image processing on behalf of said image forming apparatus through said input section, said control section also for supplying processed image information obtained by said image processing apparatus to said image recording section;

wherein said image processing apparatus includes:

an image processing section for carrying out certain image processing with the image information inputted through said transferring device, said image processing section also for outputting the processed image information to said image forming apparatus which has outputted the command, and a specimen image judging section for judging whether the image information inputted through said transferring device is image information of any of registered specimen images;

wherein said image processing apparatus sends information conveying a judging result to said image forming apparatus through said transferring device when said specimen image judging section judges that the image information inputted through the transferring device is the image information of one of the registered specimen images; and a history managing device for storing a content of the image processing done by said image processing apparatus as history information of said image forming apparatus that has outputted the command requesting to carry out the image processing on its behalf.

19. The image forming system of claim 18, wherein said history managing device is furnished with a function for adding up the history information.

20. The image forming system of claim 19, wherein:

said image forming apparatus further includes a display section; and said history managing device is provided in said image processing apparatus and is able to transfer the history information to said image forming apparatus through said transferring device, whereby the control section of said image forming apparatus displays the history information transferred from said history managing device on said display section.

21. The image forming system of claim 19, wherein:

said history managing device is provided in said image processing apparatus and is able to transfer the history information to said image forming apparatus through said transferring device; and the control section of said image forming apparatus supplies the history information transferred from said history managing device to said image recording section to be outputted as a visible image.

22. The image forming system of claim 21, wherein the image recording section of said image forming apparatus records the history information on a sheet of a largest size among all kinds of sheets contained in said image forming apparatus to be fed into said image recording section.

23. The image forming system of claim 18, wherein said image forming apparatus further includes a request state managing section for storing a content of the image processing requested to said image processing apparatus as another kind of history information.

24. An image forming system comprising:

at least one image forming apparatus;

at least one image processing apparatus;

a transferring device for transferring information between said image forming apparatus and said image processing apparatus through mutual communication;

wherein said image forming apparatus includes:

an image recording section for forming a visible image based on image information, an input section through which a command related to image processing is inputted, and a control section for outputting the image information to said image processing apparatus upon input of a command requesting said image processing apparatus to carry out the image processing on behalf of said image forming apparatus through said input section, said control section also for supplying processed image information obtained by said image processing apparatus to said image recording section;

wherein said image processing apparatus includes:

an image processing section for carrying out certain image processing with the image information inputted through said transferring device, said image processing section also for outputting the processed image information to said image forming apparatus which has outputted the command, and a specimen image judging section for judging whether the image information inputted through said transferring device is image information of any of registered specimen images;

wherein said image processing apparatus sends information conveying a judging result to said image forming apparatus through said transferring device when said specimen image judging section judges that the image information inputted through the transferring device is the image information of one of the registered specimen images;

wherein said image processing apparatus can output information indicating a variation of available image processing, and carry out the image processing specified by a control signal from said image forming apparatus; and wherein said image forming apparatus further includes a display section, so that the control section of said image forming apparatus displays the variation of image processing available on said image processing apparatus on said display section based on the information transferred from said image processing apparatus through said transferring device, said control section also outputting the control signal as a command to carry out the image processing specified through said input section to said image processing apparatus through said transferring device together with the image information.

* * * * *